US009781291B2

(12) United States Patent
Oshima

(10) Patent No.: US 9,781,291 B2
(45) Date of Patent: Oct. 3, 2017

(54) IMAGE PROCESSING APPARATUS, CONTROLLING METHOD THEREOF, AND PROGRAM

(71) Applicant: CANON KABUSHIKI KAISHA, Tokyo (JP)

(72) Inventor: Soshi Oshima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/511,658

(22) Filed: Oct. 10, 2014

(65) Prior Publication Data

US 2015/0116788 A1 Apr. 30, 2015

(30) Foreign Application Priority Data

Oct. 24, 2013 (JP) .................................. 2013-221101

(51) Int. Cl.
H04N 1/393 (2006.01)
H04N 1/195 (2006.01)
H04N 1/00 (2006.01)

(52) U.S. Cl.
CPC ..... H04N 1/19594 (2013.01); H04N 1/00477 (2013.01)

(58) Field of Classification Search
None
See application file for complete search history.

(56) References Cited

U.S. PATENT DOCUMENTS 5,377,019 A * 12/1994 Okisu et al. .................. 358/464
6,067,112 A 5/2000 Wellner et al.
2007/0296695 A1 12/2007 Shi et al.
2008/0218524 A1 * 9/2008 Takagi ........................... 345/522
2012/0042251 A1 * 2/2012 Rodriguez ........... G11B 27/034
715/723

(Continued)

FOREIGN PATENT DOCUMENTS

JP H10-191155 A 7/1998
JP 2003-244531 A 8/2003

(Continued)

OTHER PUBLICATIONS

Chinese Office Action issued on Mar. 3, 2017 in corresponding Chinese Patent Application No. 201410575750.1 together with English translation, 16 pages.

(Continued)

*Primary Examiner* — Vincent Rudolph
*Assistant Examiner* — Michael Burleson
(74) *Attorney, Agent, or Firm* — Carter, DeLuca, Farrell & Schmidt, LLP

(57) ABSTRACT

To improve operability for a user who uses an image processing apparatus which images an original document and displays an image indicating the imaged original document, a camera scanner causes a displaying device to display a remaining image corresponding to the image indicating the original document at a position where the original document was put, and, when detecting that an original document enters a detecting region, causes the displaying device to display a thumbnail image of the remaining image such that the thumbnail image does not overlap the original document which enters the detecting region.

17 Claims, 45 Drawing Sheets

(56) References Cited

U.S. PATENT DOCUMENTS

2012/0254773 A1* 10/2012 Viswanathan ........ G06F 3/0483
715/753

FOREIGN PATENT DOCUMENTS

| JP | 2005-252737 A | 9/2005 |
| JP | 2006-184333 A | 7/2006 |
| JP | 2007-067966 A | 3/2007 |
| JP | 2007-208821 A | 8/2007 |
| JP | 2012-053545 A | 3/2012 |
| JP | 2015-082805 A | 4/2015 |

OTHER PUBLICATIONS

Japanese Office Action issued on Aug. 1, 2017 in corresponding Japanese Patent Application No. 2013221101 together with English translation, 13 pages.

* cited by examiner

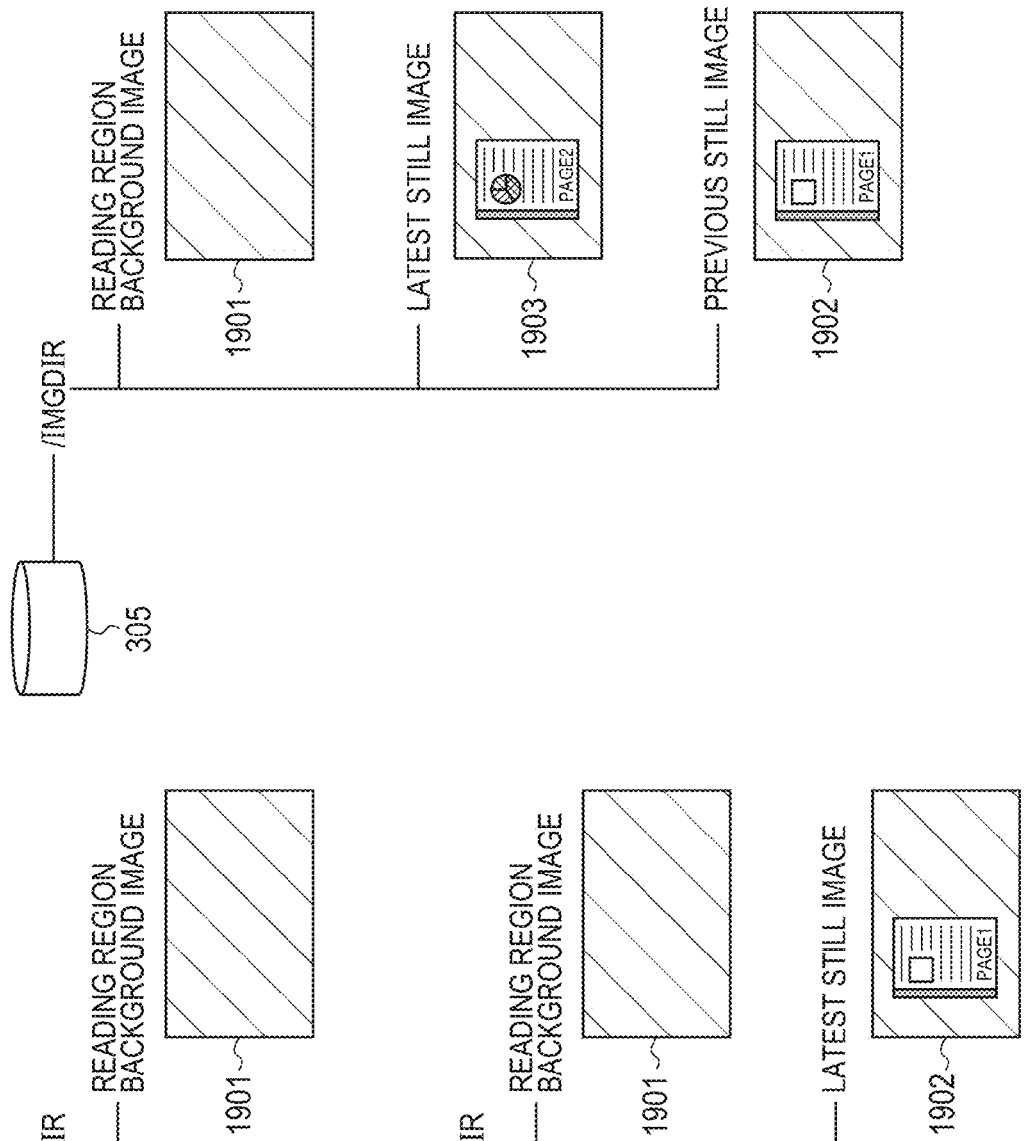

FIG. 7A

| DOCUMENT ATTRIBUTE | | | | | | | |
|---|---|---|---|---|---|---|---|
| NUMBER OF ORIGINAL DOCUMENTS | | | DIRECTORY NAME | | | | |
| 1 | | | /DOCDIR | | | | |
| IMAGE ATTRIBUTE | | | | | | | |
| NO. | DISPLAY COORDINATES | IN DISPLAYING | WIDTH | HEIGHT | FORMAT | COLOR SPACE | FILE NAME |
| 1 | P11, P12, P13 | TRUE | W1 | H1 | RAW | RGB | IMG_0001 ~2011 |

FIG. 7B

| DOCUMENT ATTRIBUTE | | | | | | | |
|---|---|---|---|---|---|---|---|
| NUMBER OF ORIGINAL DOCUMENTS | | | DIRECTORY NAME | | | | |
| 2 | | | /DOCDIR | | | | |
| IMAGE ATTRIBUTE | | | | | | | |
| NO. | DISPLAY COORDINATES | IN DISPLAYING | WIDTH | HEIGHT | FORMAT | COLOR SPACE | FILE NAME |
| 1 | P11, P12, P13 | FALSE | W1 | H1 | RAW | RGB | IMG_0001 ~2011 |
| 2 | P21, P22, P23 | TRUE | W2 | H2 | RAW | RGB | IMG_0002 ~2012 |

FIG. 7C

| DOCUMENT ATTRIBUTE | | | | | | | |
|---|---|---|---|---|---|---|---|
| NUMBER OF ORIGINAL DOCUMENTS | | | DIRECTORY NAME | | | | |
| 3 | | | /DOCDIR | | | | |
| IMAGE ATTRIBUTE | | | | | | | |
| NO. | DISPLAY COORDINATES | IN DISPLAYING | WIDTH | HEIGHT | FORMAT | COLOR SPACE | FILE NAME |
| 1 | P11, P12, P13 | FALSE | W1 | H1 | RAW | RGB | IMG_0001 ~2011 |
| 2 | P21, P22, P23 | FALSE | W2 | H2 | RAW | RGB | IMG_0002 ~2012 |
| 3 | P31, P32, P33 | TRUE | W3 | H3 | RAW | RGB | IMG_0003 ~2013 |

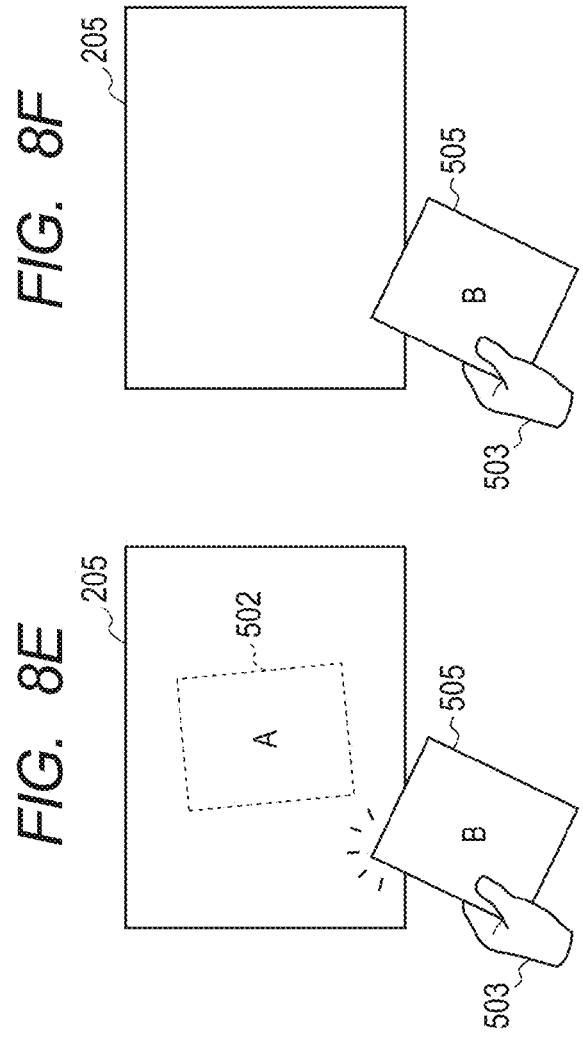

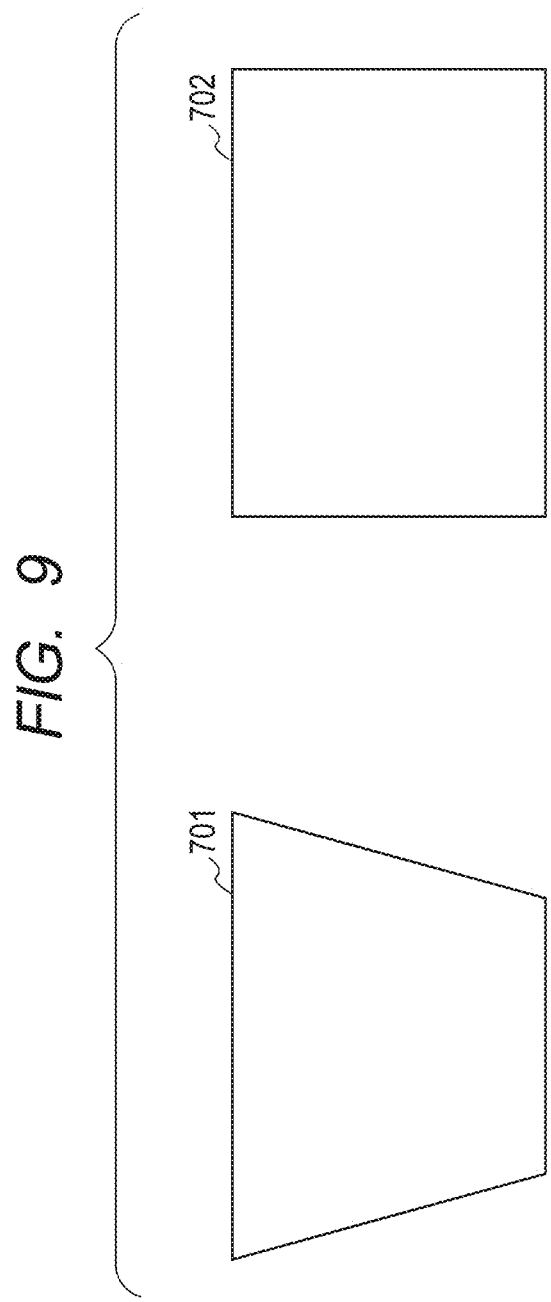

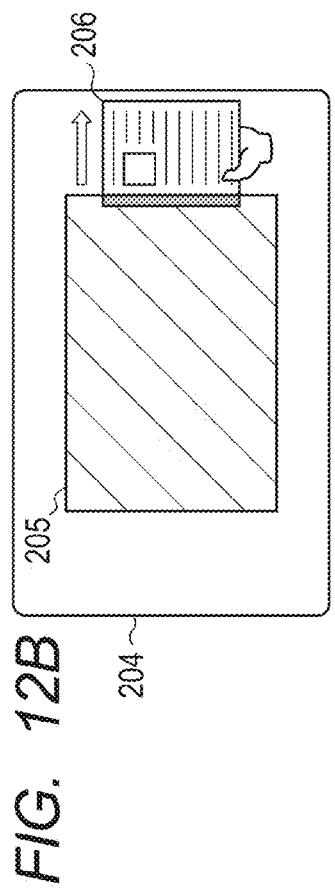
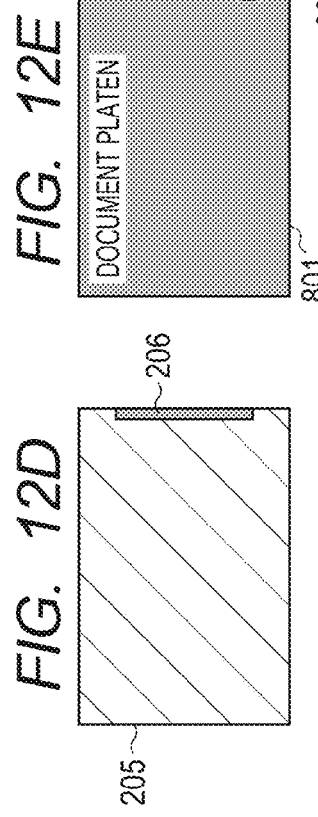
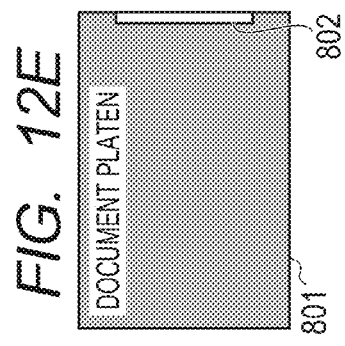
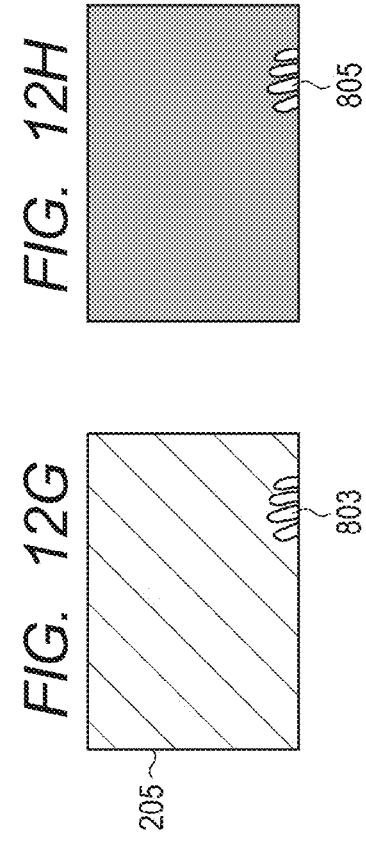
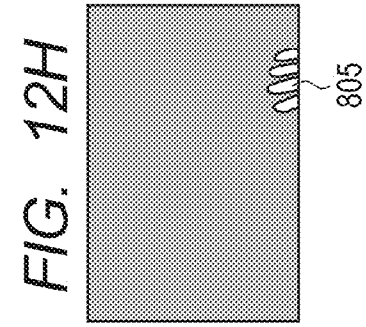
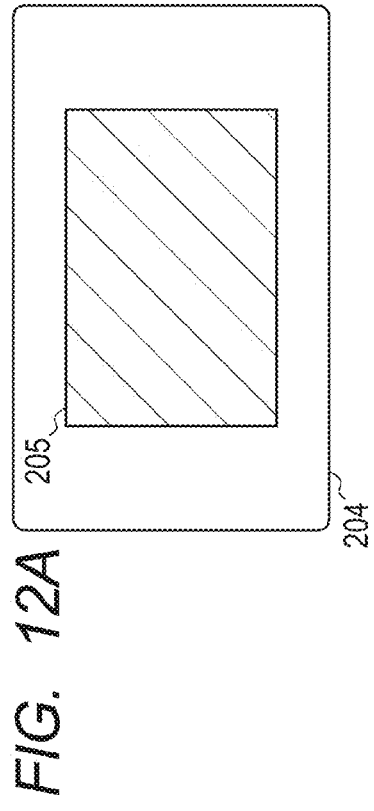
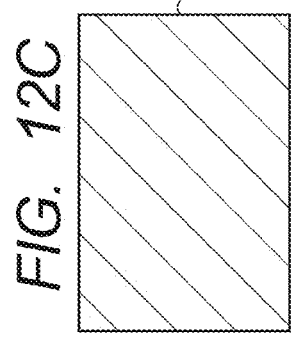
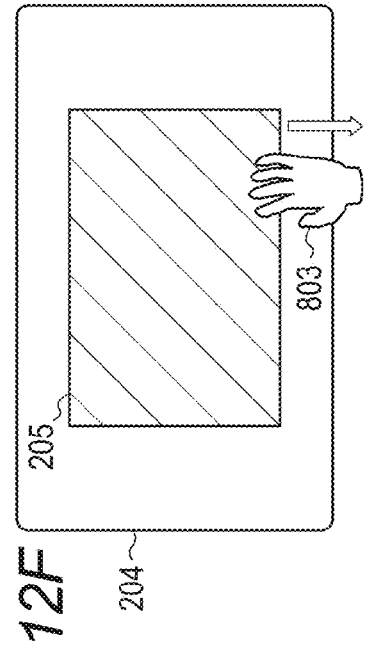

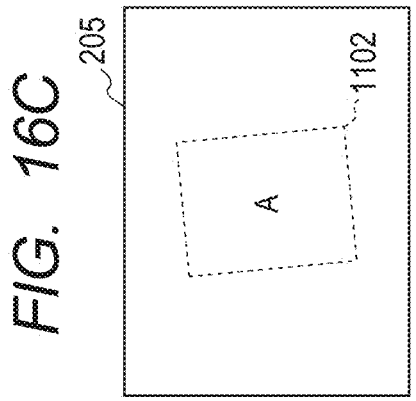
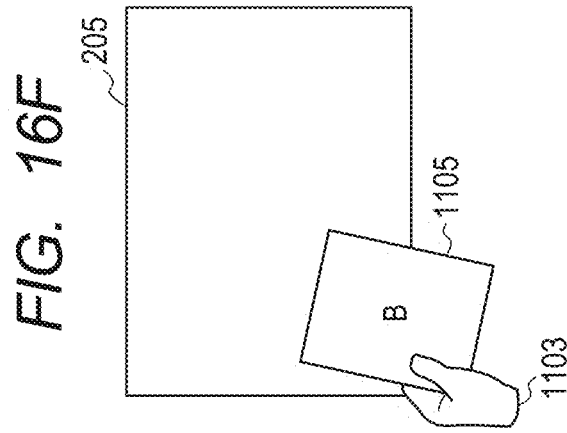
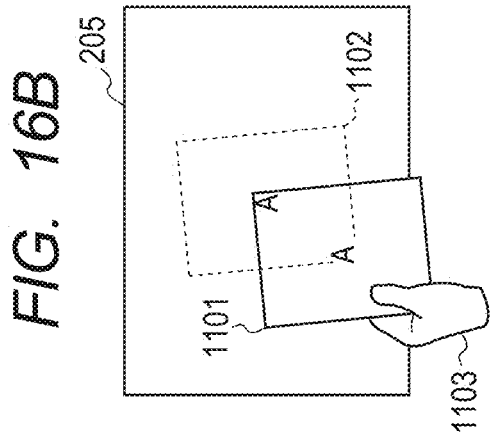
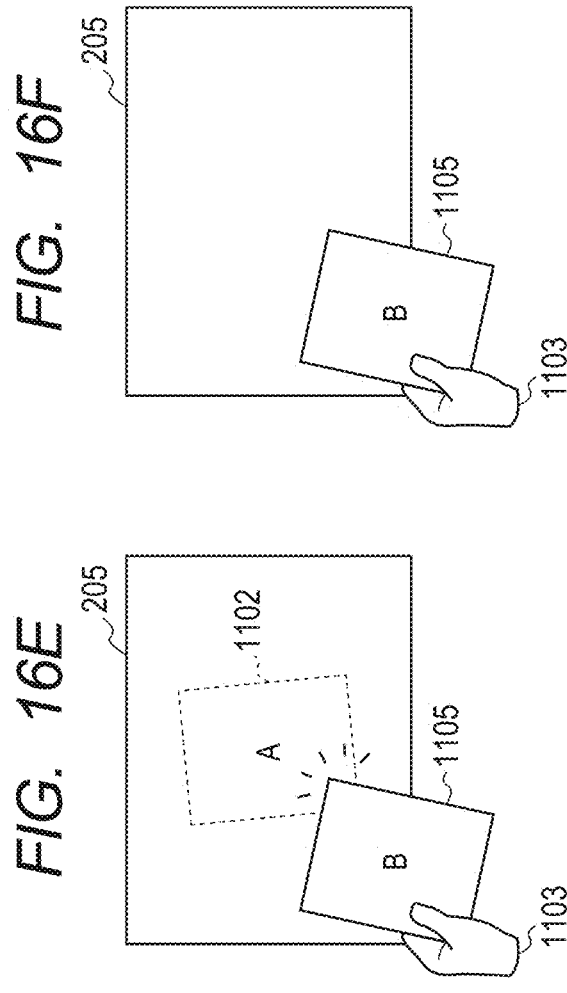
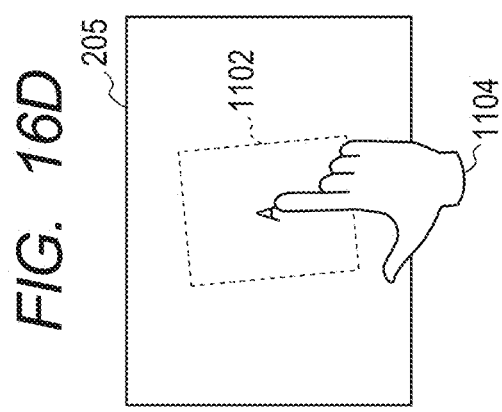

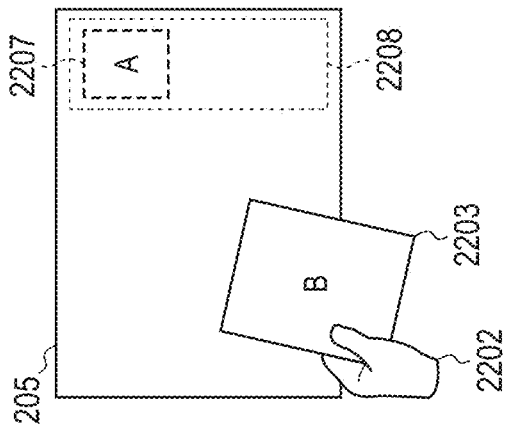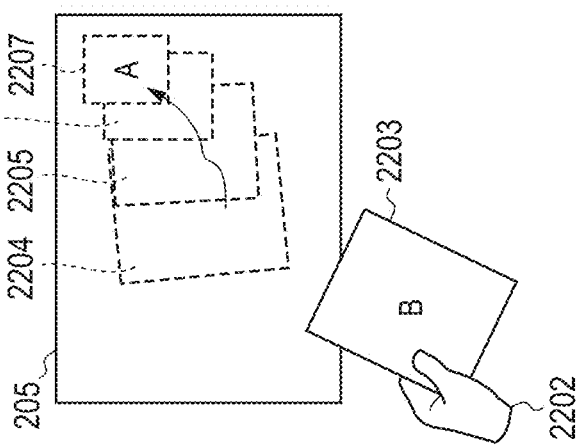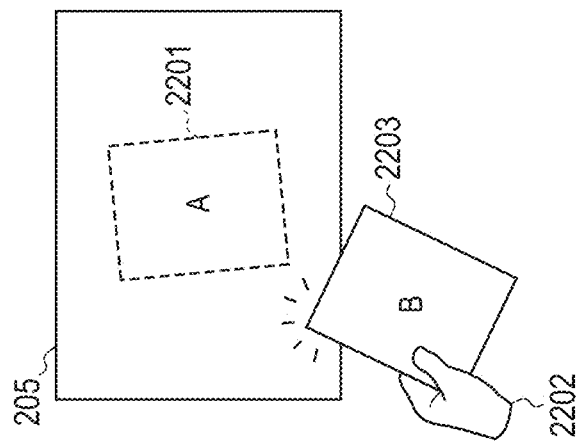

FIG. 27

| DOCUMENT ATTRIBUTE | | | | | | | | | |
|---|---|---|---|---|---|---|---|---|---|
| NUMBER OF ORIGINAL DOCUMENTS | | | DIRECTORY NAME | | | | | | |
| 2 | | | /DOCDIR | | | | | | |

| IMAGE ATTRIBUTE | | | | | | | | | |
|---|---|---|---|---|---|---|---|---|---|
| NO. | DISPLAY COORDINATES | IN DISPLAYING | WIDTH | HEIGHT | FORMAT | COLOR SPACE | FILE NAME | SMN COORDINATES | SMN IN-DISPLAYING | SMN NAME |
| 1 | P11, P12, P13 | FALSE | W1 | H1 | RAW | RGB | IMG_001 | PS11, PS12 | TRUE | SMN_0001 — 2401 |
| 2 | P21, P22, P23 | TRUE | W2 | H2 | RAW | RGB | IMG_002 | — | FALSE | — — 2402 |

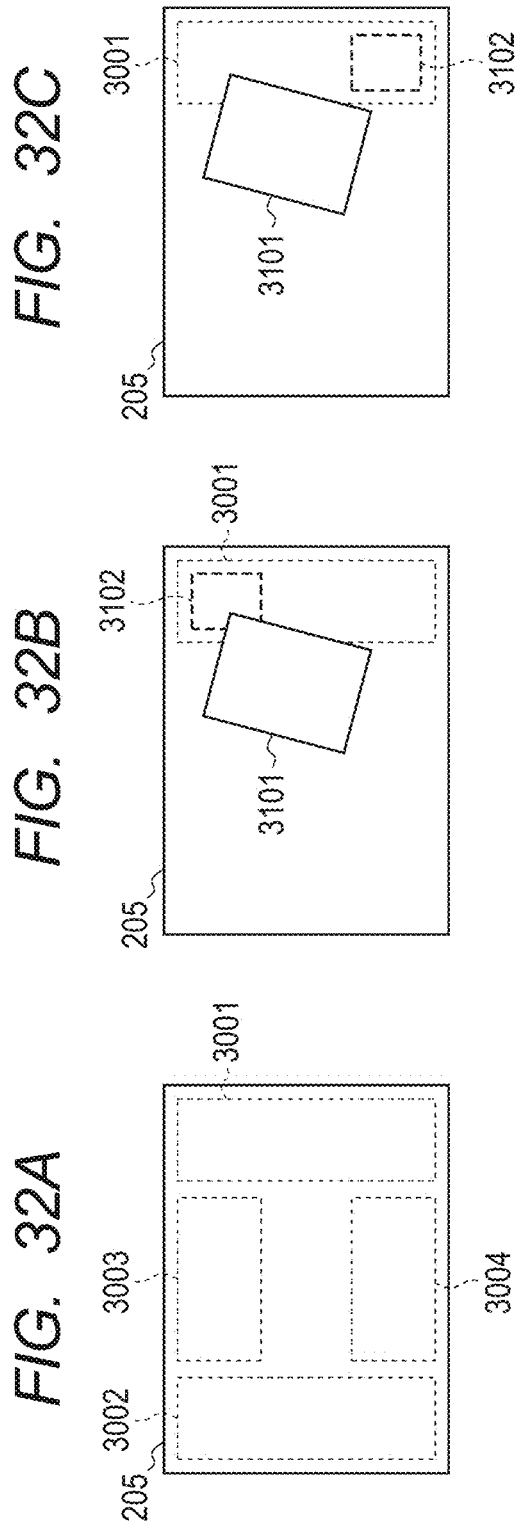

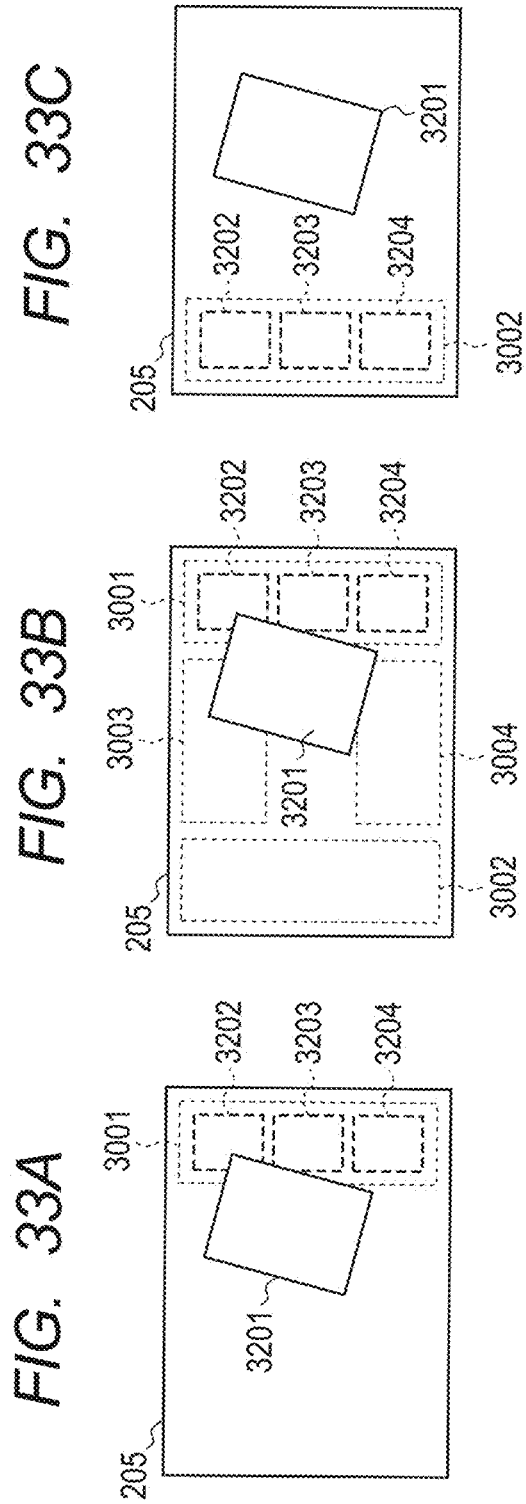

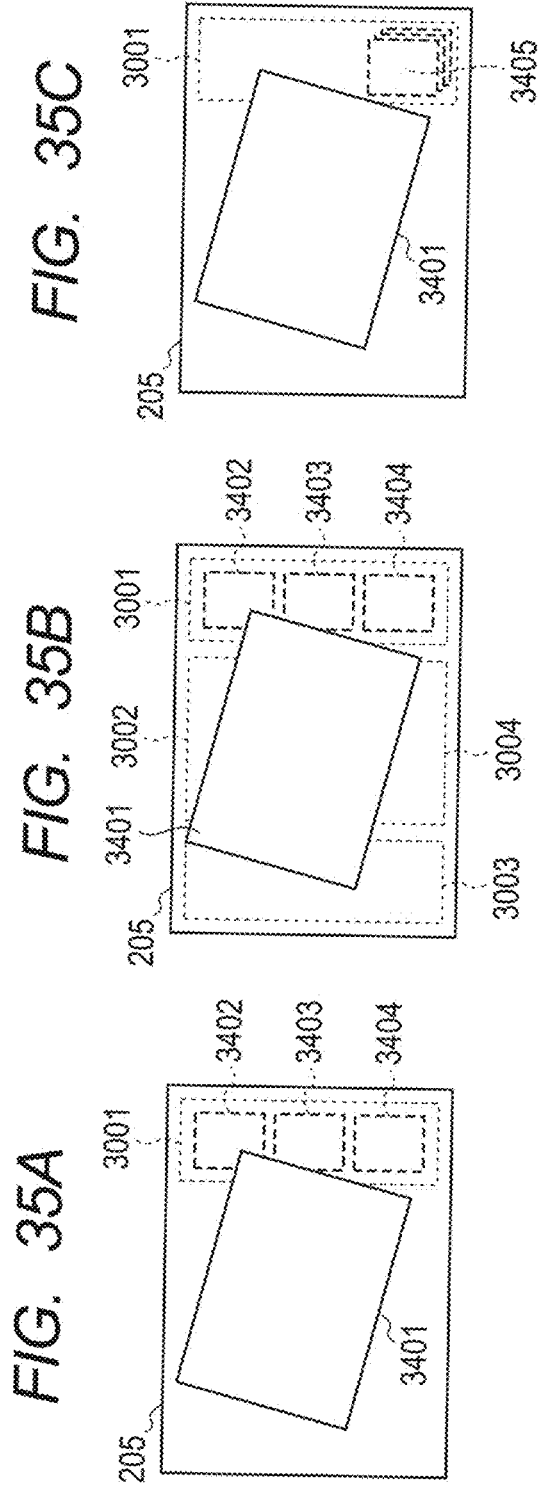

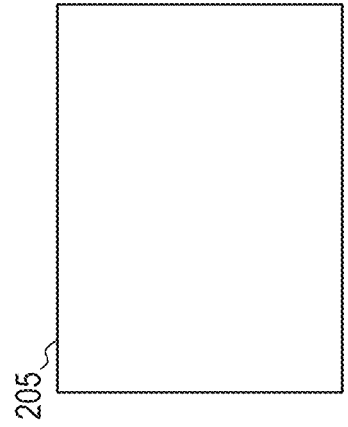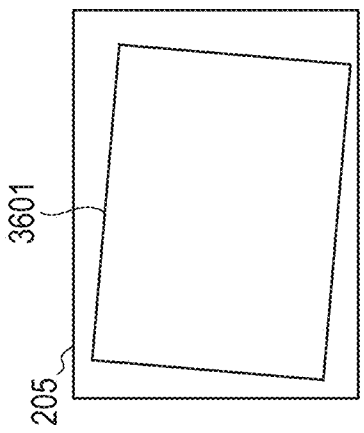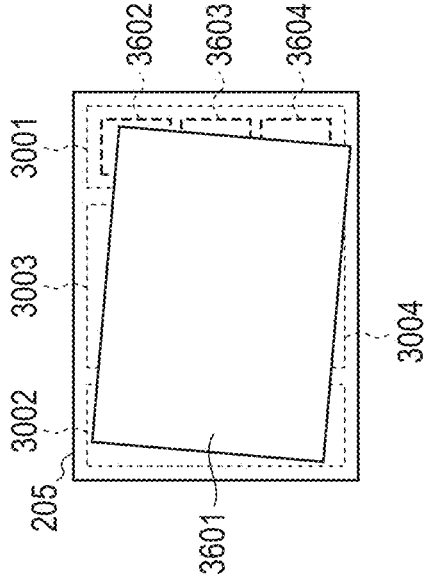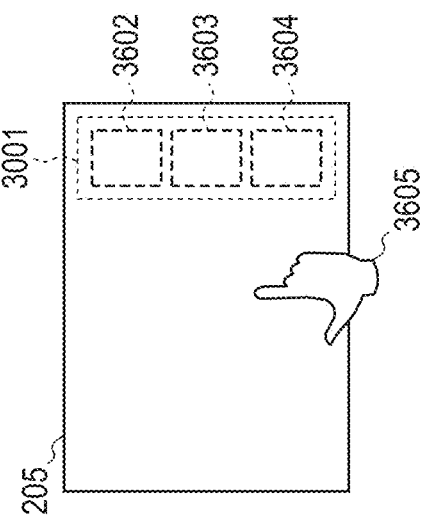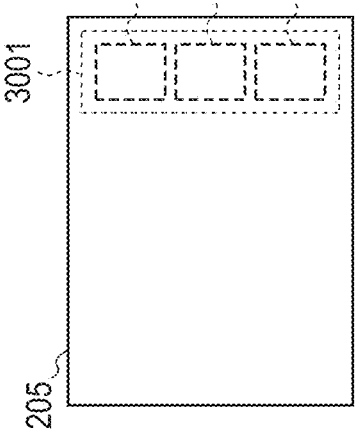

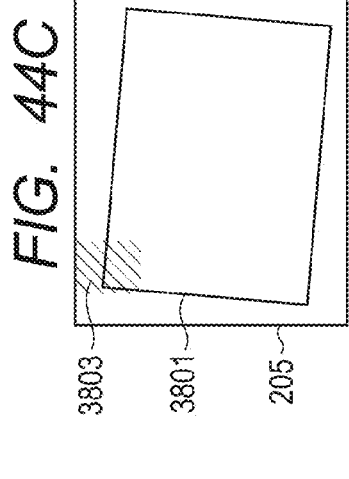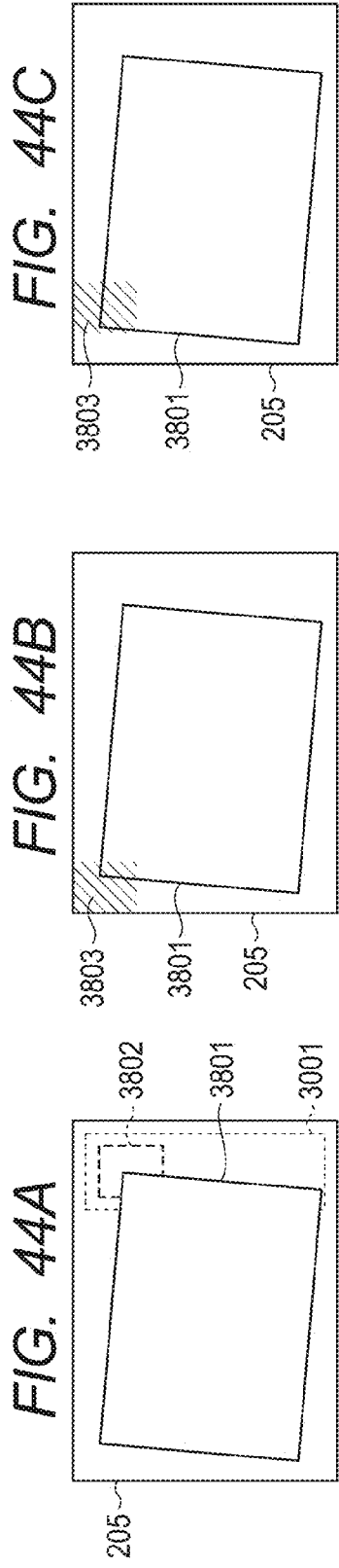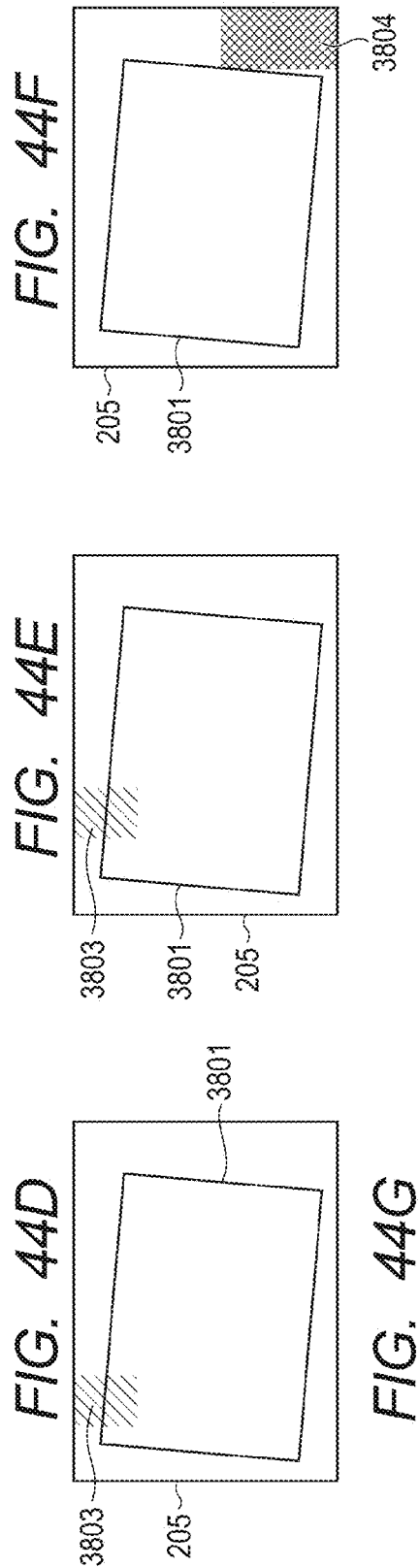

IMAGE PROCESSING APPARATUS, CONTROLLING METHOD THEREOF, AND PROGRAM

BACKGROUND OF THE INVENTION

Field of the Invention

The present invention relates to an image processing apparatus, a controlling method of the image processing apparatus, and a program for the controlling method.

Description of the Related Art

When scanning a plurality of original documents with a conventional multifunction machine having a flatbed scanner, it is necessary to read the original document one by one and then start scanning the read original document. That is, it is necessary to perform the complicated procedure of setting the original document one by one on a flat-bed document glass platen, opening and closing the cover of the document glass platen before and after setting the original document, and depressing a reading start button for the scanning.

When scanning a plurality of original documents with a multifunction machine having an ADF (automatic document feeder), it only has to set the original documents to the ADF in a lump, and then depress a reading start button. Therefore, it is possible to skip the above complicated procedure.

However, such an operation of using the multifunctional machine having the ADF cannot deal with a case of performing a different process to each of a plurality of original documents. For example, the above operation cannot deal with a case of scanning an original document A including characters and images in color and scanning a next original document B including only characters in monochrome. In addition, when performing the above different processes to the plurality of original documents with the flat-bed multifunction machine, it is necessary to perform the above complicated procedure to each original document and it is also necessary to perform the setting before scanning each original document.

Moreover, when a user confirms the contents of a scanned image, there is a trouble for the user to open a preview screen after performing the scanning and then select the scanned data for preview.

To reduce such troubles necessary when performing scanning, there is a technique of, in a camera scanner of imaging an original document placed on a document platen, detecting that the original document rests on the document platen and then imaging the original document at rest (e.g., Japanese Patent Application Laid-Open No. 2007-208821).

According to the above technique, since it is possible to perform the scanning only by putting the original document on the document platen, it is possible to highly reduce the trouble in the scanning including opening/closing of the cover of the document platen, depressing of buttons, and the like.

Besides, to reduce a trouble of confirmation of the contents of an original document, there is a technique of displaying the original document read by a camera on a document platen (e.g., Japanese Patent Application Laid-Open No. 2005-252737, or Japanese Patent Application Laid-Open No. 2012-053545).

In the technique disclosed in Japanese Patent Application Laid-Open No. 2005-252737, a document platen of a camera scanner is used as a display, and the image of an imaged original document is displayed on the display for a predetermined time to enable a user to easily confirm the content of the imaged original document, thereby improving operability.

In the technique disclosed in Japanese Patent Application Laid-Open No. 2012-053545, an electronic medium projected by a projector and a paper original document are overlapped and imaged to generate data in which the electronic medium and the data of the paper original document have been combined, and the generated data is projected on the position same as that to which electronic medium is projected.

Here, it is assumed that, in a system of continuously reading original documents by camera scanning using the rest detection as in Japanese Patent Application Laid-Open No. 2007-208821 while confirming the respective contents of the original documents, a different process such as color setting or the like is performed to the confirmed original document for each scanning.

In such a case, if display is performed only for a predetermined time as in the technique disclosed in Japanese Patent Application Laid-Open No. 2005-252737, there is a possibility that a displayed original document disappears before the operation for this original document is completed.

Besides, when it intends to read a next original document while displaying scanned data on a display as in the technique disclosed in Japanese Patent Application Laid-Open No. 2005-252737 or while projecting scanned data by a projector as in the technique disclosed in Japanese Patent Application Laid-Open No. 2012-053545, the original document intended to be read and the image displayed or projected overlap each other. Thus, a recognition rate of the original document deteriorates.

On the other hand, there is a technique of, by hiding (i.e., making a non-displaying state) a projected image at the timing of manual imaging by a camera, not reading a projected image corresponding to an image other than an image intended to be read (e.g., Japanese Patent Application Laid-Open No. 2006-184333). However, in the technique disclosed in Japanese Patent Application Laid-Open No. 2006-184333, since the projected image is not displayed merely at the timing of the manual imaging by the camera, it is still necessary to perform an operation for each page when continuously imaging original documents.

Therefore, an object of the present invention is to provide an image processing apparatus which improves operability for a user who uses the image processing apparatus of imaging an original document and displaying the imaged original document, a controlling method for the image processing apparatus, and a program to be used for performing the controlling method.

SUMMARY OF THE INVENTION

To achieve the above object, in the present invention, there is provided an image processing apparatus which is equipped with an imaging device of imaging an imaging region in which an original document can be put and a displaying device capable of displaying an image, and is characterized by comprising: an extracting unit configured to extract, from an image obtained by imaging with the imaging device the imaging region in which the original document has been put, original image data indicating an image of the original document; a remaining image displaying unit configured to cause the displaying device to display a remaining image which is generated from the original image data extracted by the extracting unit and corresponds to the image of the original document, at a position where the original document was put; a detecting unit configured to detect that the original document enters a detecting region for detecting the original document; and a thumbnail image displaying unit configured to, in response to the detection by the detecting unit that the original document enters the detecting region, cause the displaying device to display a thumbnail image of the remaining image such that the thumbnail image does not overlap the original document which enters the detecting region.

According to the present invention, the remaining image which corresponds to the image indicating the original document is displayed at the position where the original document was put, and, if it is detected that the original document enters the detecting region, the thumbnail image of the remaining image is displayed such that the thumbnail image does not overlap the original document which entered the detecting region. Thus, since the thumbnail image which serves as the remaining image for confirmation is automatically displayed each time, it is possible to improve operability for a user who uses the image processing apparatus which images the original document and displays the image indicating the imaged original document.

Further features of the present invention will become apparent from the following description of exemplary embodiments with reference to the attached drawings.

BRIEF DESCRIPTION OF THE DRAWINGS

FIGS. 5A, 5B and 5C are diagrams illustrating constitutions of recording regions in an HDD (hard disk drive) of FIG. 3, to which a reading region background image obtained by imaging a reading region in FIG. 2 is stored.

FIGS. 7A, 7B and 7C are diagrams illustrating document attribute information and image attribute information to be stored in an RAM (random-access memory) of FIG. 3.

FIGS. 8A, 8B, 8C, 8D, 8E and 8F are diagrams for describing examples of original document handling and display images.

FIG. 9 is a diagram illustrating an image obtained by imaging with a camera and an image after projective transformation.

FIGS. 12A, 12B, 12C, 12D, 12E, 12F, 12G and 12H are diagrams for describing a method of detecting frame-in or frame-out.

FIGS. 16A, 16B, 16C, 16D, 16E and 16F are diagrams for describing examples of original document handling and display images.

FIGS. 18A, 18B and 18C are diagrams, in which FIG. 18A illustrates the coordinates of original image data, FIG. 18B illustrates an example of a display image, and FIG. 18C illustrates a remaining image 2102 extracted from a remaining image region 2101 in a reading region 205.

FIGS. 26A, 26B and 26C are diagrams for describing examples of original document handling and display images.

FIG. 27 is a diagram illustrating document attribute information and image attribute information which are generated when a thumbnail image to be stored in the RAM of FIG. 3 is generated.

FIGS. 32A, 32B and 32C are diagrams, in which FIG. 32A illustrates predetermined regions in which thumbnail images are displayed in the reading region 205, FIG. 32B illustrates an aspect that an original document overlaps the thumbnail image displayed in the region, and FIG. 32C illustrates an aspect that the position to which the thumbnail image is arranged is changed.

FIGS. 33A, 33B and 33C are diagrams illustrating an aspect that the original document overlaps the predetermined region which is filled with the thumbnail images.

FIGS. 35A, 35B and 35C are diagrams illustrating an aspect that the thumbnail images are displayed in a lump.

FIGS. 37A, 37B, 37C, 37D and 37E are diagrams illustrating an aspect that the thumbnail image is too reduced in size in the reduction process.

FIGS. 44A, 44B, 44C, 44D, 44E, 44F and 44G are diagrams illustrating an aspect that a region in which the thumbnail image can be arranged is searched for.

DESCRIPTION OF THE EMBODIMENTS

Preferred embodiments of the present invention will now be described in detail in accordance with the accompanying drawings.

First Embodiment

Figure 1:
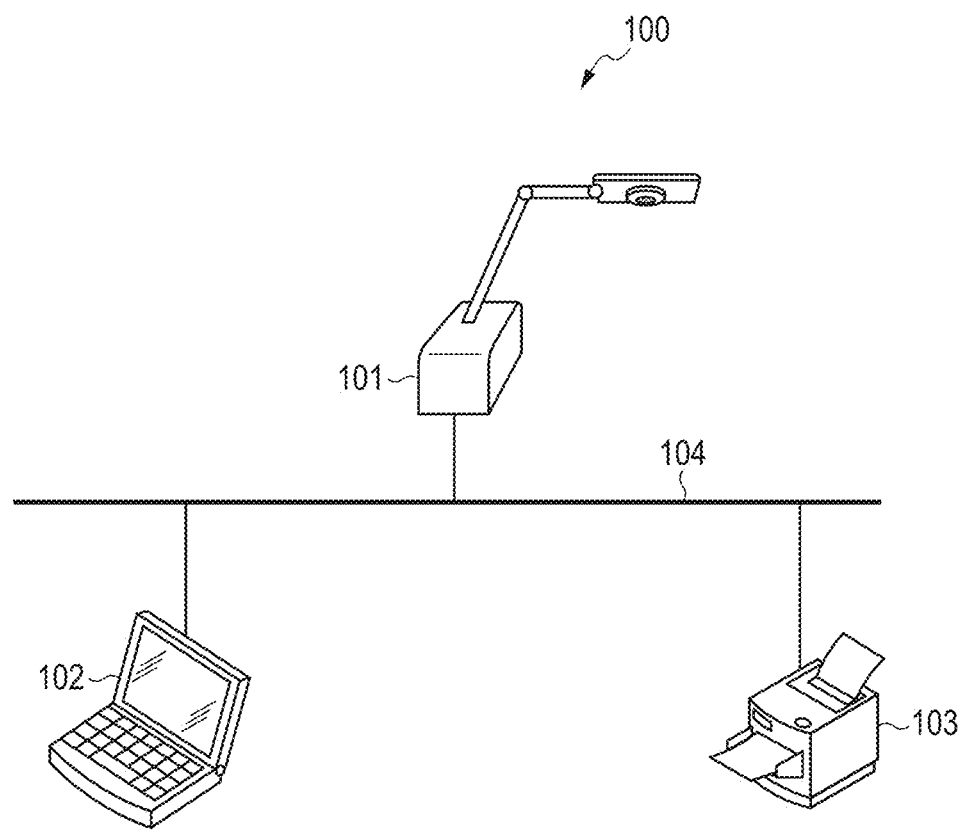
FIG. 1 is a schematic diagram illustrating a scanner system including a camera scanner according to an embodiment of the present invention.

FIG. 1 is a schematic diagram illustrating a scanner system 100 including a camera scanner 101 according to the embodiment of the present invention.

In FIG. 1, the camera scanner 101, which is connected to a host computer 102 and a printer 103 through a network 104, can perform a scanning function for reading an image from the camera scanner 101 and a printing function for outputting scanned data to the printer 103 in response to an instruction from the host computer 102.

Besides, it is possible by directly instructing the camera scanner 101 to perform the scanning function and the printing function, without using the host computer 102.

Figure 2:
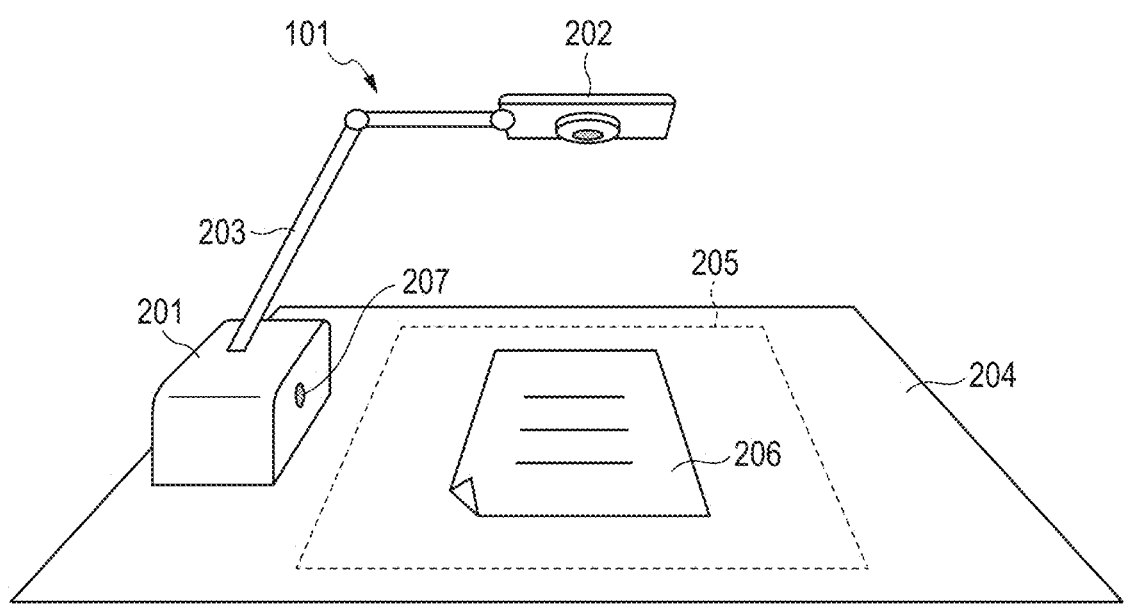
FIG. 2 is a diagram illustrating an outer appearance of the camera scanner of FIG. 1.

FIG. 2 is a diagram illustrating an outer appearance of the camera scanner 101 of FIG. 1.

In FIG. 2, the camera scanner 101 is roughly constituted by a controller unit 201, a camera 202, an arm unit 203 and a projector 207.

FIG. 2 shows an aspect that the camera scanner 101 is placed on an original document board 204. Here, the lens of the camera 202 serving as an imaging device is directed toward the original document board 204, and thus can read and image an image in a reading region 205 which is surrounded by the dotted line and used as an imaging region in which an original document can be put. In an example illustrated in FIG. 2, an original document 206 is put in the reading region 205.

The controller unit 201 serving as the main body of the camera scanner 101 and the camera 202 are linked to each other by the arm unit 203. The arm unit 203 can be freely bent and stretched by using a joint. The projector 207 serving as a displaying device displays an image by projecting the image for assisting an operation on the original document board 204 or the like. Also, it is possible to use an LCD (liquid crystal display) touch panel instead of the projector 207.

Figure 3:
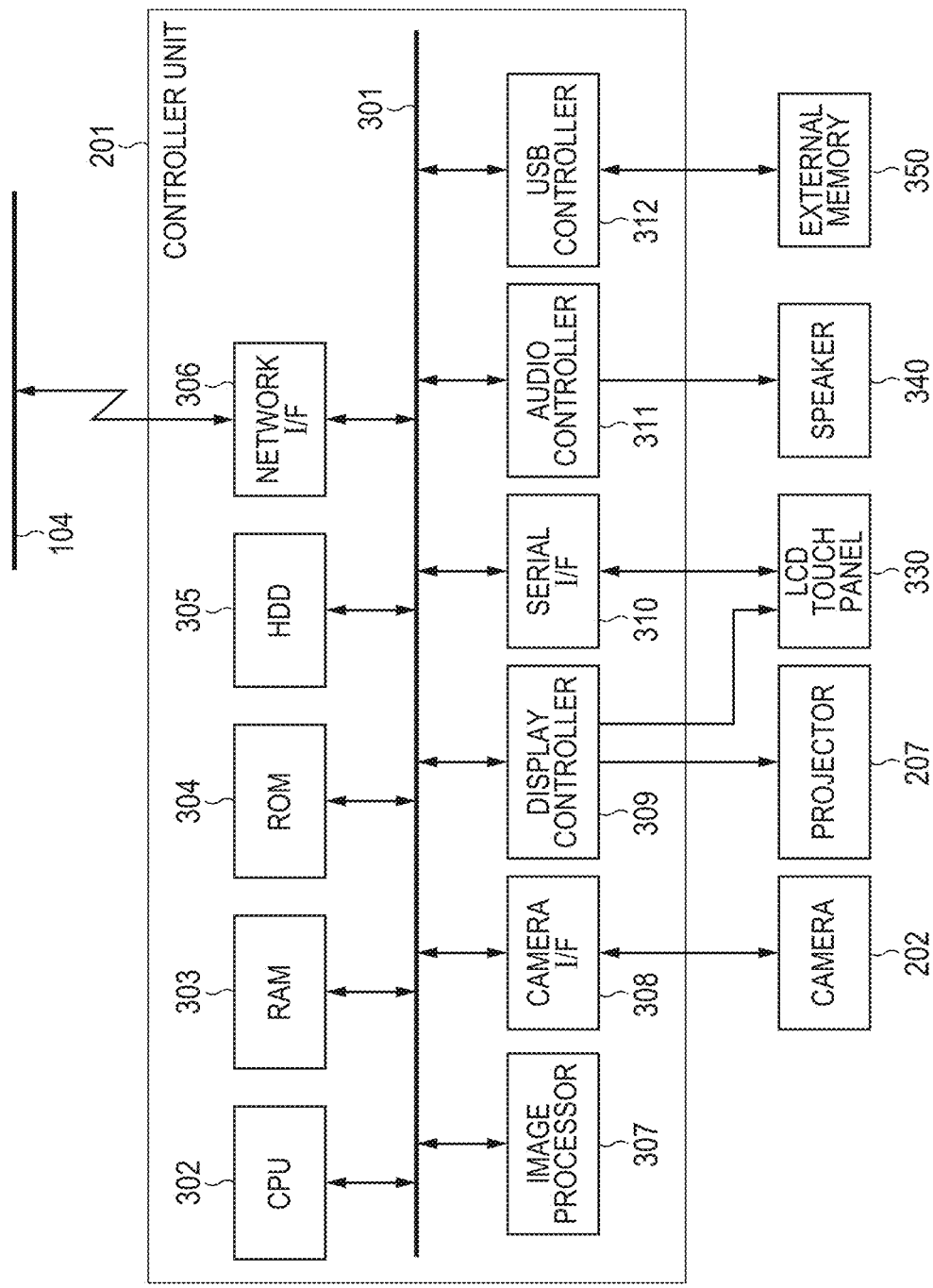
FIG. 3 is a schematic block diagram illustrating a controller unit of FIG. 2.

FIG. 3 is a schematic block diagram illustrating the controller unit 201 of FIG. 2.

In FIG. 3, the controller unit 201 is mainly constituted by a CPU (central processing unit) 302, a storage device, various controllers and various interfaces which are respectively connected to a system bus 301.

The CPU 302 controls overall operations of the controller unit 201. A RAM 303 is a volatile memory, and a ROM (read-only memory) 304 is a non-volatile memory. A boot program (code) for the CPU 302, and the like are stored in the ROM 304.

An HDD (hard disk drive) 305 has a large storage capacity as compared with that of the RAM 303. Control and other various programs for the camera scanner 101 to be executed by the controller unit 201 are stored in the HDD 305.

The CPU 302 executes the boot program code stored in the ROM 304 when starting the controller unit by power-on or the like. Here, the boot program code is the code to be used for reading the control program code stored in the HDD 305 and extracting the read code in the RAM 303.

If the boot program code is executed, then the CPU 302 performs various kinds of control by executing the control program code extracted in the RAM 303. Incidentally, processes of later-described flow charts are performed on condition that the CPU 302 executes the program codes stored in the HDD 305 and then extracted in the RAM 303.

Moreover, the CPU 302 stores the data to be used for the operation by the control program in the RAM 303, and reads the data from the RAM 303. Moreover, various data such as various settings necessary for the operation by the control program, image data generated by camera input, and the like can be stored in the HDD 305, and the stored various data are read and written by the CPU 302.

The CPU 302 performs communication with another device on the network 104 through a network I/F (interface) 306.

An image processor 307 reads the image data stored in the RAM 303, processes the read data, and writes back the processed data to the RAM 303. Here, the image processes to be performed by the image processor 307 include a rotating process, a magnification changing process, a color converting process, and the like.

A camera I/F 308, which is connected to the camera 202, obtains the image data from the camera 202 and writes the obtained data to the RAM 303, in response to an instruction from the CPU 302. Further, the camera I/F transmits a control commend from the CPU 302 to the camera 202 for setting and controlling the camera 202.

A display controller 309, to which the projector 207 and an LCD touch panel 330 are connected, causes each of the projector and the panel to display an image in response to an instruction from the CPU 302.

A serial I/F 310, which inputs and outputs a serial signal, is connected to the LCD touch panel 330. Thus, when the LCD touch panel 330 is depressed, the CPU 302 obtains the coordinates corresponding to the depressed position through the serial I/F 310.

An audio controller 311, which is connected to a speaker 340, converts audio data into an analog audio signal and further outputs a sound through the speaker 340, in response to an instruction of the CPU 302.

A USB (universal serial bus) controller 312 controls an external USB device in response to an instruction of the CPU 302. Here, an external memory 350 such as a USB memory, an SD (secure digital) card or the like is connected to the USB controller 312, so that data is read from and written into the external memory.

Figure 4:
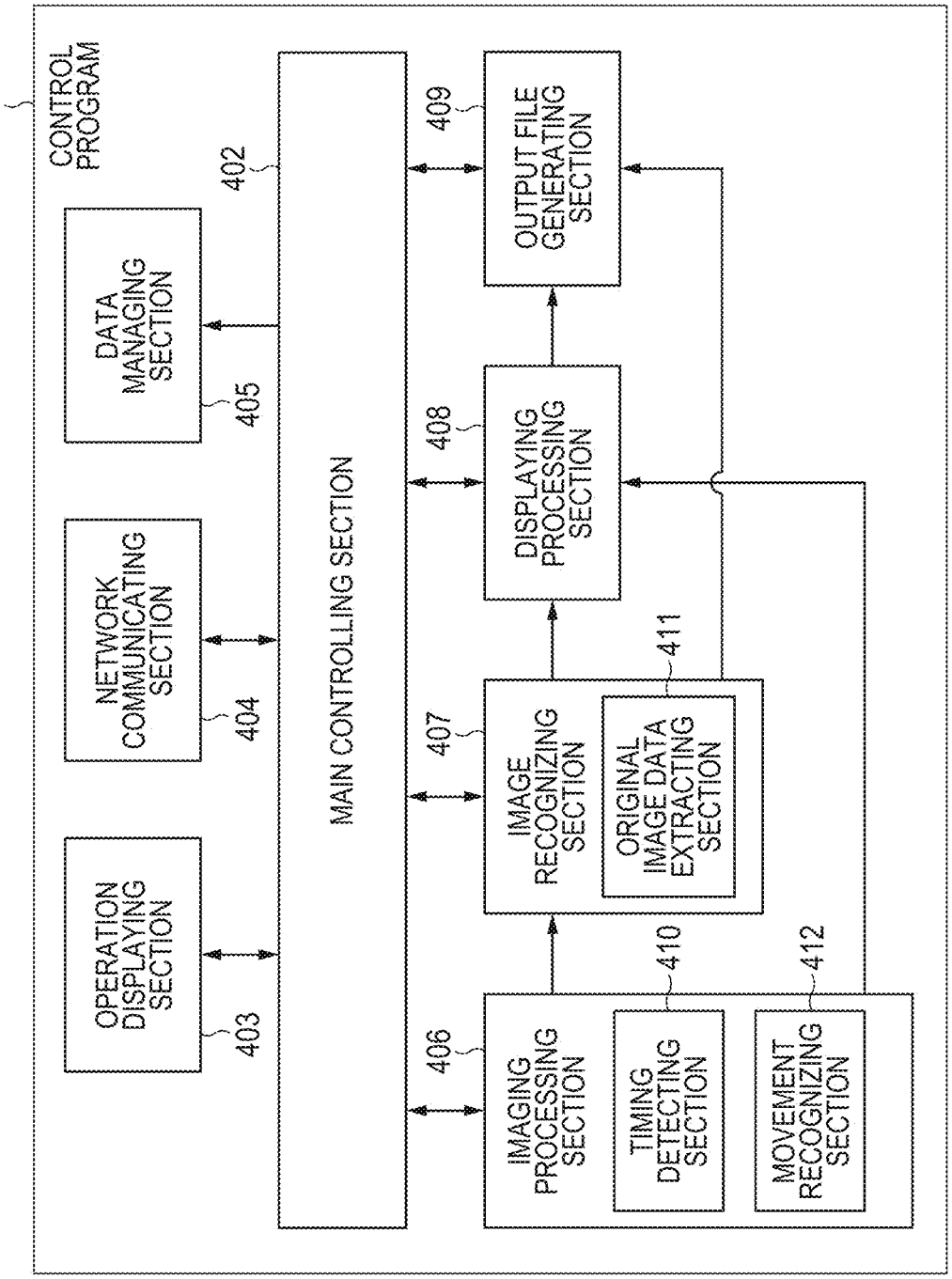
FIG. 4 is a block diagram illustrating a program for controlling the camera scanner of FIG. 1.

FIG. 4 is a block diagram illustrating a control program 401 for controlling the camera scanner 101 of FIG. 1.

In FIG. 4, as described above, the control program of the camera scanner 101, which has been stored in the HDD 305, is extracted to the RAM 303 and executed by the CPU 302 when starting the operation of the camera scanner.

The control program 401 for the camera scanner 101 includes a main controlling section 402, an operation displaying section 403, a network communicating section 404, a data managing section 405, an imaging processing section 406, an image recognizing section 407, a displaying processing section 408 and an output file generating section 409.

The main controlling section 402, which is the main body of the program, executes the camera scanner control program by controlling respective modules in the program. The operation displaying section 403 performs a drawing operation to the projector 207 or the LCD touch panel 330 through the display controller 309, in response to a drawing request from the main controlling section 402.

Further, the operation displaying section 403 receives the coordinates corresponding to the depressed position through the serial I/F 310 when the LCD touch panel 330 is depressed, correlates the content of the operation screen in the drawing operation with the received coordinates, decides the operation content of the depressed button or the like, and then notifies the main controlling section 402 of the decided operation content. The above operation displaying section 403 causes the displaying device to display, at a position where an original document was put, a remaining image which is generated based on original image data extracted from the original document and corresponds to the image indicating the original document. Further, as described later, if it is detected that an original document enters a detecting region, the operation displaying section 403 causes the displaying device to display a thumbnail image of the remaining image such that the thumbnail image does not overlap the original document which enters the detecting region.

The network communicating section 404 performs communication with another device on the network 104 by the TCP/IP (Transmission Control Protocol/Internet Protocol), through the network I/F 306.

The data managing section 405 stores, in a predetermined region of the HDD 305, setting data and the like necessary for executing the control program 401, and manages the stored data.

The imaging processing section 406 controls the camera 202 through the camera I/F 308, and transmits, to the image recognizing section 407, a camera image imaged at timing detected by a timing detecting section 410.

A command generated by a movement recognizing section 412 and corresponding to the camera image is transmitted to the displaying processing section 408.

The timing detecting section 410 detects frame-in timing, rest timing and frame-out timing of the original document. The above timing can be detected based on the camera image received from the camera 202.

Here, the frame-out timing may be set as timing immediately before the original document is framed out the reading region 205, timing when the original document starts to be framed out, or arbitrary timing between the above two timings.

The movement recognizing section 412 recognizes movement of a hand or an original document on a document platen by calculating an inter-frame difference of the camera image for each frame received from the camera 202, and converts detected movement into a previously correlated command.

Thus, it is possible to give an instruction to the camera scanner 101 by performing a gesture operation such as a hand-waving operation or the like toward the camera on the document platen. The above imaging processing section 406 detects that an original document enters the detecting region for detecting the original document.

The image recognizing section 407 receives the camera image from the camera 202, and recognizes the content of the received camera image.

An original image data extracting section 411 included in the image recognizing section 407 extracts original image data from the camera image imaged at the rest timing detected by the timing detecting section 410 and transmitted from the camera. The extracted original image data is stored in the RAM 303, and also stored and managed to a predetermined region of the HDD 305 by the data managing section 405. The original image data extracting section 411 extracts the original image data indicating the image of the original document from the image obtained by imaging with the imaging device the imaging region in which the original document has been put.

The displaying processing section 408 controls the timing of displaying the original image data stored in the RAM 303. More specifically, the displaying processing section instructs the operation displaying section 403 to display or hide (i.e., make a non-displaying state) original image data at a designated position, in response to an instruction received from the movement recognizing section 412 or the image recognizing section 407.

The output file generating section 409 converts the original image data recorded by the data managing section 405, adjusts the converted data to obtain an appropriate image, and then generates an output file of a predetermined data output format.

FIGS. 5A to 5C are diagrams illustrating constitutions of recording regions in the HDD 305 of FIG. 3, to which a reading region background image obtained by imaging the reading region 205 in FIG. 2 is stored.

More specifically, FIG. 5A is the diagram illustrating the recording region in which a reading region background image 1901 obtained by imaging the reading region 205 is stored.

In FIG. 5A, the reading region background image 1901 is stored in a directory of "IMGDIR".

As described later, since the imaging to the reading region 205 is repeatedly performed, the latest image obtained by imaging the reading region 205 is stored as the latest still image, and the image obtained by imaging the reading region immediately before obtaining the latest still image is stored as the previous still image. Incidentally, in regard to the image obtained by first imaging the reading region 205, any image obtained by imaging the reading region before then does not exist. Therefore, in this case, only the latest still image obtained by first imaging the reading region is stored.

FIG. 5B is the diagram illustrating the recording region in which a latest still image 1902 as above is stored. As illustrated, the latest still image 1902 is stored in the directory of "IMGDIR" same as the directory in which the reading region background image 1901 has been stored.

FIG. 5C is the diagram illustrating the recording region in which a latest still image 1903 and the previous still image 1902 as above are stored. As illustrated, the latest still image 1903 and the previous still image 1902 are stored in the directory of "IMGDIR" same as the directory in which the reading region background image 1901 has been stored.

Incidentally, since the latest still image 1902 in FIG. 5B is substituted with the new image obtained by next imaging the reading region, the latest still image 1902 is given as the previous still image 1902 in FIG. 5C.

The original image data extracting section 411 obtains, as the original image data, a difference between the reading region background image 1901 and the latest still image.

Figures 6A, 6B, 6C:
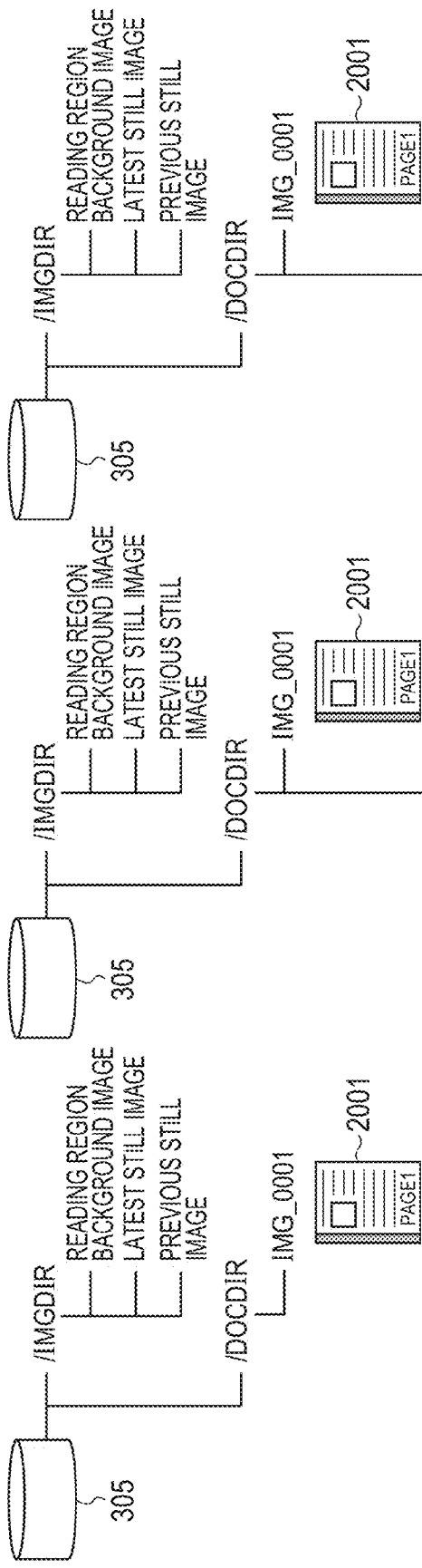
FIGS. 6A, 6B and 6C are diagrams illustrating constitutions of recording regions in the HDD of FIG. 3, to which original image data are stored.

FIGS. 6A to 6C are diagrams illustrating the constitutions of the recording regions in the HDD 305 of FIG. 3, to which the original image data are stored respectively.

In FIGS. 6A to 6C, the original image data is stored in a directory of "DOCDIR". More specifically, FIG. 6A shows that original image data 2001 indicating the first original document is stored as "IMG_0001".

FIG. 6B shows that original image data 2002 indicating the second original document is newly stored as "IMG_0002", and FIG. 6C shows that original image data 2003 indicating the third original document is newly stored as "IMG_0003".

FIGS. 7A to 7C are diagrams illustrating document attribute information and image attribute information to be stored in the RAM 303 of FIG. 3. Here, FIGS. 7A, 7B and 7C respectively correspond to FIGS. 6A, 6B and 6C.

FIG. 7A shows the document attribute information and image attribute information 2011 of the original image data indicating the first original document, FIG. 7B shows document attribute information, the image attribute information 2011 of the original image data indicating the first original document and image attribute information 2012 of the original image data indicating the second original document, and FIG. 7C shows document attribute information, the image attribute information 2011 of the original image data indicating the first original document, the image attribute information 2012 of the original image data indicating the second original document and image attribute information 2013 of the original image data indicating the third original document.

In FIGS. 7A to 7C, the document attribute information is constituted by the number of the original documents and the directory name. Here, the number of the original documents is the number of the read original documents, and the directory name is the storage destination of the document attribute information.

Besides, the image attribute information, which is created for each original image data, is constituted by "NO.", the display coordinates, the in-displaying information, the width, the height, the format, the color space and the file name.

In the image attribute information, "NO." is the serial number of the original image data, and the display coordinates are the value indicating the position where the original image data is displayed by the projector 207.

Figure 18C:
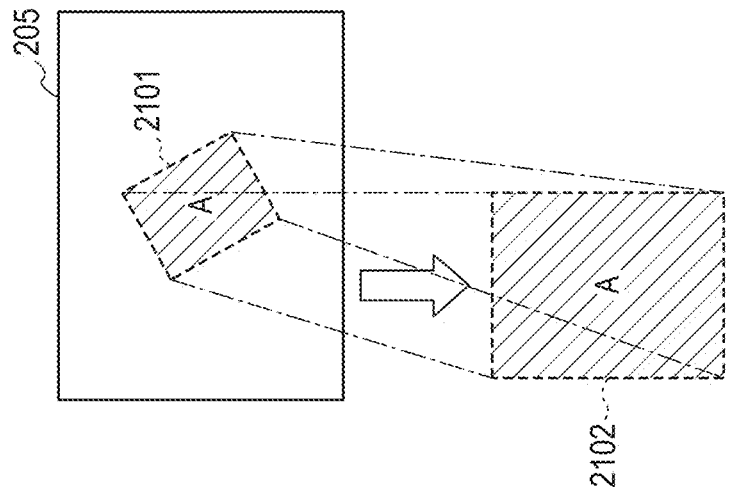
Figure 18B:
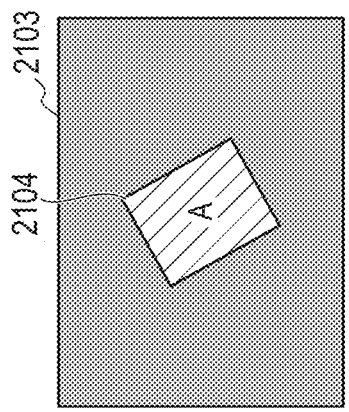
Figure 18A:
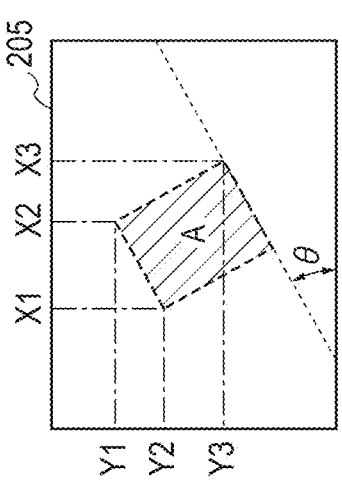

FIG. 18A is a diagram illustrating the coordinates of the original image data.

As illustrated in FIG. 18A, in the present embodiment, it is possible to uniquely identify the position for displaying the original image data by three points P11 (X1, Y2), P12 (X2, Y1) and P13 (X3, Y3). Besides, it is also possible to uniquely identify the position by using two points Q1 and Q2 and an angle θ between the two points and one side.

Here, the description is reverted to FIGS. 7A to 7C. The in-displaying information is indicated by "FALSE" or "TRUE". More specifically, "FALSE" indicates that information is not displayed by the projector 207, whereas "TRUE" indicates that information is being displayed by the projector 207.

The width and the height respectively indicate the width and the height of the original image data. The format indicates the format of the original image data, and "RAW" is given in the figure. The color space indicates the color space of the original image data, and "RGB" is given in the figure. The file name indicates the file name of the original image data.

FIGS. 8A to 8F are diagrams for describing examples of original document handling and display images.

FIG. 8A shows an aspect that a rest of an original document 501 is detected in the reading region 205 and imaging of the rested original document is performed.

If the imaging is performed, an image of the read original document is projected by the projector 207 on the same position as the position where the original document existed, such that the projected image overlaps the original document.

FIG. 8B shows an aspect that, if the original document 501 is removed by a hand 503, a remaining image 502 corresponding to the image of the read original document is projected on the position where the original document existed.

FIG. 8C shows an aspect that the remaining image 502 is being displayed in the reading region 205.

FIG. 8D shows an aspect that, by recognizing the hand from the image sent from the camera 202, an operation such as shifting, enlarging, reducing, printing, storing or the like of the remaining image 502 is performed by a hand 504. Incidentally, although the above operation is performed mainly by using the hand in the following description, the present invention is not limited to the hand. Namely, the operation may be performed by recognizing a specific physical medium such as a pen or the like.

FIG. 8E shows an aspect that a new original document 505 is framed in the reading region 205 in which the remaining image 502 is being displayed.

FIG. 8F shows an aspect that that the frame-in of the new original document 505 is detected, and the displayed remaining image 502 is hidden (or set to be in non-displaying state).

If the new original document 505 is put in the reading region 205 in this state, then the state is returned to the state that the original document can be read again. By repeatedly performing this operation, it is possible to prevent deterioration of a recognition rate caused by the phenomenon that the remaining image overlap the new original document when continuously reading the original documents, while leaving the remaining image capable of being operated.

FIG. 9 is a diagram illustrating an image obtained by the imaging with the camera 202 and the image after projective transformation.

Since the camera 202 is not strictly positioned immediately above the reading region 205, the shape of an imaged image 701 is distorted as illustrated in the figure. Therefore, the imaging processing section 406 calculates a parameter of projective transformation for transforming the distorted shape of the imaged image 701 to a rectangle.

Then, the imaging processing section 406 corrects the distorted image 701 to a rectangular image 702 by using the calculated projective transformation parameter.

Figure 10:
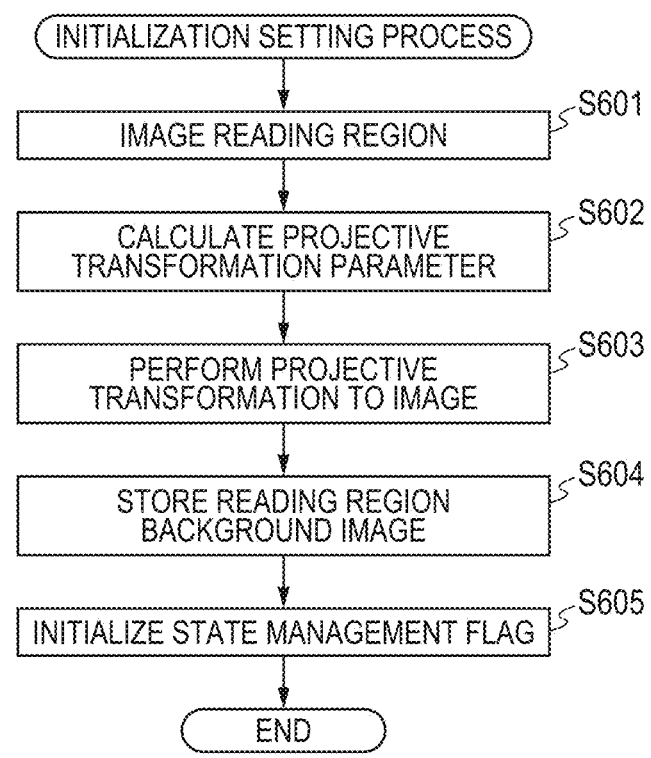
FIG. 10 is a flow chart indicating a procedure of an initialization setting process to be performed by an imaging processing section of FIG. 4.

FIG. 10 is a flow chart indicating a procedure of an initialization setting process to be performed by the imaging processing section 406 of FIG. 4. Here, it should be noted that the reference numerals (e.g., S601) shown in this figure respectively indicate the step numbers of the corresponding processes in the procedure.

In FIG. 10, the imaging processing section 406 images, as a background image, the reading region 205 on the original document board 204 in which any original document is not put (S601), and transfers the obtained image to the image recognizing section 407.

Next, the imaging processing section 406 calculates the projective transformation parameter described in FIG. 9 (S602), and corrects the distorted image to the rectangular image by performing the projective transformation to the image of the imaged reading region 205 with use of the calculated projective transformation parameter (S603).

Then, the imaging processing section 406 stores the reading region background image, which is the corrected image, to the HDD 305 through the data managing section 405 (S604).

Next, the imaging processing section 406 initializes a state management flag (S605), and ends the process.

Here, the state management flag includes a frame-in state flag indicating whether or not it is detected that an original document is framed in, and a frame-out state flag indicating whether or not it is detected that an original document is framed out.

Further, the state management flag includes a frame-in state flag indicating whether or not it is detected that a hand is framed in, and a frame-out state flag indicating whether or not it is detected that a hand is framed out.

Therefore, the state management flag includes the two frame-in state flags and the two frame-out state flags.

In the initialization in S605, the frame-in state flags for the original document and the hand are respectively initialized to "FALSE", and the frame-out state flags for the original document and the hand are respectively initialized to "TRUE".

In the present embodiment, since the original document and the hand are treated as the physical objects to be read in the reading region 205, the above flags are prepared respectively so as to correspond to the above two objects. However, it is possible to set a flag corresponding to another physical object.

Moreover, each time the number of the objects to be read in the reading region 205 is increased, the state management flag may be increased correspondingly.

If the above initialization setting process is ended, the timing detecting section 410 of the imaging processing section 406 performs a remaining image projecting process of, in a case where the original document newly entered the reading region 205 rests for a predetermined time, automatically imaging the original document and projecting its remaining image.

Figure 11:
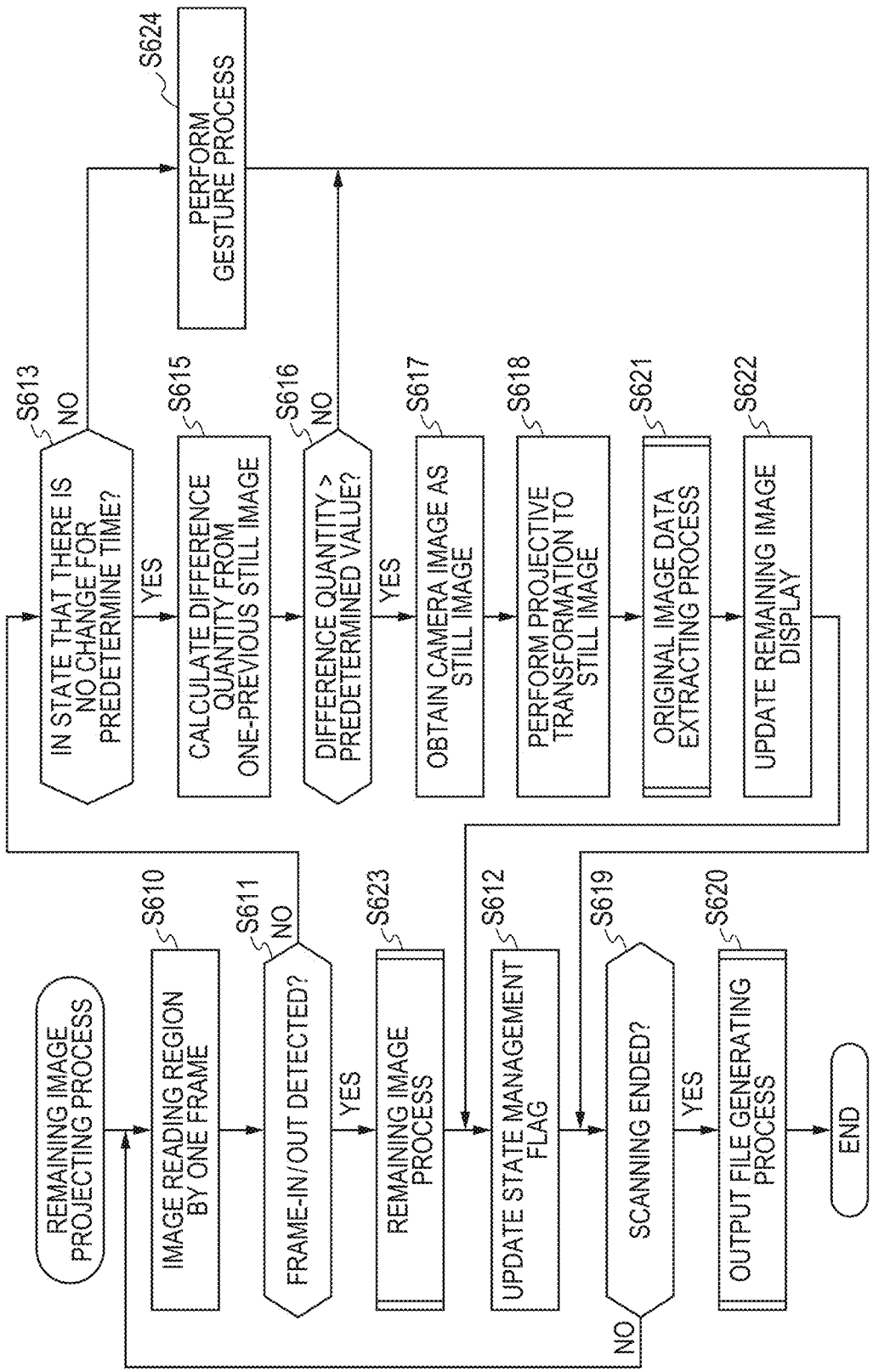
FIG. 11 is a flow chart indicating a procedure of a remaining image projecting process to be performed mainly by the imaging processing section and a timing detecting section of FIG. 4.

FIG. 11 is a flow chart indicating a procedure of the remaining image projecting process to be performed mainly by the imaging processing section 406 and the timing detecting section 410 of FIG. 4. Here, it should be noted that the reference numerals shown in this figure respectively indicate the step numbers of the corresponding processes in the procedure.

In FIG. 11, the imaging processing section 406 images the reading region 205 by one frame from the camera 202 (S610), and transfers the camera image obtained by the imaging to the timing detecting section 410.

Next, the timing detecting section 410 discriminates whether or not the frame-in or the frame-out of the physical object for the reading region 205 is detected, based on the camera image received from the camera 202 (S611). Incidentally, how to detect the frame-in or the frame-out will be described later.

If the frame-in or the frame-out is detected in S611 (YES in S611), then the timing detecting section 410 decides whether or not the framed-in or framed-out physical object is the hand, and stores the decided result in the RAM 303.

Next, the timing detecting section 410 performs a later-described remaining image process (S623). Here, the remaining image process is the process of, when the remaining image is being displayed, hiding the displayed remaining image (setting the displayed remaining image to be in the non-displaying state) if the occasion arises.

Then, the timing detecting section 410 updates the state management flag in response to the detection of the frame-in or the frame-out in S611 (S612).

More specifically, if the frame-in of the physical object is detected in S611, the frame-in state flag corresponding to the physical object is set to "TRUE", whereas the frame-out state flag is set to "FALSE". On the other hand, if the frame-out of the physical object is detected, the frame-in state flag and the frame-out state flag are respectively set contrary to the above settings.

Next, the main controlling section 402 discriminates whether or not the scanning for all the original documents is ended (S619). Here, the end is discriminated based on a scan end instruction transmitted from the host computer 102 through the network I/F 306, an end instruction input from the LCD touch panel 330, timer setting, or the like.

If it is discriminated in S619 that the scanning is not ended (NO in S619), the process is returned to S610.

On the other hand, if it is discriminated in S619 that the scanning is ended (YES in S619), a later-described output file generating process is performed (S620), and then the process is ended.

Further, if the frame-in or the frame-out is not detected as the result of the discrimination in S611 (NO in S611), then the timing detecting section 410 decides whether or not it is in a state that there is no change for a predetermined time (S613).

Here, the process in this step is the process of discriminating whether or not the original document has been rested or removed. Further, in this step, a change is discriminated using an image change quantity indicating how much the camera image obtained by newly imaging the region changes from the camera image obtained by previously imaging the region.

More specifically, if the image change quantity is within a predetermined range for the predetermined time, it is discriminated that there is no change.

If it is decided in S613 to be not in the state that there is no change for the predetermined time, that is, if it is decided that there is a change in the predetermined time (NO in S613), this means the state that the original document or the hand is shifted. Thus, the imaging processing section 406 performs a gesture process (S624), and the process is advanced to S619.

In the gesture process, processes according to how to shift the original document or the hand are performed. For example, the processes include enlarging, reducing, shifting, operating, editing and printing of the remaining image by shifting of the hand.

On the other hand, if it is decided in S613 to be in the state that there is no change for the predetermined time (YES in S613), the timing detecting section 410 calculates a difference quantity between the camera image imaged in S610 and a still image obtained by the imaging in S617 when the previous remaining image projecting process was performed (S615). Incidentally, if the process in S615 is first performed after this remaining image projecting process is started, the difference quantity between the camera image and the image of the reading region 205 obtained by the imaging in S601 is calculated.

Next, the timing detecting section 410 discriminates whether or not the calculated difference quantity is larger than a predetermined value (S616). Here, the predetermined value is equivalent to a value by which it is possible to discriminate two images obtained by imaging an identical object as the same image. For example, the predetermined value is approximately equivalent to zero.

If it is discriminated in S616 that the calculated difference quantity is smaller than the predetermined value (NO in S616), this means that there is no change from the previous state, and the process is advanced to S619.

On the other hand, if it is discriminated in S616 that the calculated difference quantity is larger than the predetermined value (YES in S616), the timing detecting section 410 obtains, as the still image, the camera image obtained by the imaging in S610 (S617). Incidentally, at this stage, the still image is obtained irrespective of the rest and removal of the original document.

Next, the imaging processing section 406 performs the projective transformation to the obtained still image by using the projective transformation parameter calculated in S602 (S618).

Then, the imaging processing section 406 transfers the still image, which was subjected to the projective transformation, to the image recognizing section 407. The original image data extracting section 411 of the image recognizing section 407, which received the still image, performs a later-described original image data extracting process for extracting the original image data (S621). In S621, the original image data indicating the image of the original document is extracted from the image obtained by imaging, with the imaging device, the imaging region in which the original document has been put.

Next, the image recognizing section 407 transfers the extracted original image data to the displaying processing section 408. The displaying processing section 408 updates the document attribute information and the image attribute information respectively described in FIGS. 7A to 7C, and changes the in-displaying information to "TRUE". The display coordinates are indicated by the display coordinates of the document attribute information at the time when the original image data is extracted in S621.

The displaying processing section 408 transfers the display coordinates and the display image generated from the original image data extracted in S621 and stored in the HDD 305, to the operation displaying section 403. Here, FIG. 18B illustrates an example of the display image. Namely, the region corresponding to the reading region 205 is a black image 2103 which displays nothing, and a remaining image 2104 is created so as to be superimposed on the black image 2103 based on the information of the display coordinates.

Then, the operation displaying section 403 updates the remaining image display by projecting the received display image with use of the projector 207 (S622), and the process is advanced to S612. Thus, the remaining image is displayed in the reading region 205. By the above process, the remaining image is projected such that the remaining image overlaps the original document put in the reading region 205. Incidentally, the projection is not limited to such timing as above. Namely, it may be possible not to perform the projection while the original document is being put in the reading region 205 after the imaging, but to perform, after the removal of the original document, the projection on the position from which the original document was removed.

By repeatedly performing the above process, when the original document which newly entered the reading region 205 rests, the imaging processing section 406 can automatically obtain the still image corresponding to the entered original document, and transfers the obtained still image to the original image data extracting section 411 of the image recognizing section 407.

Subsequently, a method of detecting the frame-in or the frame-out in S611 will be described.

That is, FIGS. 12A to 12H are diagrams for describing the method of detecting the frame-in or the frame-out.

More specifically, FIG. 12A shows the original document board 204 before the original document is put, and FIG. 12C shows the background image or the one-previous still image obtained by imaging the reading region 205.

Further, FIG. 12B shows the original document board 204 immediately after or before the original document 206 frames in or frames out the reading region 205, and FIG. 12D shows the camera image of the reading region 205 read immediately before the frame-in or the frame-out.

The timing detecting section 410 of the image recognizing section 407 generates the difference image shown in FIG. 12E from the two imaged image respectively shown in FIGS. 12C and 12D.

A black pixel region 801 in this difference image corresponds to a portion in which there is no difference, whereas a white pixel region 802 corresponds to the edge of the original document 206 which frames in or frames out. The timing of the frame-in or the frame-out is detected based on the number of the pixels of the white pixel region 802 which corresponds to the difference value between the camera image and the background image.

The state of the frame-in or the frame-cut can be decided by comparing the difference quantity obtained this time and the difference quantity calculated immediately before. That is, if the difference quantity obtained this time increases as compared with the difference quantity calculated immediately before, it is possible to decide that the state is in the frame-in process, whereas if the difference quantity obtained this time decreases as compared with the difference quantity calculated immediately before, it is possible to decide that the state is in the frame-out process.

In the frame-in process, the timing when the percentage of the difference value to the number of the pixels becomes equal to or larger than a predetermined percentage is detected as the frame-in.

Likewise, in the frame-out process, the timing when the percentage of the difference value to the number of the pixels becomes equal to or smaller than the predetermined percentage is detected as the frame-out.

Incidentally, in a case where the edge of the original document is not included in the camera image, for example, when the image of FIG. 8E is imaged next to the image of FIG. 8C because the original document is swiftly removed, the difference quantity decreases, and the percentage of the difference quantity ("0" in this case) to the number of the pixels becomes equal to or smaller than the predetermined percentage. Thus, it is possible to detect the frame-out.

As described above, it is possible to detect the timing of the frame-in or the frame-out, by calculating the difference quantity between the background image and the camera image and the change of the difference quantity.

The method of detecting the timing of the frame-in or the frame-out of the original document is described as above with reference to FIGS. 12B to 12E. However, it is also possible to detect frame-in or frame-out of another physical object.

FIGS. 12F to 12H show an aspect of frame-out of a hand 803. Here, the hand 803 corresponds to the original document 206. After the detection of the frame-in or the frame-out, by deciding whether or not the color of the object existing in a while pixel region 805 is flesh color, it is possible to decide whether or not the physical object which framed in or framed out is the hand. Since only the original document and the hand are used in the present embodiment, the object, which is not decided as the hand, is decided as the original document. Thus, it is possible to detect that the hand enters the detecting region.

The method to be used for extracting the difference is not limited to the method in which the difference between the image obtained by the current imaging and the background image is used. That is, it is possible, by using a method in which the still image obtained by the one-previous imaging, to detect the frame-in or the frame-out of the hand or the new original image even when the original document is being put in the reading region 205.

Figure 13:
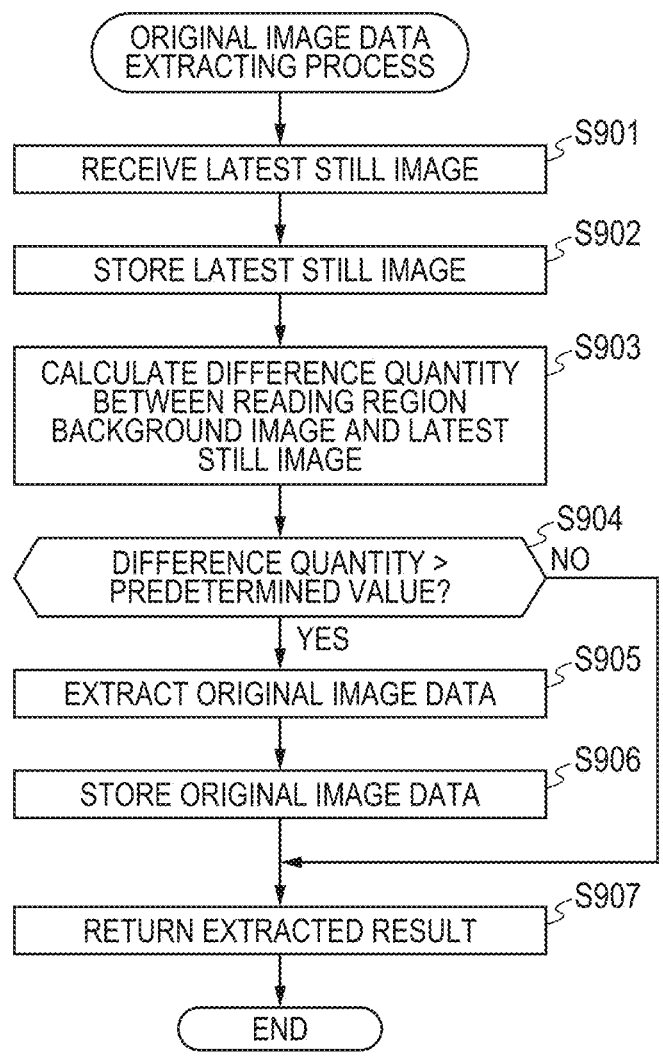
FIG. 13 is a flow chart indicating a procedure of an original image data extracting process in S621 of FIG. 11.

FIG. 13 is a flow chart indicating a procedure of the original image data extracting process in S621 of FIG. 11. Here, it should be noted that the reference numerals shown in this figure respectively indicate the step numbers of the corresponding processes in the procedure.

In FIG. 13, the original image data extracting section 411 receives the latest still image subjected to the projective transformation from the imaging processing section 406 (S901).

Next, as described in FIG. 5B, the original image data extracting section 411 stores the received latest still image in the HDD 305 through the data managing section 405 (S902).

Next, the original image data extracting section 411 calculates the difference quantity between the reading region background image 1901 and the latest still image (S903).

Then, the original image data extracting section 411 discriminates whether or not the calculated difference quantity is larger than a predetermined value (S904). Here, the predetermined value is equivalent to a value by which it is possible to discriminate two images obtained by imaging an identical object as the same image. For example, the predetermined value is approximately equivalent to zero.

If it is discriminated in S904 that the calculated difference quantity is equal to or smaller than the predetermined value (NO in S904), it is decided that any original document is not put, the extracted result is returned (S907), and then the process is ended. Here, if the original image data can be extracted, the extracted result is given as "TRUE". On the other hand, if the original image data cannot be extracted, the extracted result is given as "FALSE". In the case of NO in S904, the extracted result is "FALSE".

On the other hand, if it is discriminated in S904 that the calculated difference quantity is larger than the predetermined value (YES in S904), it is decided that a new original document is put. Thus, the original image data extracting section 411 extracts the original image data from the latest still image (S905). In the extraction of the original image data, it is possible use an existing method of detecting the edge from the difference image generated in S903 and rectangularly approximating the detected edge.

Next, as described in FIG. 6A, the original image data extracting section 411 stores the extracted original image data in the HDD 305 through the data managing section 405 (S906). Then, the extracted result "TRUE" is returned (S907), and the process is ended.

Figure 14:
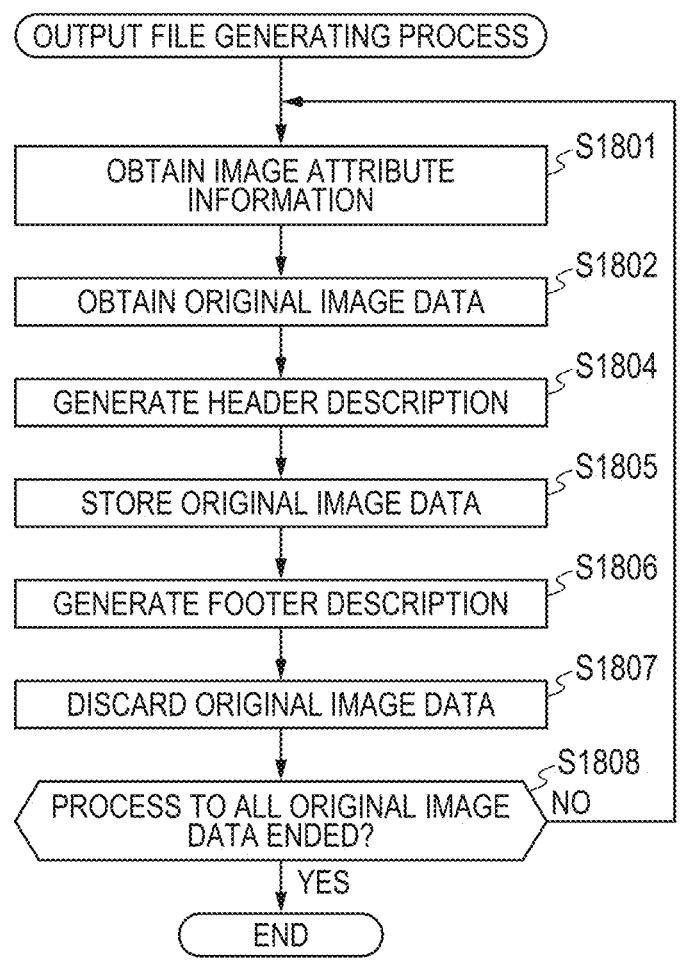
FIG. 14 is a flow chart indicating a procedure of an output file generating process in S620 of FIG. 11.

FIG. 14 is a flow chart indicating a procedure of the output file generating process in S620 of FIG. 11. Here, it should be noted that the reference numerals shown in this figure respectively indicate the step numbers of the corresponding processes in the procedure.

In FIG. 14, the output file generating section 409 obtains the image attribute information 2011 (FIGS. 7A to 7C) of the first original document from the RAM 303 (S1801).

Next, the output file generating section 409 obtains the original image data 2001 of the first original document from the HDD 305 (S1802).

Then, the output file generating section 409 generates a header description for an output file (S1804). Here, the original document number is obtained from "NO." in the image attribute information, and an output file name is created. Further, the width and the height in the image attribute information are used for an output original document size.

Next, the output file generating section 409 stores the original image data 2001 obtained from the HDD 305 in S1802, as the image data of the output file (S1805). At this time, it may be possible for the image processor 307 to sharpen the image by correction processes such as an inclination correcting process, a rotation correcting process, a background eliminating process, an edge emphasizing process and the like.

Next, the output file generating section 409 generates a footer description (S1806), and the data managing section 405 discards the original image data 2001 stored in the HDD 305 (S1807).

Next, it is discriminated whether or not the process for all the original image data is ended (S1808). If it is discriminated in S1808 that the unprocessed original image data remains (NO in S1808), the process is returned to S1801.

On the other hand, if it is discriminated in S1808 that the process for all the original image data is ended (YES in S1808), the process is ended.

Figure 15:
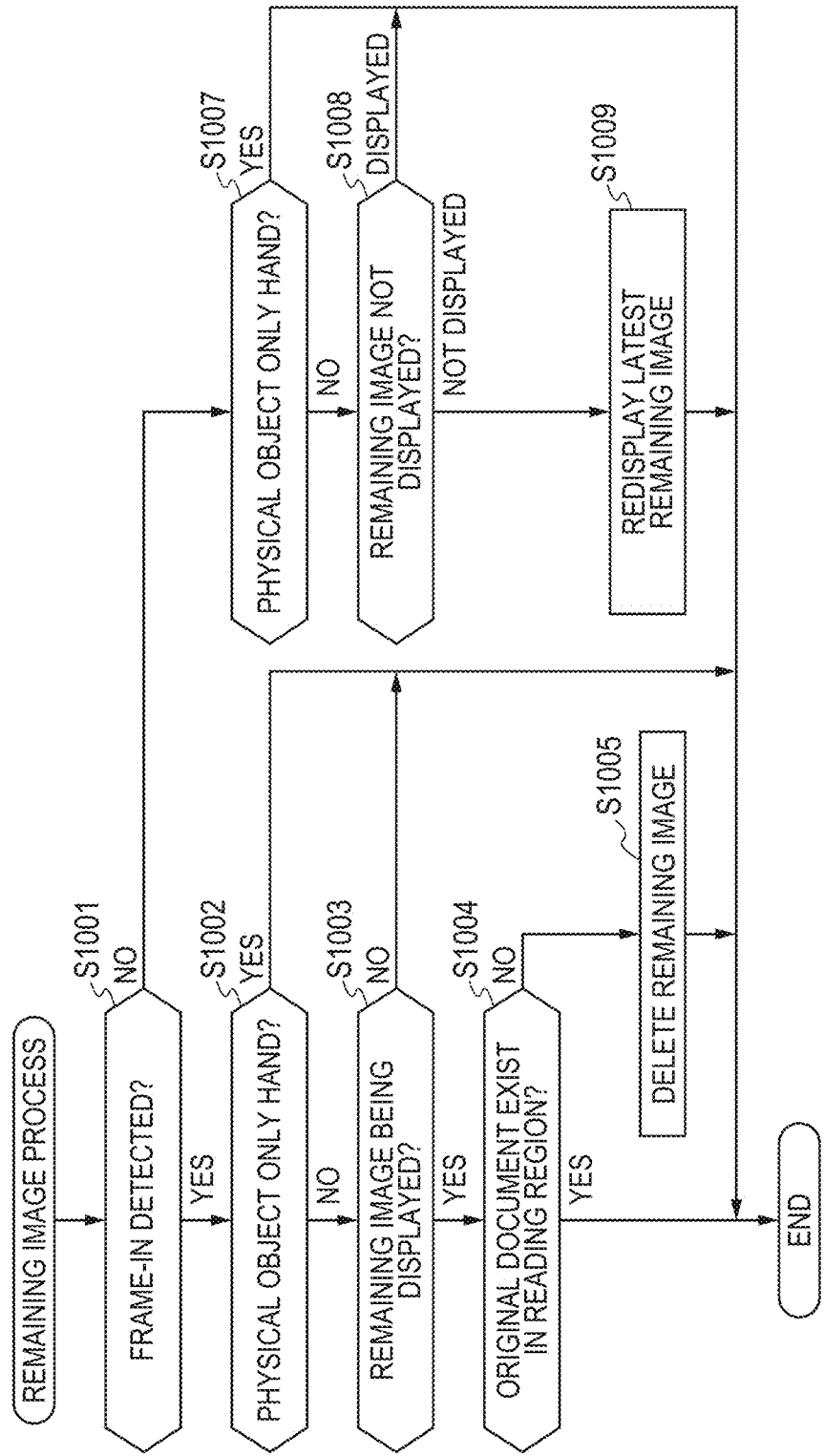
FIG. 15 is a flow chart indicating a procedure of a remaining image process in S623 of FIG. 11.

FIG. 15 is a flow chart indicating a procedure of the remaining image process in S623 of FIG. 11. Here, it should be noted that the reference numerals shown in this figure respectively indicate the step numbers of the corresponding processes in the procedure.

In FIG. 15, the timing detecting section 410 discriminates whether or not the frame-in is detected in S611 of FIG. 11 (S1001).

If it is discriminated in S1001 that the frame-in is detected (YES in S1001), the timing detecting section 410 discriminates whether or not the physical object detected to be framed in is only the hand (S1002).

If it is discriminated in S1002 that the physical object is only the hand (YES in S1002), the process is ended. Thus, since the process is ended if the physical object is only the hand, the gesture process using only the hand in S624 can be performed. At this time, a process of deleting the remaining image in S1005 later described is not performed, the remaining image is displayed as it is. For this reason, if it is detected that the hand enters the detecting region, the remaining image is not changed.

On the other hand, if it is discriminated in S1002 that the physical object is not only the hand, that is, the physical object includes the original document (NO in S1002), the timing detecting section 410 discriminates whether or not the remaining image is being displayed currently in the reading region 205 (S1003).

Incidentally, it is possible to discriminate whether or not the remaining image is being displayed, based on the content represented by the in-displaying information of the image attribute information described in FIGS. 7A to 7C. Here, the image which is being displayed basically corresponds to the data which was last stored. For example, the images in NO. 1 of FIG. 7A, NO. 2 of FIG. 7B, and NO. 3 of FIG. 7C are being displayed respectively.

If it is discriminated in S1003 that the remaining image is not being displayed currently in the reading region 205 (NO in S1003), the process is ended.

On the other hand, if it is discriminated in S1003 that the remaining image is being displayed currently in the reading region 205 (YES in S1003), then the timing detecting section 410 discriminates whether or not the original document is currently put in the reading region 205 (S1004). Namely, it is discriminated whether the original document exists in the reading region.

Here, the discrimination is performed by merely confirming the frame-in state flag for the original document. That is, if the original document is put in the reading region 205, the flag by the original document which newly frames in is not yet "TRUE". Therefore, only one frame-in state flag for the original document is "TRUE".

If it is discriminated in S1004 that the original document is currently put in the reading region 205 (YES in S1004), the process is ended.

On the other hand, if it is discriminated in S1004 that the original document is not put in the reading region 205 (NO in S1004), that is, if none of the frame-in state flag for the original document is "TRUE", then the timing detecting section 410 deletes the remaining image by transferring to the displaying processing section 408 an instruction for deleting the remaining image which is being displayed currently (S1005), and the process is ended.

More specifically, when the instruction for deleting the remaining image is received, the displaying processing section 408 changes, in the stored image attribute information, the in-displaying information for the last stored image to "FALSE". At the same time, the displaying processing section 408 generates the display image in which the remaining image of which the in-displaying information has been changed to "FALSE" is hidden, and transfers the generated display image to the operation displaying section 403. The operation displaying section 403 projects the transferred display image on the reading region 205 by using the projector 207. Thus, it is possible to delete the displayed remaining image.

Here, the description is reverted to S1001. If it is discriminated in S1001 that the frame-in is not detected, that is, if it is discriminated that the frame-out is detected (NO in S1001), the timing detecting section 410 discriminates whether or not the physical object for which the frame-out was detected is only the hand (S1007).

If it is discriminated in S1007 that the physical object is only the hand (YES in S1007), the process is ended.

On the other hand, if it is discriminated in S1007 that the physical object is not only the hand, that is, if the physical object includes the original document (NO in S1007), the timing detecting section 410 discriminates whether or not the remaining image is not displayed in the reading region 205 (S1008).

Here, the timing when the frame-out is detected while the remaining image is being displayed indicates the moment when the original document is removed after the original document was put in the reading region 205 and then the remaining image was projected.

If it is discriminated in S1008 that the remaining image is displayed in the reading region 205 (DISPLAYED in S1008), the process is ended.

On the other hand, if it is discriminated in S1008 that the remaining image is not displayed in the reading region 205 (NOT DISPLAYED in S1008), the timing detecting section 410 redisplays, if the latest remaining image exists, the latest remaining image by issuing a redisplay processing instruction of the latest remaining image to the displaying processing section 408 (S1009), and the process is ended.

Here, such latest remaining image data as above is the original image data which was last stored. Therefore, the displaying processing section 408 changes the in-displaying information of the last-stored image in the image attribute information of FIGS. 7A to 7C to "TRUE".

Concurrently, the display image which has the shape obtained by drawing the last stored image at the position designated by the coordinate information is generated and transferred to the operation displaying section 403. The operation displaying section 403 displays the remaining image in the reading region 205 by using the projector 207. As just described, if the original document is not detected in the detecting region after the remaining image was changed, the latest remaining image which is the remaining image before changed is displayed on the displaying device.

By repeatedly performing the above process, it is possible to detect that the original document frames in the reading region 205 and delete the remaining image.

Incidentally, it is possible to redisplay the remaining image which was deleted due to the frame-in of the original document, if the original document frames out before it rests. Further, by discriminating whether or not the framed-in physical object is only the hand, it is possible to perform the gesture operation to the remaining image.

Incidentally, if the shadow of an original document or a hand is casted in the reading region 205, it may be discriminated that the physical object frames in the reading region. Therefore, in S1002 above, it is possible to discriminate whether or not the framed-in physical object is the shadow, and end the process if the physical object is the shadow. Moreover, if it is discriminated in S611 of FIG. 11 that the physical object is a shadow, it is possible not to detect the frame-in or the frame-out. In any case, a method of detecting the shadow will be described in detail in the second embodiment.

Second Embodiment

In the first embodiment, the remaining image which is being displayed is deleted according to whether or not the original document frames in the reading region 205 of the camera. On the other hand, in the second embodiment, the remaining image is deleted according to whether or not the original document enters a displaying region of the remaining image.

Incidentally, since the network configuration, the outer appearance, the controller constitution and the software configuration which were described in the above first embodiment are respectively the same as those in the second embodiment, the description thereof will be omitted.

FIGS. 16A to 16F are diagrams for describing examples of original document handling and display images.

FIG. 16A shows an aspect that a rest of an original document 1101 is detected in the reading region 205 and imaging of the rested original document is performed.

If the imaging is performed, an image of the read original document is projected by the projector 207 on the same position as the position where the original document existed, such that the projected image overlaps the original document. In the present embodiment, the process of projecting the image of the read original document so as to overlap the original document will be described. However, after removing the original document, it may be possible to project the image of the read original document on the same position as the position where the original document existed.

FIG. 16B shows an aspect that, if the original document 1101 is removed by a hand 1103, a remaining image 1102 corresponding to the image of the read original document is projected and displayed on the position where the original document existed.

FIG. 16C shows an aspect that the remaining image 1102 is being displayed in the reading region 205.

FIG. 16D shows an aspect that, by recognizing a hand from the image sent from the camera 202, an operation such as shifting, enlarging, reducing, printing, storing or the like of the remaining image 1102 is performed by a hand 1104. Incidentally, although the above operation is performed mainly by using the hand in the following description, the present invention is not limited to the hand. Namely, the operation may be performed by recognizing a specific physical medium such as a pen or the like.

FIG. 16E shows a moment when a new original document 1105 enters the region of the remaining image 1102 (also, called the remaining image region). In the present embodiment, if it is detected that the new original document 1105 enters the remaining image region, the displayed remaining image 1102 is hidden.

FIG. 16F shows an aspect that the displayed remaining image 1102 has been hidden because the new original document 1105 entered the region of the remaining image 1102.

If the new original document 1105 is put in the reading region 205 in such a state, the state is again returned to that shown in FIG. 16A, thereby enabling to perform scanning.

By repeatedly performing the above process, it is possible, when continuously reading the original documents while leaving the operable remaining image, to prevent deterioration of a recognition rate caused due to the phenomenon that the remaining image overlaps the new original document.

Moreover, since the remaining image is deleted when it is detected that the original document or the like enters the remaining image region, even when the original document or the like erroneously frames in the reading region, the remaining image is not deleted if the original document or the like does not enter the remaining image region.

Thus, it is possible to arrange the original document and the remaining image next to each other, thereby enabling a freer operation.

Figure 17:
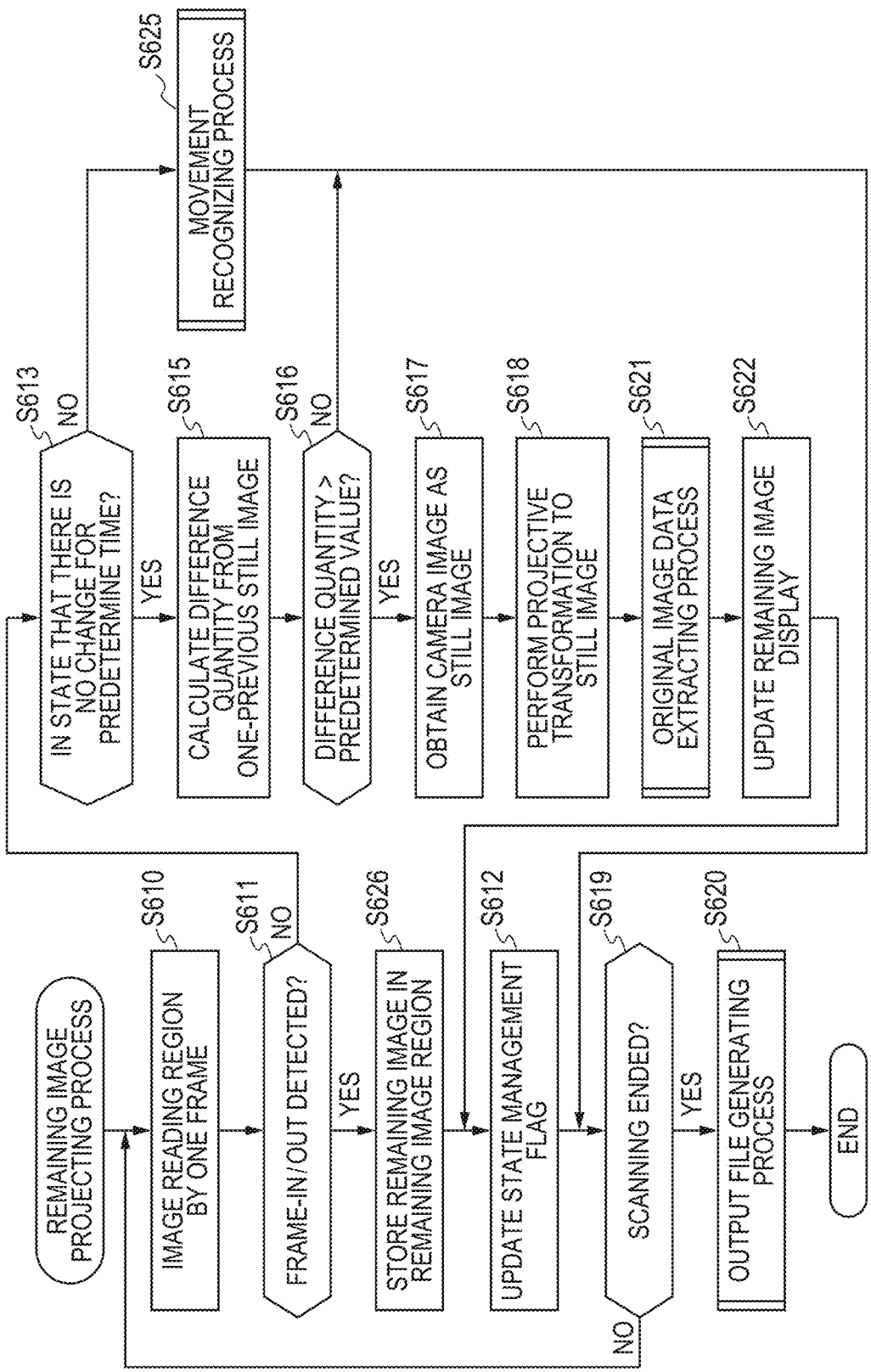
FIG. 17 is a flow chart indicating a procedure of a remaining image projecting process to be performed mainly by the imaging processing section and the timing detecting section of FIG. 4.

FIG. 17 is a flow chart indicating a procedure of a remaining image projecting process to be performed mainly by the imaging processing section 406 and the timing detecting section 410 of FIG. 4. Here, it should be noted that the reference numerals shown in this figure respectively indicate the step numbers of the corresponding processes in the procedure.

In FIG. 17, since the processes in S610 to S622 are respectively the same as those illustrated in FIG. 11, the descriptions thereof will be omitted.

FIG. 17 is different from FIG. 11 in the points that the remaining image process as in S623 is not provided after the frame-in or the frame-out is detected in S611, that the gesture process as in S624 is not provided, and that a movement recognizing process in S625 and an image storing process for the remaining image region in S626 are provided. Consequently, contents concerning the above points will be mainly described hereinafter.

In the case where the frame-in or the frame-out is detected in S611 (YES in S611), if the remaining image is projected at the timing when the frame-out of the original document is detected, then the imaging processing section 406 stores the remaining image in the remaining image region from the camera image to the RAM 303 (S626).

The remaining image region is updated every time the above process is performed. Incidentally, the remaining image stored in the RAM 303 acts as the basis to be used when detecting that the object enters the remaining image region.

FIG. 18C illustrates a remaining image 2102 extracted from a remaining image region 2101 in the reading region 205.

Here, it may be possible to discriminate whether or not the remaining image is being projected and detect the projection position of the remaining image, by checking the display coordinates of the image attribute information shown in FIGS. 7A to 7C. After then, the process is advanced to S612.

Next, the process in S625 will be described. That is, the imaging processing section 406 transfers the current frame and the one-previous frame and issues an instruction for movement recognition to the movement recognizing section 412, and thus the movement recognizing section 412 performs the movement recognizing process (S625). After the movement recognizing process is ended, the process is advanced to S619.

Figure 19:
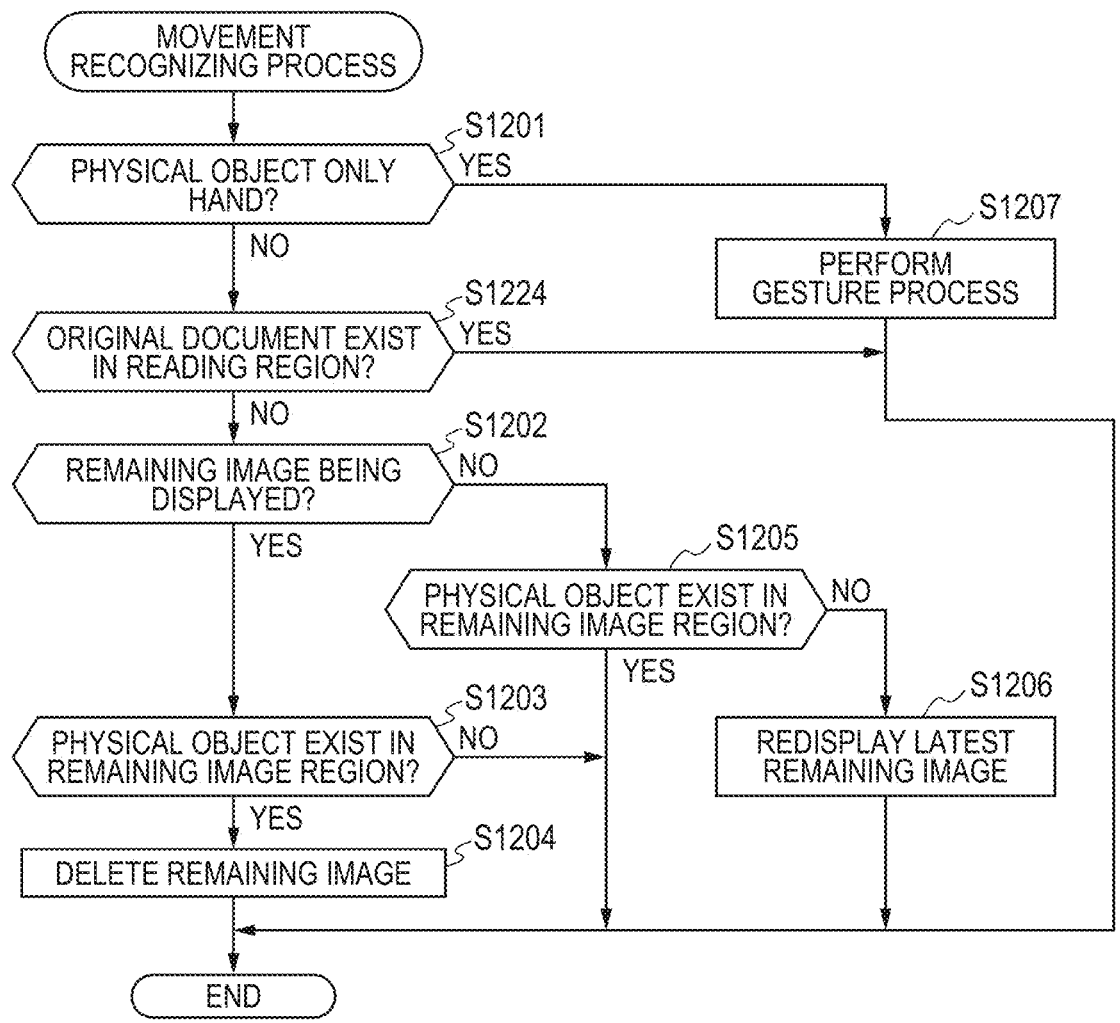
FIG. 19 is a flow chart indicating a procedure of a movement recognizing process in S625 of FIG. 17.

FIG. 19 is a flow chart indicating a procedure of the movement recognizing process in S625 of FIG. 17. Here, it should be noted that the reference numerals shown in this figure respectively indicate the step numbers of the corresponding processes in the procedure.

In FIG. 19, the movement recognizing section 412 discriminates whether or not the physical object from which the image change quantity detected in S613 is generated is only the hand (S1201).

Here, the movement recognizing section 412 extracts the feature quantity of the image in each frame, discriminates the hand or the original document by detecting the flesh color and the rectangle, and checks whether or not the gravity center position thereof moves beyond a predetermined rage between the frames. Thus, it is possible to discriminate whether the physical object includes only the hand or includes another object in addition to the hand.

Moreover, by obtaining the difference between the current frame and the one-previous frame and checking the color of the difference, it is possible to discriminate whether the physical object is only the hand or includes another object in addition to the hand. Besides, at the time when detecting the frame-in of the hand of the original document in S611, it may be possible to track the detected result by using a known technique.

If it is discriminated in S1201 that the physical object is only the hand (YES in S1201), the movement recognizing section 412 performs the gesture process (S1207). In the gesture process, it is only necessary to recognize what kind of shape the hand is and how the hand is moved, and correlate what the recognized movement means with a predetermined command.

On the other hand, if it is discriminated in S1201 that the physical object is not only the hand (NO in S1201), the movement recognizing section 412 discriminates whether or not the original document already read (also, called the after-reading original document) exists in the reading region 205 (S1224).

In this step, such discrimination is performed using the state flag. More specifically, if the after-reading original document exists in the reading region 205, since the state flags for the two original documents, i.e., the after-reading original document in the reading region 205 and the original document currently existing as the physical object in the reading region 205, are "TRUE", the discrimination can be performed using these state flags.

On the other hand, if the after-reading original document does not exist, only the state flag for the original document currently existing as the physical object in the reading region 205 is "TRUE".

If it is discriminated in S1224 that the after-reading original document exists in the reading region 205 (YES in S1224), the process is ended.

On the other hand, if it is discriminated in S1224 that the after-reading original document does not exist in the reading region 205 (NO in S1224), the movement recognizing section 412 discriminates based on the image attribute information whether or not the remaining image is being displayed currently (S1202).

If it is discriminated in S1202 that the remaining image is being displayed (YES in S1202), the movement recognizing section 412 discriminates whether or not the physical object exists in the remaining image region 2101 (S1203). In this step, such discrimination can be performed by comparing the remaining image stored in the RAM 303 in S626 with the image in the current remaining image region 2101.

If it is discriminated in S1203 that the physical object exists in the remaining image region 2101 (YES in S1203), the movement recognizing section 412 deletes the remaining image which is currently displayed (S1204), and the process is ended. At this time, the in-displaying information stored in the RAM 303 is changed to "FALSE".

Here, the description is reverted to S1202. If it is discriminated in S1202 that the remaining image is not being displayed (NO in S1202), the movement recognizing section 412 discriminates whether or not the physical object exists in the remaining image region 2101 (S1205).

If it is discriminated in S1205 that the physical object exists in the remaining image region 2101 (YES in S1205), the process is ended.

On the other hand, if it is discriminated in S1205 that the physical object does not exist in the remaining image region 2101 (NO in S1205), the movement recognizing section 412 redisplays the latest remaining image (S1206), and the process is ended.

The above process is the process same as that in S1009 of FIG. 15. By this process, even if the original document erroneously enters the remaining image region 2101 and thus the remaining image is deleted, it is possible to redisplay the remaining image by removing the original document from the remaining image region 2101.

Figure 20A:
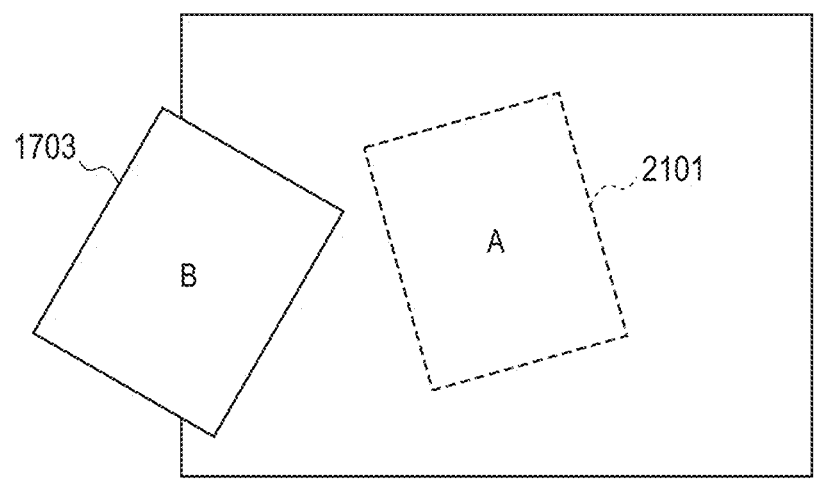
FIGS. 20A and 20B are diagrams for describing a process to be performed when a shadow occurs.
Figure 20B:
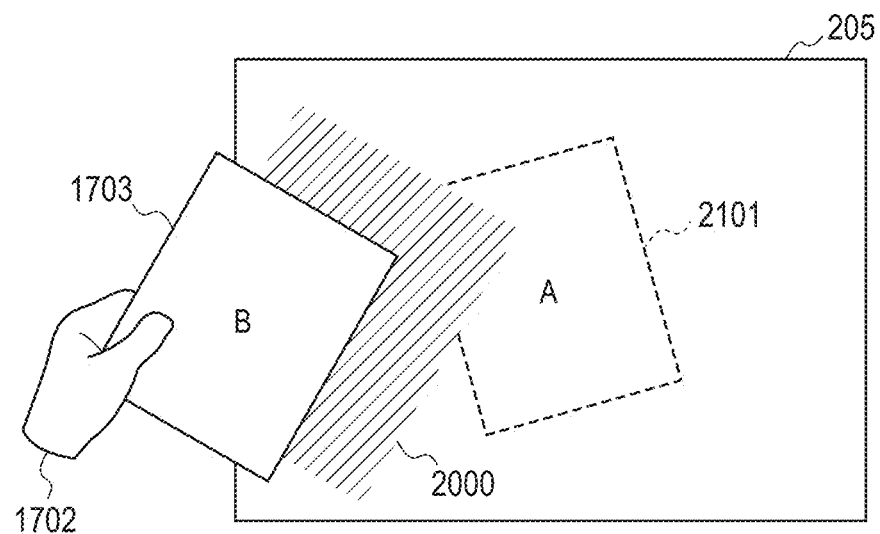

FIGS. 20A and 20B are diagrams for describing a process to be performed when a shadow occurs.

More specifically, FIG. 20A shows a positional relation between an original document 1703 and the remaining image region 2101, and FIG. 20B shows an example that a shadow 2000 enters the remaining image region.

Although an actual remaining 1701 image and the original document 1703 do not enter the remaining image region 2101 as illustrated in FIG. 20A, there is a probability that the shadow 2000 of a hand 1702 or the original document enters the remaining image region as illustrated in FIG. 20B.

If the shadow enters the remaining image region like this, it may be possible to consider that the frame-in is not detected and thus end the process at the time of S1201, or it may be possible to consider that the frame-in or the frame-out is not detected at the time of S611.

To detect the shadow, it is possible to use a method of measuring brightness of the framed-in portion and deciding the portion having the brightness lower than a predetermined value as the shadow. Thus, it is possible to detect that the shadow enters the detecting region. Further, as just described, if it is detected that the shadow enters the detecting region, it may be possible not to change the remaining image.

As described above, in the second embodiment, since it is possible to delete the remaining image on the condition that the original document enters the region in which the remaining image is being displayed, it is possible to prevent deterioration of the recognition rate of the original document at the time when continuously scanning the original documents.

Moreover, by discriminating whether or not the moving object includes an object other than the hand, it is possible to operate the remaining image by the hand while leaving the remaining image in the continuous scanning, thereby improving operability.

Third Embodiment

In the first and second embodiments, when the original image enters the predetermined area such as the reading region 205 or the remaining image region, the remaining image is immediately deleted, thereby improving accuracy for next image reading.

Here, it should be noted that the third embodiment is carried out based on the second embodiment. That is, in the case where the original document enters the predetermined region, then the remaining image is deleted after a predetermined time elapses. In other words, even where the original document erroneously enters the predetermined region, the remaining image is not deleted immediately.

Incidentally, since the network configuration, the outer appearance, the controller constitution and the software configuration which were described in the first embodiment are respectively the same as those in the third embodiment, the description thereof will be omitted.

In the present embodiment, a process of deleting the remaining image after the elapse of the predetermined time as described above is added to the procedure indicated by FIG. 19, and the others are the same as those in the second embodiment.

Figure 21:
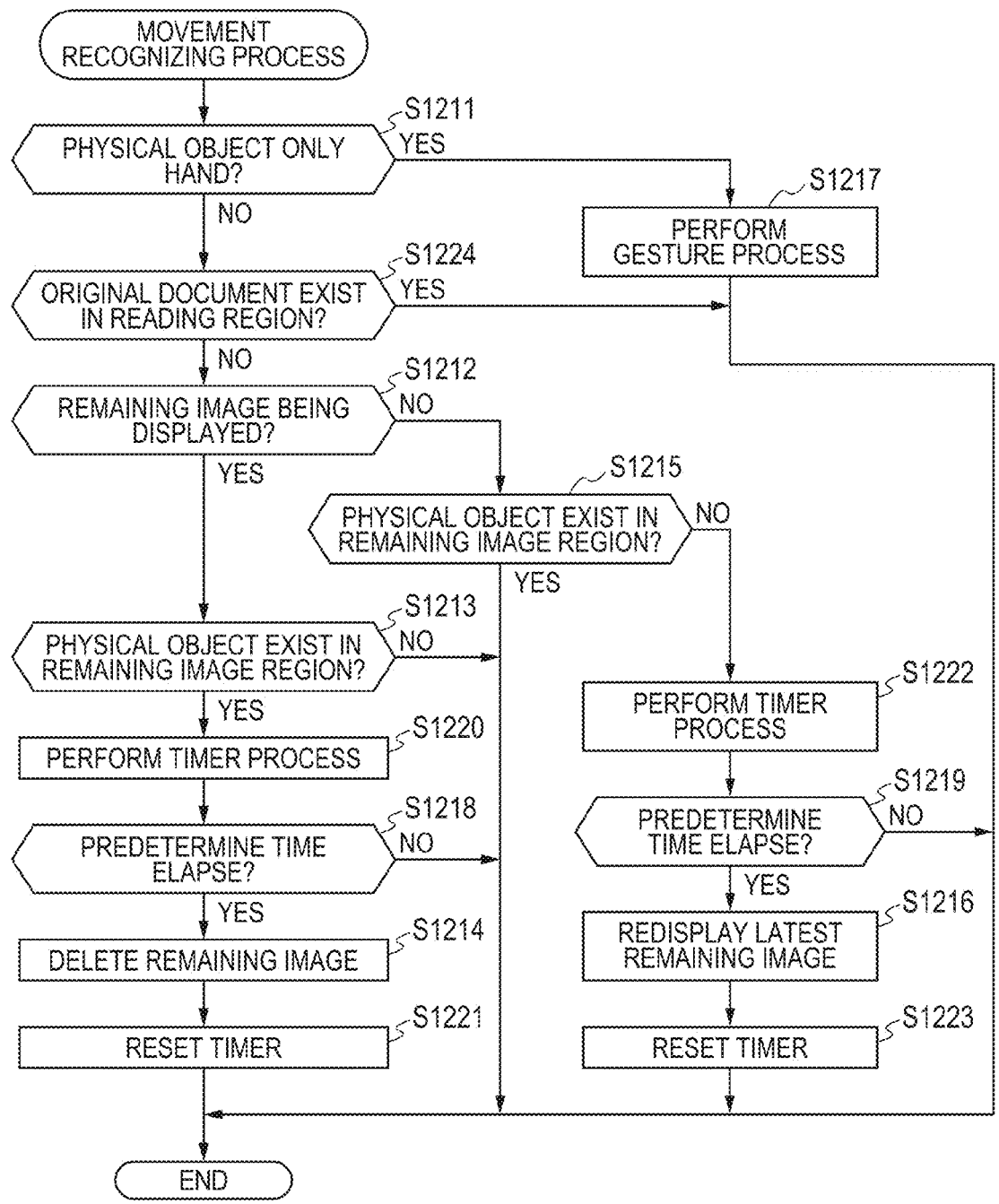
FIG. 21 is a flow chart indicating a procedure of the movement recognizing process in S625 of FIG. 17.

FIG. 21 is a flow chart indicating a procedure of the movement recognizing process in S625 of FIG. 17. Here, it should be noted that the reference numerals shown in this figure respectively indicate the step numbers of the corresponding processes in the procedure.

In FIG. 21, since the processes in S1211 to S1217 are respectively the same as those in S1201 to S1207 of FIG. 19, the descriptions thereof will be omitted. Also, since the process in S1224 of FIG. 21 is the same as that in S1224 of FIG. 19, the description thereof will be omitted.

If it is discriminated in S1213 that the physical object exists in the remaining image region 2101 (YES in S1213), the movement recognizing section 412 starts a timer if the timer does not start yet, or performs a timer process not doing anything if the timer has already stared (S1220).

Next, the movement recognizing section 412 discriminates whether or not the predetermined time elapses from the time when the physical object entered the remaining image region 2101 (S1218). Here, the physical object is the original document.

If it is discriminated in S1218 that the predetermined time does not elapse (NO in S1218), the process is ended.

On the other hand, if it is discriminated in S1218 that the predetermined time elapses (YES in S1218), the remaining image which is being displayed currently is deleted (S1214), the timer is reset (S1221), and then the process is ended.

If it is discriminated in S1215 that the physical object does not exist in the remaining image region 2101 (NO in S1215), the movement recognizing section 412 starts the timer if the timer does not start yet, or performs the timer process not doing anything if the timer has already stared (S1222).

Next, the movement recognizing section 412 discriminates whether or not the predetermined time elapses from the time when the physical object entered the remaining image region 2101 (S1219). Here, the physical object is the original document.

If it is discriminated in S1219 that the predetermined time does not elapse (NO in S1219), the process is ended.

On the other hand, if it is discriminated in S1219 that the predetermined time elapses (YES in S1219), the latest remaining image is redisplayed (S1216), the timer is reset (S1223), and then the process is ended. As just described, in the third embodiment, the remaining image is deleted if the predetermined time elapses from the time when the original document entered the detecting region.

According to the above third embodiment, it is possible to delete (or clear) the remaining image after the predetermined time elapsed from the time when the original document entered the remaining image region. Thus, even where the original document erroneously enters the remaining image region, the remaining image is not deleted immediately.

Fourth Embodiment

In the third embodiment, the remaining image is deleted at the timing when the predetermined time elapses from the time when the original document entered the remaining image region, thereby preventing the erroneous deletion of the remaining image. In the fourth embodiment which is carried out based on the second embodiment, as well as the third embodiment, to prevent the erroneous deletion of the remaining image, the density of the remaining image is changed according to the overlap state between the remaining image and the original document, and, after then, the remaining image is deleted if the remaining image and the original document come to overlap each other at a percentage equal to or higher than a predetermined percentage.

Incidentally, since the network configuration, the outer appearance, the controller constitution and the software configuration which were described in the first embodiment are respectively the same as those in the fourth embodiment, the description thereof will be omitted.

FIGS. 22A to 22D are diagrams for describing a state that the remaining image gradually fades away according to the entering of the original document into the remaining image region.

Figure 22A:
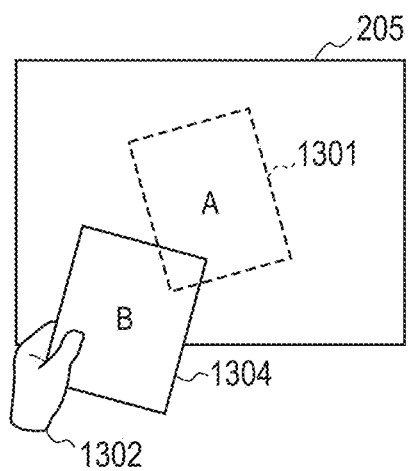
FIGS. 22A, 22B, 22C and 22D are diagrams for describing a state that a remaining image gradually fades away according to entering of an original document into a remaining image region.

More specifically, FIG. 22A shows a moment when, while a remaining image 1301 is being displayed in the reading region 205, a new original document 1304 held by a hand 1302 enters the remaining image region of the remaining image 1301.

Figure 22B:
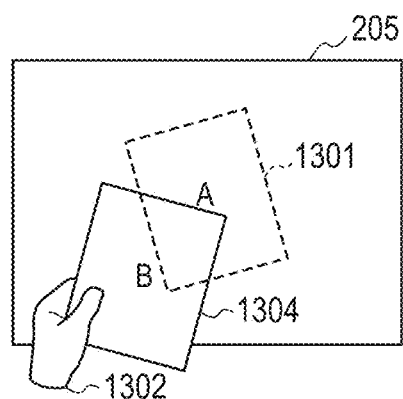

FIG. 22B shows an aspect that the original document 1304 enters the remaining image region of the remaining image 1301 deeply as compared with the state shown in FIG. 22A, and thus the remaining image 1301 is displayed thinly as compared with the state shown in FIG. 22A.

Figure 22C:
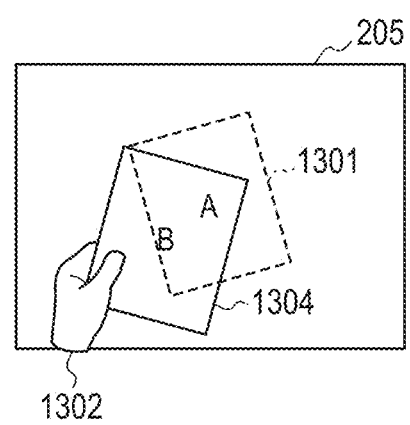

FIG. 22C shows an aspect that the original document 1304 further enters the remaining image region of the remaining image 1301 deeply as compared with the state shown in FIG. 22B, and thus the remaining image 1301 is displayed thinly as compared with the state shown in FIG. 22B.

Figure 22D:
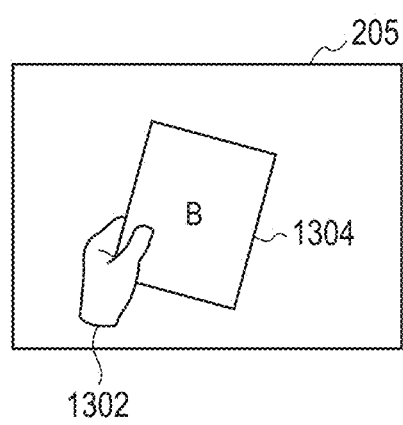

FIG. 22D shows an aspect that the remaining image 1301 is hidden because the original document 1304 overlaps the remaining image region of the remaining image 1301 at the percentage equal to or higher than the predetermined percentage.

Figure 23:
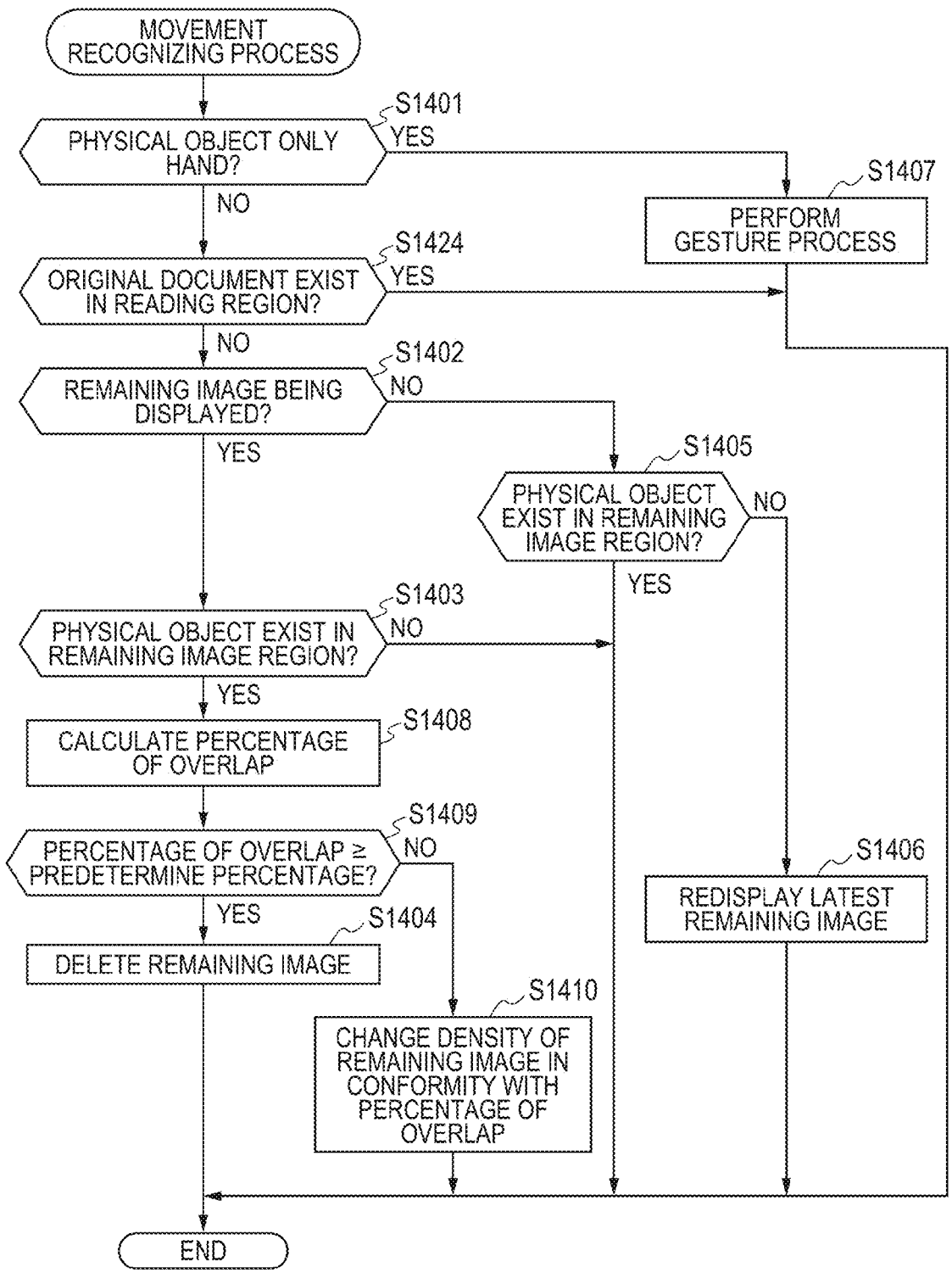
FIG. 23 is a flow chart indicating a procedure of the movement recognizing process in S625 of FIG. 17.

FIG. 23 is a flow chart indicating a procedure of the movement recognizing process in S625 of FIG. 17. Here, it should be noted that the reference numerals shown in this figure respectively indicate the step numbers of the corresponding processes in the procedure.

In FIG. 23, since the processes in S1401 to S1407 and S1424 are respectively the same as those for the movement recognizing process in S1201 to S1207 and S1224 of FIG. 19 in the second embodiment, the descriptions thereof will be omitted.

If it is discriminated in S1403 that the physical object exists in the remaining image region (YES in S1403), the movement recognizing section 412 calculates the percentage of the overlap between the original document and the remaining image region (S1408).

In this step, it only has to obtain, from the remaining image stored in the RAM 303 in S626 and the image of the current remaining image region, the percentage of the difference between these images to the remaining image region.

Next, the movement recognizing section 412 discriminates whether or not the percentage of the overlap between the original document and the remaining image region is equal to or higher than the predetermined percentage (S1409).

If it is discriminated in S1409 that the percentage of the overlap between the original document and the remaining image region is not equal to or higher than the predetermined percentage (NO in S1409), the movement recognizing section 412 instructs the displaying processing section 408 to change the density of the remaining image in conformity with the percentage of the overlap (S1410), and the process is ended.

More specifically, the movement recognizing section 412 indicates the density corresponding to the percentage of the overlap to the displaying processing section 408. Then, the displaying processing section 408 generates the display image in which the density of the remaining image portion has been changed based on the density indication of the remaining image portion and the original image data stored in the HDD 305, and then instructs the operation displaying section 403 to display the generated display image. Thus, in the fourth embodiment, as the percentage of the overlap between the original document entered the detecting region and the detecting region becomes large, the density of the remaining image is lowered such that the remaining image gradually fades away.

As described above, in the fourth embodiment, the density of the remaining image is lowered according to the percentage of the overlap of the original document and the remaining image region. Thus, it is possible to delete the remaining image if the original document overlaps the remaining image region at the percentage equal to or higher than the predetermined percentage.

Consequently, even where the original document erroneously enters the remaining image region, the remaining image is not deleted immediately. In this case, the remaining image merely becomes thin slightly. Further, if the original document is removed from the remaining image region, the remaining image is displayed at the original density.

Fifth Embodiment

In the third and fourth embodiments, if the original document erroneously entered the remaining image region, the remaining image is not deleted immediately.

In the fifth embodiment which is carried out based on the second embodiment, only the portion where the remaining image and the original document overlap each other is deleted such that the remaining image is visually cut out, and, after then, the remaining image is deleted if the remaining image and the original document come to overlap each other at a percentage equal to or higher than a predetermined percentage.

Incidentally, since the network configuration, the outer appearance, the controller constitution and the software configuration which were described in the first embodiment are respectively the same as those in the fifth embodiment, the description thereof will be omitted.

FIGS. 24A to 24H are diagrams for describing a state that the remaining image is gradually cut out by entering of the original document into the remaining image region.

Figure 24A:
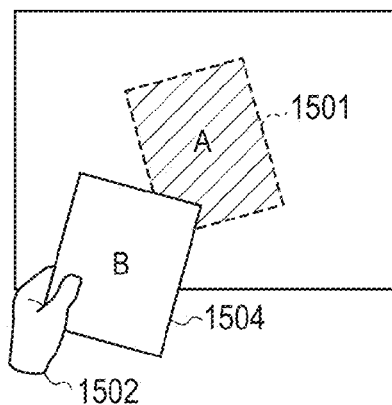
FIGS. 24A, 24B, 24C, 24D, 24E, 24F, 24G and 24H are diagrams for describing a state that a remaining image is gradually cut out by entering of an original document into a remaining image region.
Figure 24B:
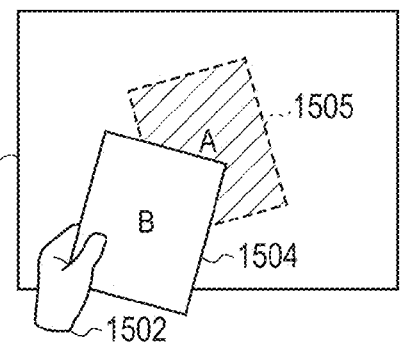
Figure 24C:
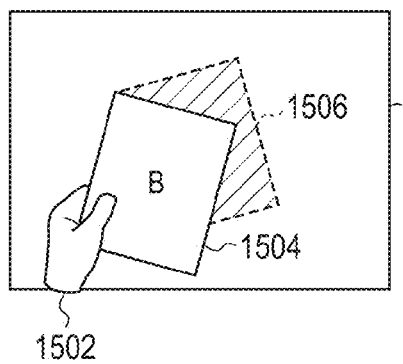
Figure 24D:
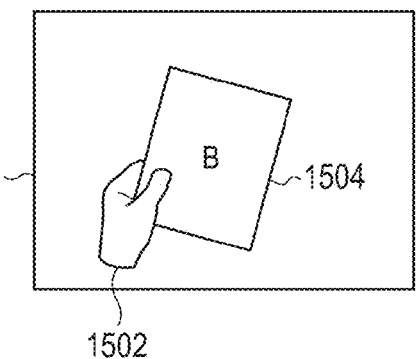
Figure 24E:
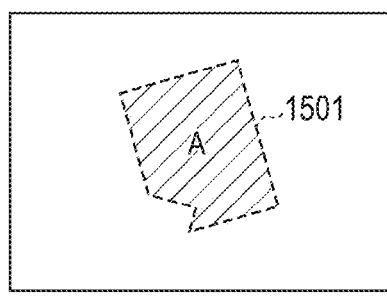
Figure 24F:
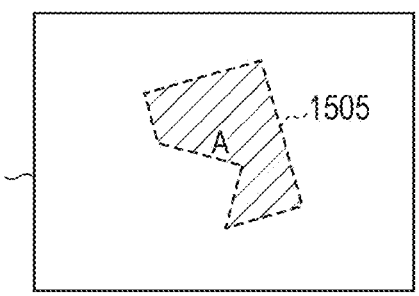
Figure 24G:
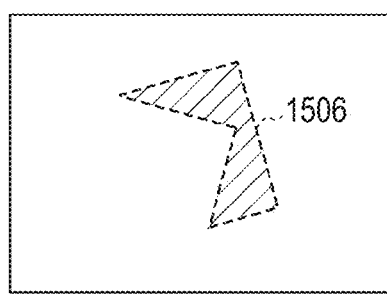
Figure 24H:

Here, FIG. 24A corresponds to FIG. 24E, FIG. 24B corresponds to FIG. 24F, FIG. 24C corresponds to FIG. 24G, and FIG. 24D corresponds to FIG. 24H. Further, each of FIGS. 24A, 24B, 24C and 24D shows both the states of the original document and the remaining image in the reading region 205, and each of FIGS. 24E, 24F, 24G and 24H shows the aspect of the remaining image to be displayed in the above corresponding state.

Besides, each of FIGS. 24A and 24E shows a moment when, while a remaining image 1501 is being displayed in the reading region 205, a new original document 1504 held by a hand 1502 enters the remaining image region of the remaining image 1501.

FIG. 24E shows the remaining image which is projected at this moment, and more particularly, the aspect that the remaining image 1501 of which the lower left portion that the original document 1504 entered has been cut out is displayed.

FIG. 24B shows an aspect that the original document 1504 enters the remaining image region of a remaining image 1505 deeply as compared with the state shown in FIG. 24A, and FIG. 24F shows the aspect that the remaining image 1505 of which the cut-out portion is large as compared with the state shown in FIG. 24E is displayed.

FIG. 24C shows an aspect that the original document 1504 further enters the remaining image region of a remaining image 1506 deeply as compared with the state shown in FIG. 24B. Namely, this figure shows the remaining image 1506 which has been cut out more largely. FIG. 24G shows the remaining image 1506 which is displayed in the above state.

FIG. 24D shows an aspect that the remaining image is hidden because the original document 1504 overlaps the remaining image region at the percentage equal to or higher than the predetermined percentage, and FIG. 24H shows an aspect of the reading region 205 in which the remaining image has been hidden (i.e., in the non-displaying state).

Figure 25:
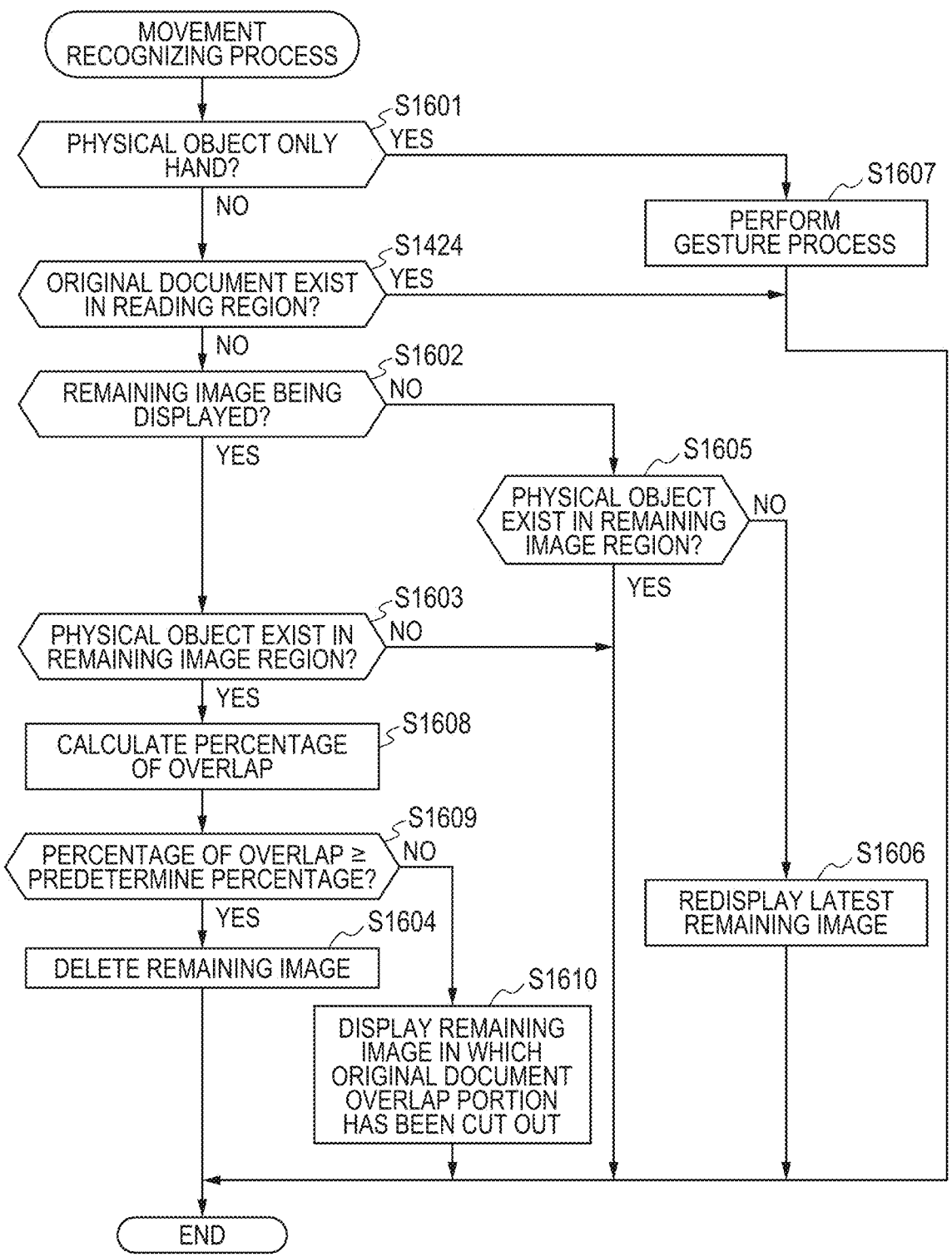
FIG. 25 is a flow chart indicating a procedure of the movement recognizing process in S625 of FIG. 17.

FIG. 25 is a flow chart indicating a procedure of the movement recognizing process in S625 of FIG. 17. Here, it should be noted that the reference numerals shown in this figure respectively indicate the step numbers of the corresponding processes in the procedure.

In FIG. 25, since processes in S1601 to S1607 are respectively the same as those in S1201 to S1207 for the movement recognizing process of FIG. 19 in the second embodiment, the descriptions thereof will be omitted.

Also, since processes in S1608 and S1609 are respectively the same as those in S1408 and S1409 of FIG. 23, the descriptions thereof will be omitted. Further, since the process in S1424 is the same as that in S1424 of FIG. 23, the description thereof will be omitted.

If it is discriminated in S1609 that the percentage of the overlap between the original document and the remaining image region is not equal to or higher than the predetermined percentage (NO in S1609), the movement recognizing section 412 instructs the displaying processing section 408 to display the remaining image in which the portion where the original document overlapped has been cut out (S1610), and the process is ended.

More specifically, the movement recognizing section 412 issues the instruction to the displaying processing section 408 to display the remaining image which has been partially cut out. Then, the displaying processing section 408 generates a mask image of the portion having no difference, from the image of the remaining image region stored in the RAM 303 in S626 and the image of the current remaining image region.

The displaying processing section 408 generates the display image which includes the remaining image in which the portion where the original document overlapped has been cut out, from the mask image and the original image data stored in the HDD 305, and instructs the operation displaying section 403 to display the generated display image.

On the other hand, if it is discriminated in S1609 that the percentage of the overlap between the original document and the remaining image region is equal to or higher than the predetermined percentage (YES in S1609), the remaining image is deleted (S1604), and the process is ended. Thus, in the fifth embodiment, the remaining image is changed to the image of the remaining image obtained by removing, from the remaining image, the portion which overlaps the original document entered the remaining image region in which the remaining image is displayed, thereby changing the remaining image so as to be gradually deleted.

As described above, according to the fifth embodiment, the remaining image is gradually deleted such that only the portion of the remaining image where the remaining image and the original document overlap each other is visually cut out. Then, it is possible to entirely delete the remaining image if the remaining image and the original document come to overlap each other at the percentage equal to or higher than the predetermined percentage.

Thus, even where the original document erroneously enters the remaining image region, the remaining image is not deleted immediately.

Sixth Embodiment

In the sixth embodiment, if it is detected that the original document frames in the reading region 205, the display image is shifted to a predetermined region.

Incidentally, since the network configuration, the outer appearance, the controller constitution and the software configuration which were described in the first embodiment are respectively the same as those in the sixth embodiment, the description thereof will be omitted.

FIGS. 26A to 26C are diagrams for describing examples of original document handling and display images.

In FIGS. 26A to 26C, as well as FIGS. 8A to 8D in the first embodiment and FIGS. 16A to 16D in the second embodiment, it is assumed that the original document was imaged and the remaining image has been left.

FIG. 26A shows an aspect that, while a remaining image 2201 is being displayed, a new original document 2203 held by a hand 2202 frames in. That is, the detecting region for detecting the original document in FIG. 26A is the reading region 205 corresponding to the imaging region.

Then, the flow of FIG. 26A→FIG. 26B→FIG. 26C corresponds to the flow of shifting of the remaining image after the new original document 2203 framed in.

In the present embodiment, if it is detected that the new original document 2203 frames in, the remaining image 2201 which is being displayed is shifted to a predetermined region 2208 which does not obstruct reading of the new original document.

FIG. 26B shows transition images 2204 to 2207 which are displayed when the remaining image is shifted to the predetermined region 2208.

As shown in FIGS. 26B and 26C, the remaining image 2201 is gradually shifted to the predetermined region 2208. At this time, as shown by the transition images 2204 to 2207, the remaining image is shifted to the predetermined region 2208 while reducing its size.

FIG. 26C shows an aspect that a thumbnail image 2207 which is equivalent to the transition image 2207 is held in the predetermined region 2208 as the remaining image after the shifting.

In this state, if the new original document 2203 is put in the vacant region, it is possible to read the put new original document without any obstruction by the remaining image. Consequently, it is possible to secure original document recognition accuracy.

Incidentally, although FIG. 26B shows that the shifting remaining image 2201 is displayed as the transition images 2204 to 2207, the transition image need not necessarily be displayed. In this case, it is possible to skip the state shown in FIG. 26B, and shift the remaining image as shown in the states of FIG. 26A→FIG. 26C.

Moreover, although the region 2208 is used for facilitating understanding in FIG. 26C, it may be possible not to actually display the region 2208 in the reading region 205. In any case, the predetermined region 2208 corresponds to a thumbnail image displaying region which is predetermined to display the thumbnail image.

FIG. 27 is a diagram illustrating document attribute information and image attribute information which are generated when the thumbnail image to be stored in the RAM 303 of FIG. 3 is generated.

In FIG. 27, the document attribute information and the image attribute information indicate the information in case where the two original documents are scanned and the remaining image of the second original document is still projected in the reading region 205.

In the image attribute information, the SMN coordinates indicating the coordinates of the thumbnail image, the SMN in-displaying information indicating whether or not the thumbnail image is being displayed, and the SMN name uniquely determining the thumbnail are included for each original image data.

In management data 2401 of "NO. 1" in FIG. 27, since the generated thumbnail image is being displayed, the values are given respectively to the SMN name and the SMN coordinates, and the SMN in-displaying information is "TRUE".

In management data 2402 of "NO. 2", although the in-displaying information of the remaining image is "TRUE", the thumbnail image is not yet displayed. Therefore, no value is given to the SMN coordinates and the SMN name, and the SMN in-displaying information is "FALSE".

Although the SMN coordinates are defined as the coordinates of the two vertexes making the opposite angle of the rectangle of the thumbnail image, it may be possible to use any kind of information by which the displaying position of the thumbnail image can be uniquely decided.

FIGS. 28A to 28F are diagrams illustrating the coordinates of the thumbnail images and display images.

Figure 28E:
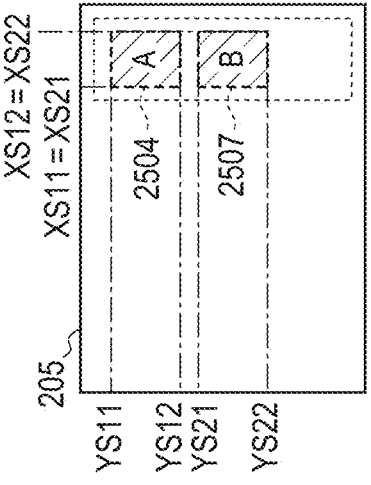
FIGS. 28A, 28B, 28C, 28D, 28E and 28F are diagrams illustrating the coordinates of thumbnail images and display images.
Figure 28F:
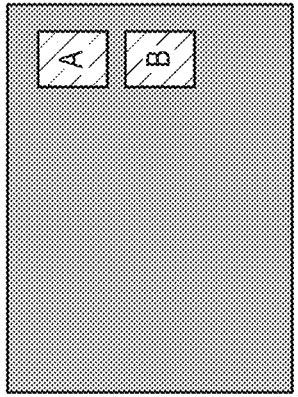
Figure 28C:
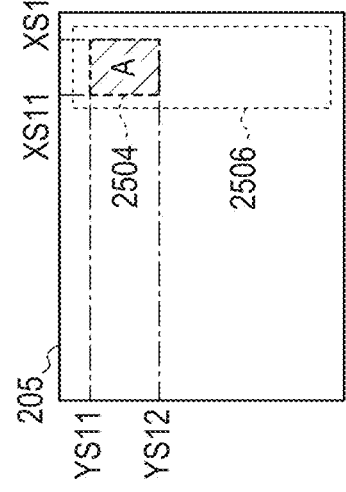
Figure 28D:
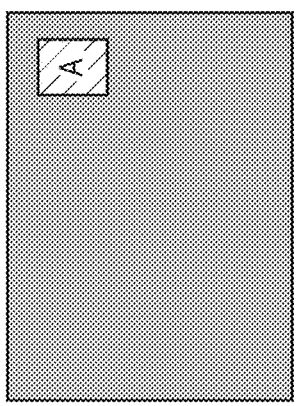
Figure 28A:
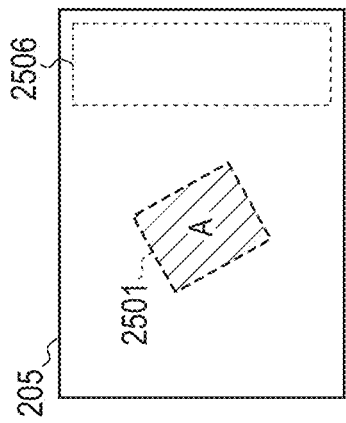
Figure 28B:
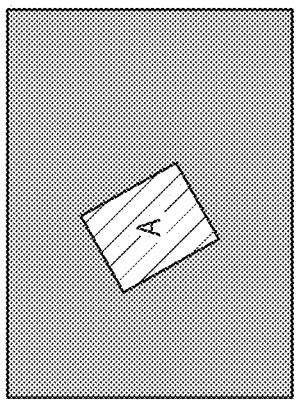

More specifically, FIG. 28A shows an aspect that a remaining image 2501 is displayed in the reading region 205. FIG. 28B shows the display image which is generated by the displaying processing section 408 in the state shown in FIG. 28A.

FIG. 28C shows an aspect that a thumbnail image 2504 is displayed. FIG. 28D shows the display image which is generated by the displaying processing section 408 in the state shown in FIG. 28C.

In FIG. 28C, the display position of the thumbnail image 2504 in a region 2506 is represented by coordinates P11 (XS11, YS11) and P12 (XS12, YS12).

The coordinates are uniquely decided for each pixel by using, e.g., the upper left point of the reading region 205 as the origin. In any case, the display image shown in FIG. 28D is generated using the coordinates.

FIG. 28E shows an aspect that a second thumbnail image 2507 is displayed. FIG. 28F shows the display images which are generated by the displaying processing section 408 in the state shown in FIG. 28E. Here, it only has to provide a predetermined distance between the coordinates YS12 and YS21.

Figure 29:
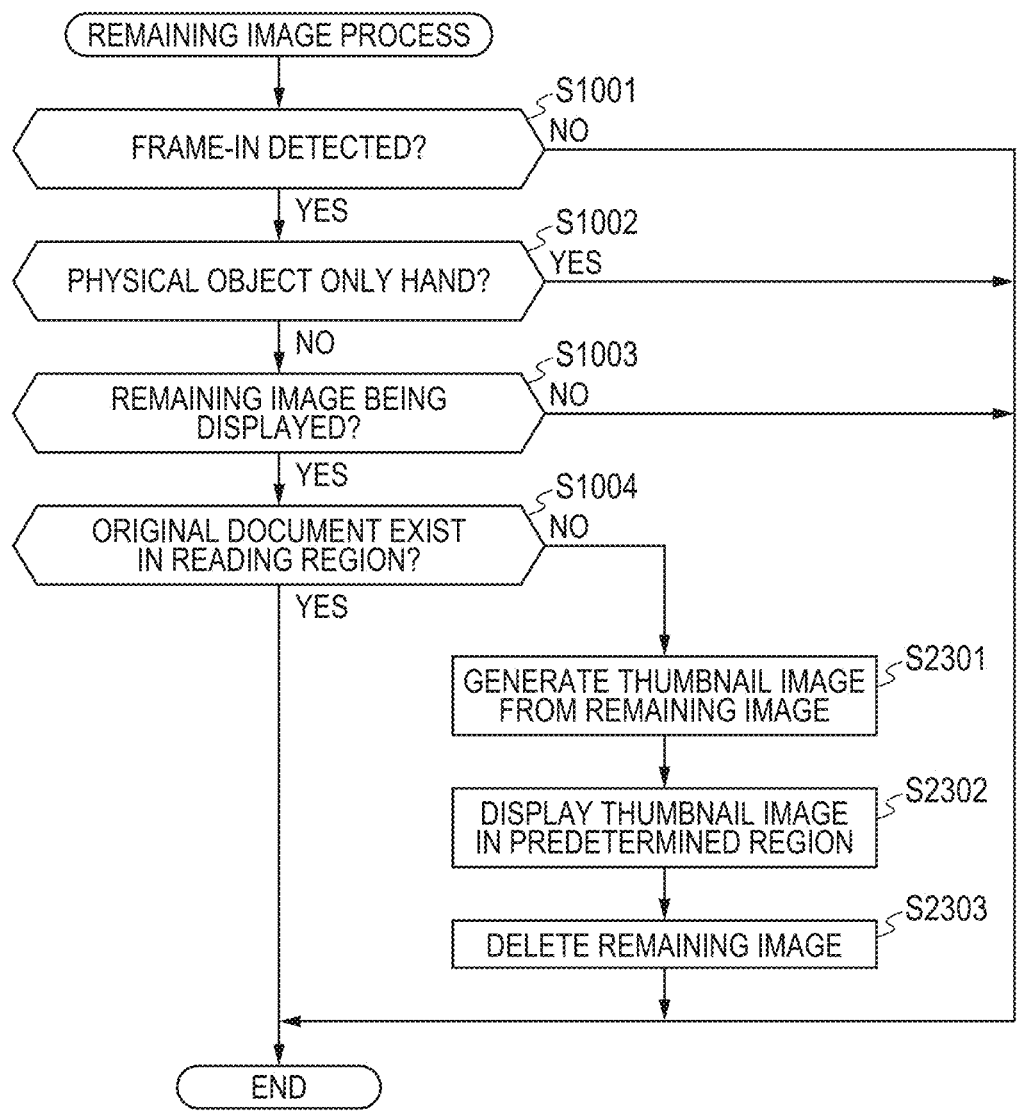
FIG. 29 is a flow chart indicating a procedure of the remaining image process in S623 of FIG. 11.

FIG. 29 is a flow chart indicating a procedure of the remaining image process in S623 of FIG. 11. Here, it should be noted that the reference numerals shown in this figure respectively indicate the step numbers of the corresponding processes in the procedure.

In FIG. 29, since the processes in S1001 to S1004 are respectively the same as those in FIG. 15, the descriptions thereof will be omitted.

Here, it is assumed that, in the processes of S1001 to S1004, the timing detecting section 410 detected the frame-in, discriminated that the physical object includes the original document, discriminated that the remaining image is being displayed, and then discriminated that the original document does not exist in the reading region 205 (NO in S1004).

The timing detecting section 410 generates the thumbnail image from the remaining image (S2301). At this time, the original image data which is the origin of the remaining image which is being displayed currently is obtained from the HDD 305, and the thumbnail image is generated by reducing the obtained original image data by a predetermined method. The generated thumbnail image is stored in the RAM 303. Here, the thumbnail image is stored together with the original image data, and the document attribute information and the image attribute information which were described in FIG. 27.

Subsequently, the timing detecting section 410 notifies the displaying processing section 408 of the number "NO." of the original image data, and instructs the displaying processing section to display the thumbnail image of the relevant original image data. The displaying processing section 408, which received the display instruction of the thumbnail image, changes the SMN in-displaying information of the image attribute data corresponding to the notified number to "TRUE", and obtains the thumbnail image from the RAM 303.

Then, the obtained thumbnail image is displayed in the predetermined region (S2302).

Next, the displaying processing section 408 changes the in-displaying information of the original image data being the remaining image indicated in S2302 to "FALSE".

After then, the remaining image is hidden, the display image data in which the thumbnail image is drawn at the position designated by the data in the region of the SMN coordinates is generated, and the generated display image data is transferred to the operation displaying section 403. Further, the operation displaying section 403 deletes the remaining image by projecting the transferred displayed image to the reading region 205 by using the projector 207 (S2303), and then the process is ended.

As described above, according to the sixth embodiment, it is possible to detect that the original document frames in the reading region 205 and shift the remaining image to the predetermined region as the thumbnail image.

Seventh Embodiment

The seventh embodiment is directed to the operation of detecting that the original document frames in the remaining image region, not the reading region 205, and then shifting the display image to the predetermined region based on the detected result.

Incidentally, since the network configuration, the outer appearance, the controller constitution and the software configuration which were described in the first embodiment are respectively the same as those in the seventh embodiment, the description thereof will be omitted.

Figure 30A:
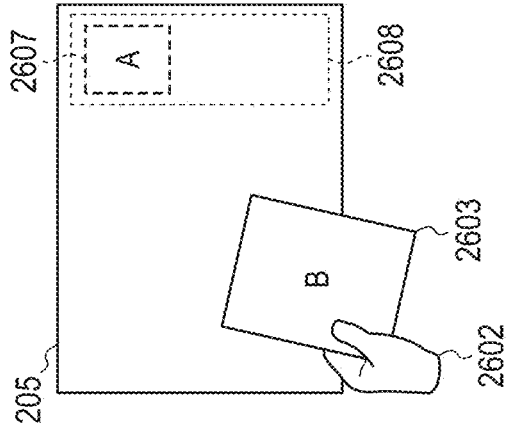
FIGS. 30A, 30B and 30C are diagrams for describing examples of original document handling and display images.
Figure 30B:
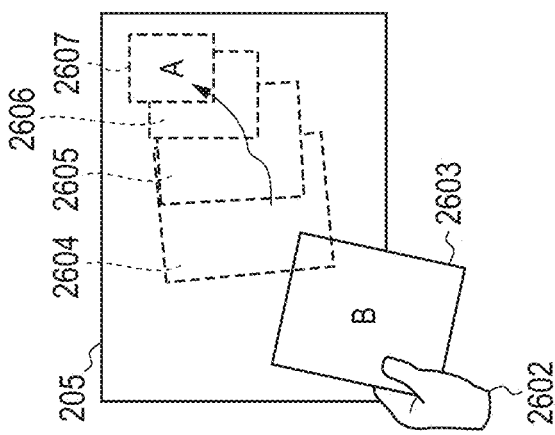
Figure 30C:
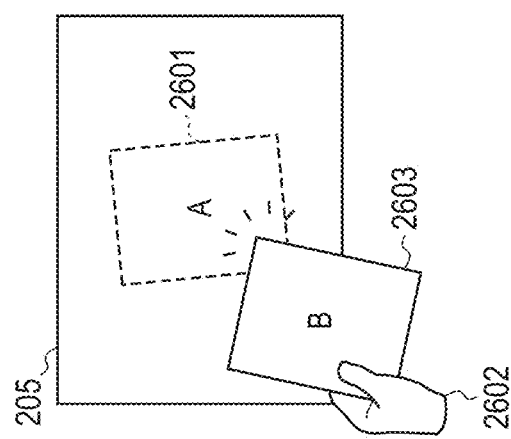

FIGS. 30A to 30C are diagrams for describing examples of original document handling and display images.

In FIGS. 30A to 30C, as well as FIGS. 8A to 8D in the first embodiment and FIGS. 16A to 16D in the second embodiment, it is assumed that the original document was imaged and the remaining image has been left.

FIG. 30A shows an aspect that, in a state that a remaining image 2601 is being displayed, a new original document 2603 held by a hand 2602 enters the remaining image region. That is, the detecting region for detecting the original document in FIG. 30A is the remaining image region in which the remaining image is displayed.

Then, the flow of FIG. 30A→FIG. 30B→FIG. 30C corresponds to the flow of shifting of the remaining image after the new original document 2603 entered the remaining image region.

In the present embodiment, if it is detected that the new original document 2603 enters the remaining image region, the remaining image 2601 which is being displayed is shifted to a predetermined region 2608 which does not obstruct reading of the new original document.

FIG. 30B shows transition images 2604 to 2607 which are displayed when the remaining image is shifted to the predetermined region.

FIG. 30C shows an aspect that a thumbnail image 2607 which is equivalent to the transition image 2607 is held in the predetermined region 2608 as the remaining image after the shifting.

Figure 31:
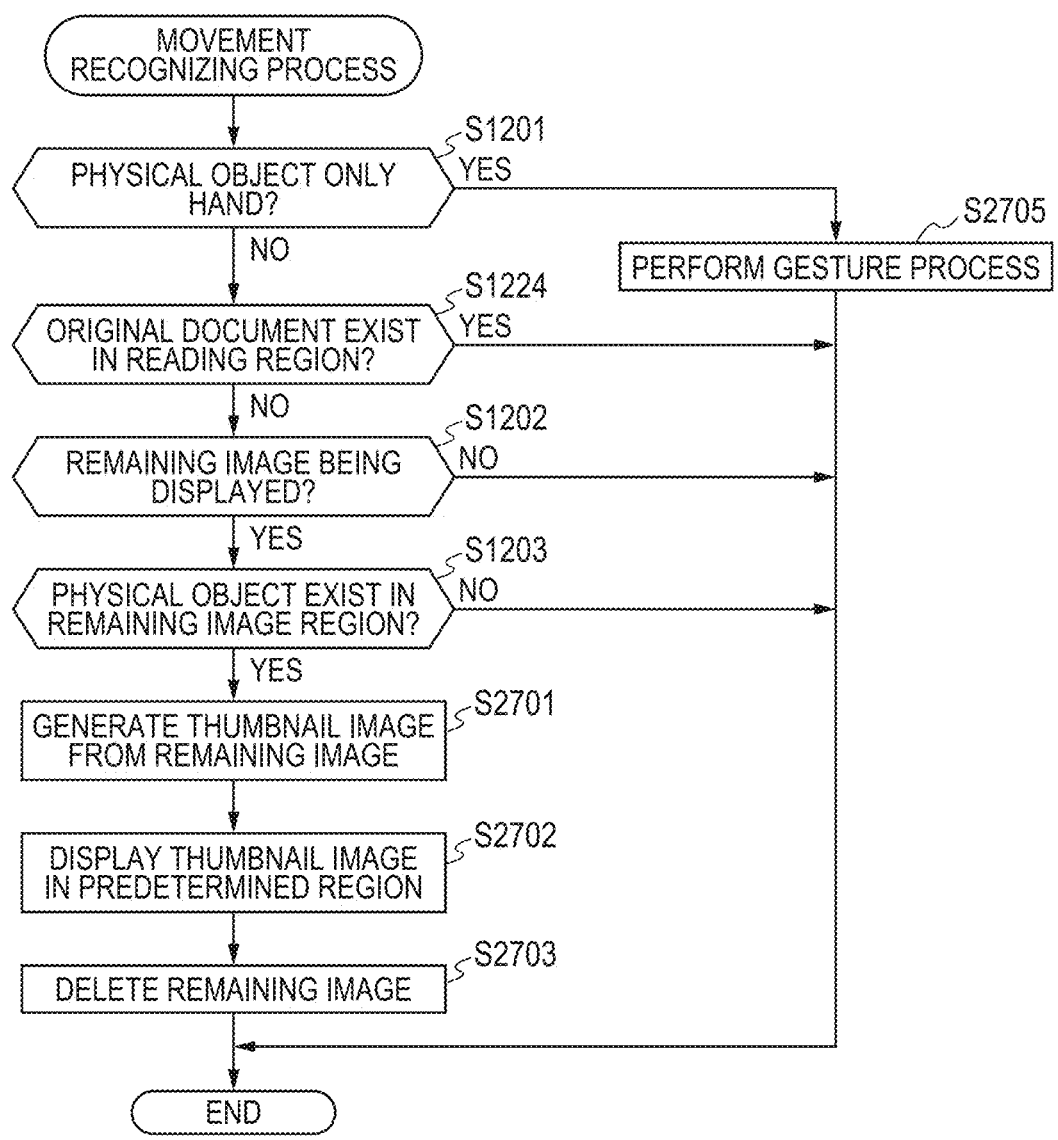
FIG. 31 is a flow chart indicating a procedure of the movement recognizing process in S625 of FIG. 17.

FIG. 31 is a flow chart indicating a procedure of the movement recognizing process in S625 of FIG. 17. Here, it should be noted that the reference numerals shown in this figure respectively indicate the step numbers of the corresponding processes in the procedure.

In FIG. 31, since the processes in S1201 to S1203 and S1224 are respectively the same as those in S1201 to S1203 and S1224 for the movement recognizing process shown in FIG. 19 in the second embodiment, processes in S2701 to S2703 are respectively the same as those in S2301 to S2303 of FIG. 29, and a process in S2705 is the same as that of S624 of FIG. 11, the descriptions thereof in FIG. 31 have been performed.

Incidentally, in the present embodiment, it may be possible in the gesture process of S2705 to add a new gesture such as a gesture of providing an instruction to change the remaining image to the thumbnail image and shift the obtained thumbnail image to the predetermined region, or a gesture of conversely providing an instruction to redisplay the remaining image which is the origin of the thumbnail image existing in the predetermined region.

As described above, according to the seventh embodiment, it is possible to detect that the original document enters the remaining image region and shift the remaining image to the predetermined region as the thumbnail image.

Eighth Embodiment

In the sixth and seventh embodiments, the remaining image is shifted as the thumbnail image to the predetermined region, in order to perform the continuous reading while leaving the remaining image and maintaining high recognition accuracy.

In the present embodiment, mainly, as the method of dealing with a case where the new original document is put so as to overlap the thumbnail image in the predetermined region, a method of shifting the thumbnail image will be described.

In addition, a method of dealing with a case where the predetermined region is filled with the thumbnail images because the plurality of original documents are continuously read, or a case where the plurality of original documents overlap in the previously prepared region because the original documents are relatively large as compared with the reading region 205 will be described.

Incidentally, since the network configuration, the outer appearance, the controller constitution and the software configuration which were described in the first embodiment are respectively the same as those in the eighth embodiment, the description thereof will be omitted.

FIG. 32A is a diagram illustrates the predetermined regions in which the thumbnail images are respectively displayed, in the reading region 205.

In FIG. 32A, predetermined regions 3001 to 3004 are provided. In the example of FIG. 32A, there are the four regions, and the thumbnail images are displayed in these regions respectively.

Here, each region may not be actually displayed in the reading region 205. Further, the initial position of each region has been predetermined, and the initial position is expanded in the RAM 303 when the operation is started.

Although the number of the regions is four in the present embodiment, the number is not limited to four. Further, the positions of the regions are not limited to the right, left, upper and lower ends as illustrated shown in FIG. 32A.

FIG. 32B is a diagram illustrating an aspect that an original document 3101 overlaps a thumbnail image 3102 displayed in the region 3001, and FIG. 32C is a diagram illustrating an aspect that the position to which the thumbnail image is arranged (hereinafter, called the arrangement position) is changed.

In the state shown in FIG. 32B, the extent in which the thumbnail image 3102 can be arranged is left at the under portion of the region 3001. Here, it is possible to discriminate whether or not the relevant extent is left, by checking whether or not an image having the size corresponding to the thumbnail image can be arranged at the portion of the region where the original document does not overlap.

If it is possible to change the arrangement position, the arrangement position of the thumbnail image 3102 is changed so as not to overlap the original document 3101 as illustrated in FIG. 32C.

In the changing of the arrangement position, the image of the region is first cut and carried off from the background image stored in the HDD 305 in S604 of FIG. 10, by using the position of the predetermined region stored in the RAM 303.

Then, by comparing the carried-off image of the region of the background image and the image obtained by subtracting the portion of the thumbnail image region from the image of the current region with each other, it is possible to discriminate, in the predetermined region, the region where the original document does not overlap.

By using the discriminated region, it is possible to confirm whether or not the region in which the thumbnail image can be arranged is left in the predetermined region.

Further, it is possible to obtain the size of the thumbnail image, by using the display coordinates in the image attribute information of FIG. 27, or the like.

FIGS. 33A to 33C are diagrams illustrating an aspect that the original document overlaps the predetermined region which is filled with the thumbnail images.

More specifically, FIG. 33A shows the aspect that, while thumbnail images 3202 to 3204 are being displayed in the region 3001, an original document 3201 overlaps the thumbnail images.

FIG. 33B shows that the regions 3002 to 3004 other than the region 3001 respectively have vacancies.

As shown in FIG. 33B, it is impossible to arrange all the thumbnail images 3202 to 3204 in the region 3001, but it is possible to arrange all the thumbnail images 3202 to 3204 in the regions 3002 to 3004.

Consequently, for example, by arranging the thumbnail images 3202 to 3204 in the region 3002, it is possible to display all the thumbnail images.

FIG. 33C shows the aspect that all the thumbnail images 3202 to 3204 are arranged in the region 3002.

Incidentally, it may be possible to provide the priority order for the four regions, and, according to the provided priority order, search for one by one the region in which all the thumbnail images can be arranged. As just described, the plurality of thumbnail image displaying regions are provided, and the thumbnail image is displayed in the thumbnail image displaying region which includes the position where the original document entered the detecting region and the thumbnail image do not overlap each other.

Moreover, when displaying the plurality of thumbnail images, the plurality of thumbnail images are displayed in the one thumbnail image displaying region in which all the plurality of thumbnail images can be displayed.

FIGS. 34A to 34D are diagrams illustrating an aspect that the thumbnail images are rearranged.

Figure 34A:
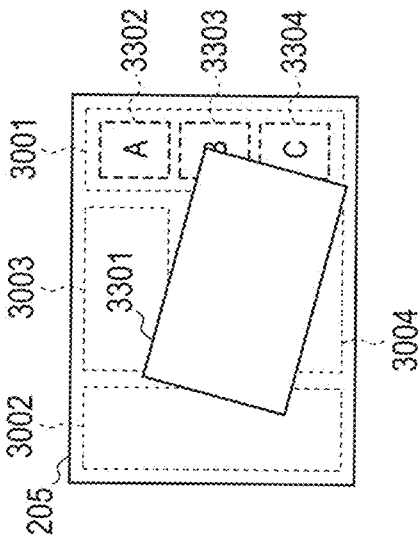
FIGS. 34A, 34B, 34C and 34D are diagrams illustrating an aspect that the thumbnail images are rearranged.

More specifically, FIG. 34A shows the aspect that three thumbnail images 3302 to 3304 are displayed in the region 3001 and an original document 3301 overlaps the thumbnail images 3303 and 3304.

As shown in this figure, it is possible in this state to merely arrange the one thumbnail image in the region 3001.

Figure 34B:
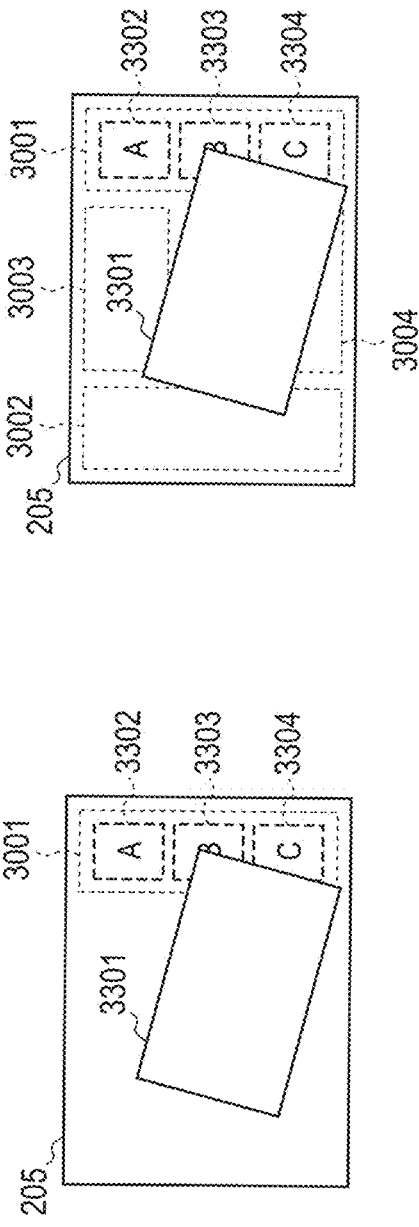

FIG. 34B shows that the regions 3002 to 3004 other than the region 3001 respectively have vacancies.

As shown in this figure, each of the regions 3002 and 3003 has the region in which the one thumbnail image can be arranged.

In such a case, by rearranging the thumbnail images across the regions, it is possible to arrange the thumbnail images so as not to overlap the original document 3301.

Figure 34C:
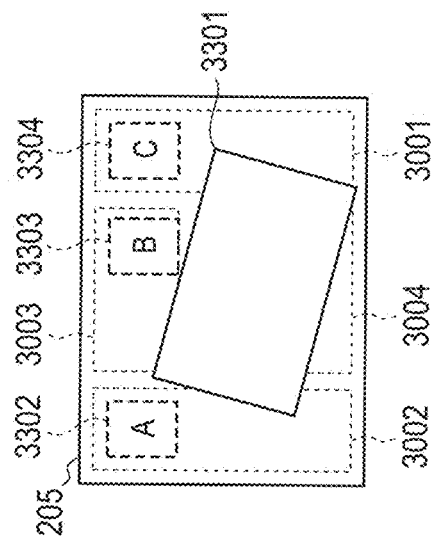
Figure 34D:
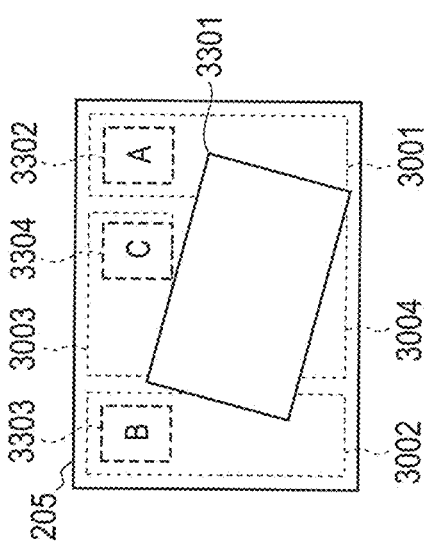

Each of FIGS. 34C and 34D shows an example that the thumbnail images 3302 to 3304 are rearranged.

More specifically, FIG. 34C shows the example that the thumbnail image 3303 is arranged in the region 3002, the thumbnail image 3304 is arranged in the region 3003, and the thumbnail image 3302 is arranged in the region 3001.

FIG. 34D shows the example that the thumbnail image 3302 is arranged in the region 3002, the thumbnail image 3303 is arranged in the region 3003, and the thumbnail image 3304 is arranged in the region 3001.

Here, it is assumed that the priority order is set to the order of the regions 3001, the region 3002, the region 3003 and the region 3004.

Incidentally, the change of FIG. 34A→FIG. 34C corresponds to the result obtained by allocating the thumbnail images one by one according to the above priority order.

However, in FIG. 34C, there is a possibility that the order of the thumbnail images is disturbed and thus it is difficult for a user to discriminate the respective thumbnail images.

In consideration of such a situation, in the case where the thumbnail images are rearranged in line like this time, as shown in FIG. 34D, it may be possible to rearrange and display the thumbnail images 3302, 3303 and 3304 in the order from the left.

Moreover, in order to cause the user to intuitively understand the destination to which the original thumbnail image was shifted, it may be possible to display the procedure of the shifting by an animation. As just described, when displaying the plurality of thumbnail images, if the one thumbnail image displaying region in which all the plurality of thumbnail images can be displayed does not exist, the plurality of thumbnail images are displayed across the plurality of thumbnail image displaying regions.

FIGS. 35A to 35C are diagrams illustrating an aspect that the thumbnail images are displayed in a lump.

More specifically, FIG. 35A shows the aspect that three thumbnail images 3402, 3403 and 3404 are displayed in the region 3001 and an original document 3401 overlaps the thumbnail images 3402 and 3403.

As shown in this figure, it is possible in this state to merely arrange the one thumbnail image in the region 3001.

FIG. 35B shows that the thumbnail image cannot be arranged in the regions 3002 to 3004 other than the region 3001. In this case, it is impossible to arrange the thumbnail images across the regions in the manner as shown in FIGS. 34A to 34D.

FIG. 35C shows the aspect that the thumbnail images are lumped together and displayed as a thumbnail image 3405.

As just described, if only one thumbnail image can be arranged, the movement recognizing section 412 instructs the displaying processing section 408 to create the display image in which the plurality of thumbnail images are lumped together.

Here, all the thumbnail images which are being displayed (also called the in-displaying thumbnail images, hereinafter) are piled up in the created display image, and the size of the display image is substantially equivalent to that of the one thumbnail image. At this time, the movement recognizing section 412 changes the values of the SMN coordinates of all the in-displaying thumbnail images to the coordinates of the region in which the one thumbnail image can be displayed. That is, the values of the SMN coordinates of all the thumbnail images become the same value. Thus, when displaying the plurality of thumbnail images, if only the one thumbnail image can be displayed, the image obtained by lumping the plurality of thumbnail images together to have the size approximately equivalent to that of the one thumbnail image is displayed.

FIGS. 36A to 36D are diagrams illustrating an aspect that the thumbnail images are reduced and displayed.

Figure 36A:
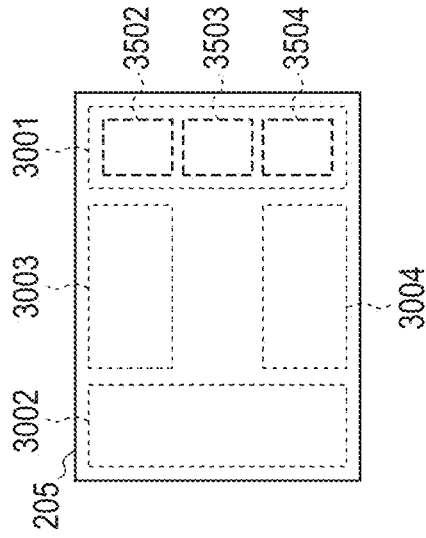
FIGS. 36A, 36B, 36C and 36D are diagrams illustrating an aspect that the thumbnail images are reduced and displayed.

More specifically, FIG. 36A shows the aspect that three thumbnail images 3502 to 3504 are displayed in the region 3001 and an original document 3501 overlaps the thumbnail images 3502 to 3504.

Figure 36C:
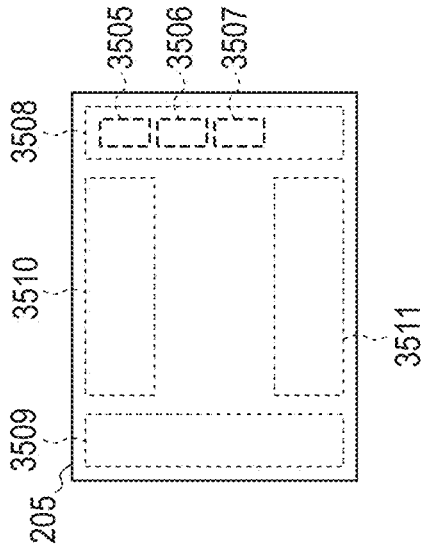
Figure 36B:
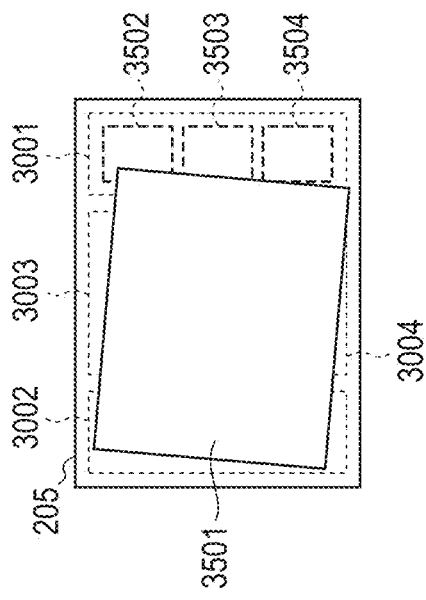

FIG. 36B shows the respective regions and the thumbnail images. Here, this figure is obtained by removing the original document 3501 from FIG. 36A.

As above, even the one thumbnail image cannot be displayed in any of the regions 3001 to 3004.

FIG. 36C shows the aspect that regions 3508 to 3511 of which the sizes have been reduced respectively are provided and thumbnail images 3505 to 3507 of which the sizes have been reduced respectively are displayed in the region 3508.

Figure 36D:
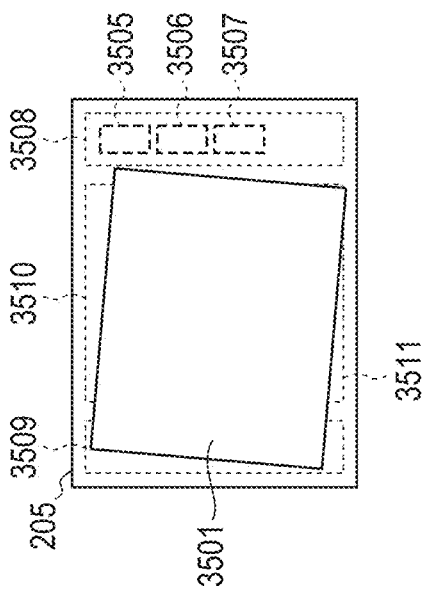

FIG. 36D shows the respective regions and the thumbnail images. Here, this figure is obtained by removing the original document 3501 from FIG. 36C.

In the state shown in FIG. 36A, if the movement recognizing section 412 performs the process of reducing the sizes of the respective regions, then the state is changed to that shown in FIG. 36C. Here, the initial value of the size of the region has been predetermined based on the coordinates stored in the RAM 303.

By reducing the size of the region, it is possible to display the thumbnail image if the size thereof is in conformity with the reduced size. However, if the size is too reduced, the user cannot confirm the image itself. Consequently, the lower limit of the size is predetermined. As just described, when displaying the thumbnail image, if the thumbnail image displaying region in which the thumbnail image can be displayed does not exist, the thumbnail image of which the size is reduced is displayed. Moreover, when reducing and displaying the thumbnail image, if the size of the reduced thumbnail image is equal to or smaller than the predetermined size, the thumbnail image is hidden.

FIGS. 37A to 37E are diagrams illustrating an aspect that the thumbnail image is too reduced in size when it is reduced.

More specifically, FIG. 37A shows the aspect that three thumbnail images 3602 to 3604 are displayed in the region 3001 and an original document 3601 overlaps the thumbnail images 3602 to 3604.

FIG. 37B shows the aspect that the three thumbnail images 3602 to 3604 are hidden because the sizes of these images are too reduced in the reduction process.

FIG. 37C shows the aspect that thumbnail images 3602 to 3604 are hidden, and FIG. 37D shows the hidden thumbnail images 3602 to 3604.

FIG. 37E shows the aspect that the thumbnail images 3602 to 3604 are displayed by detecting a hand 3605 in the state shown in FIG. 37D.

As just described, if the size is equal to or smaller than the predetermined size, the movement recognizing section 412 hides all the in-displaying thumbnail images, and changes the SMN in-displaying information of the hidden thumbnail images to "FALSE".

Figure 38:
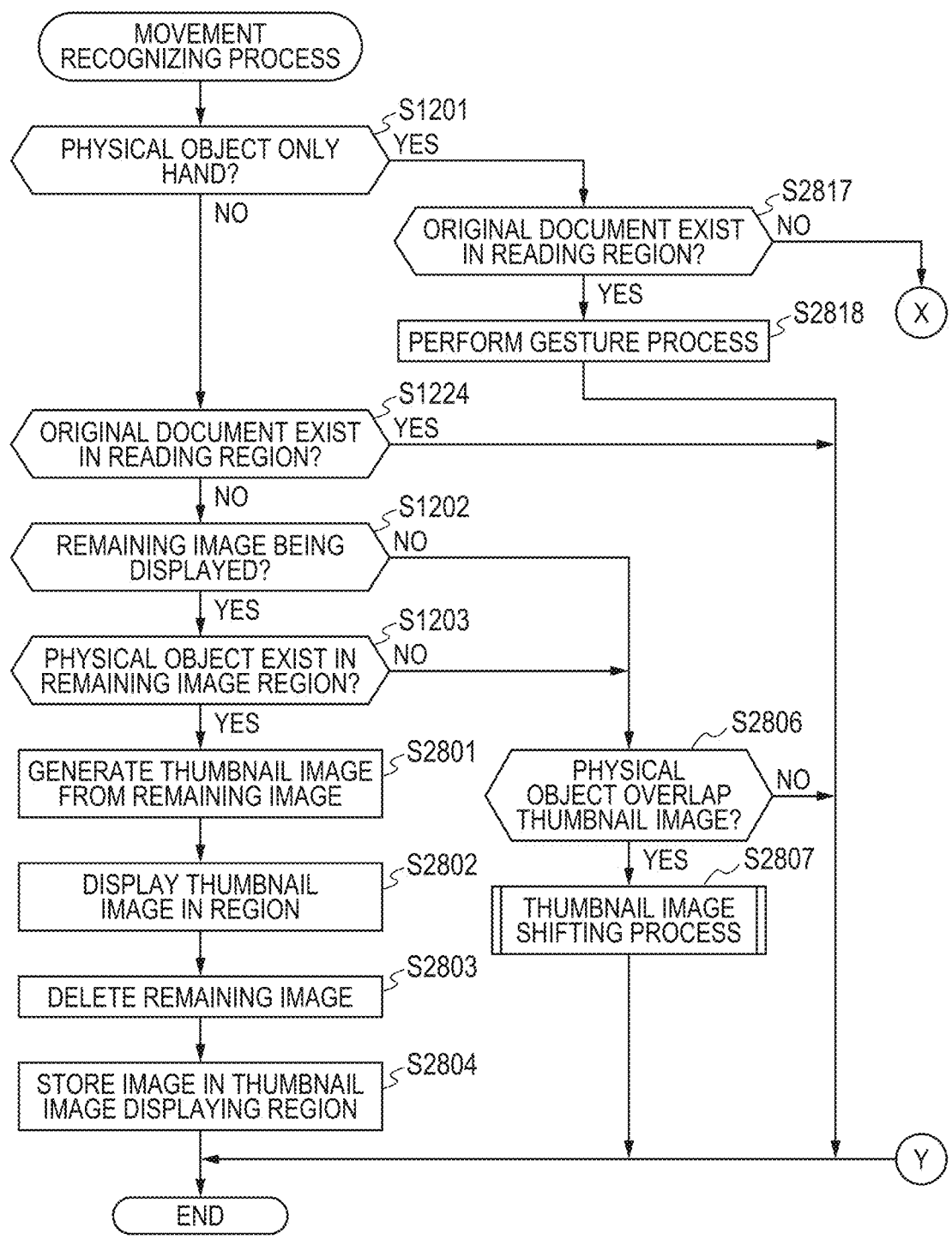
FIG. 38 is a flow chart indicating a procedure of the movement recognizing process in S625 of FIG. 17.
Figure 39:
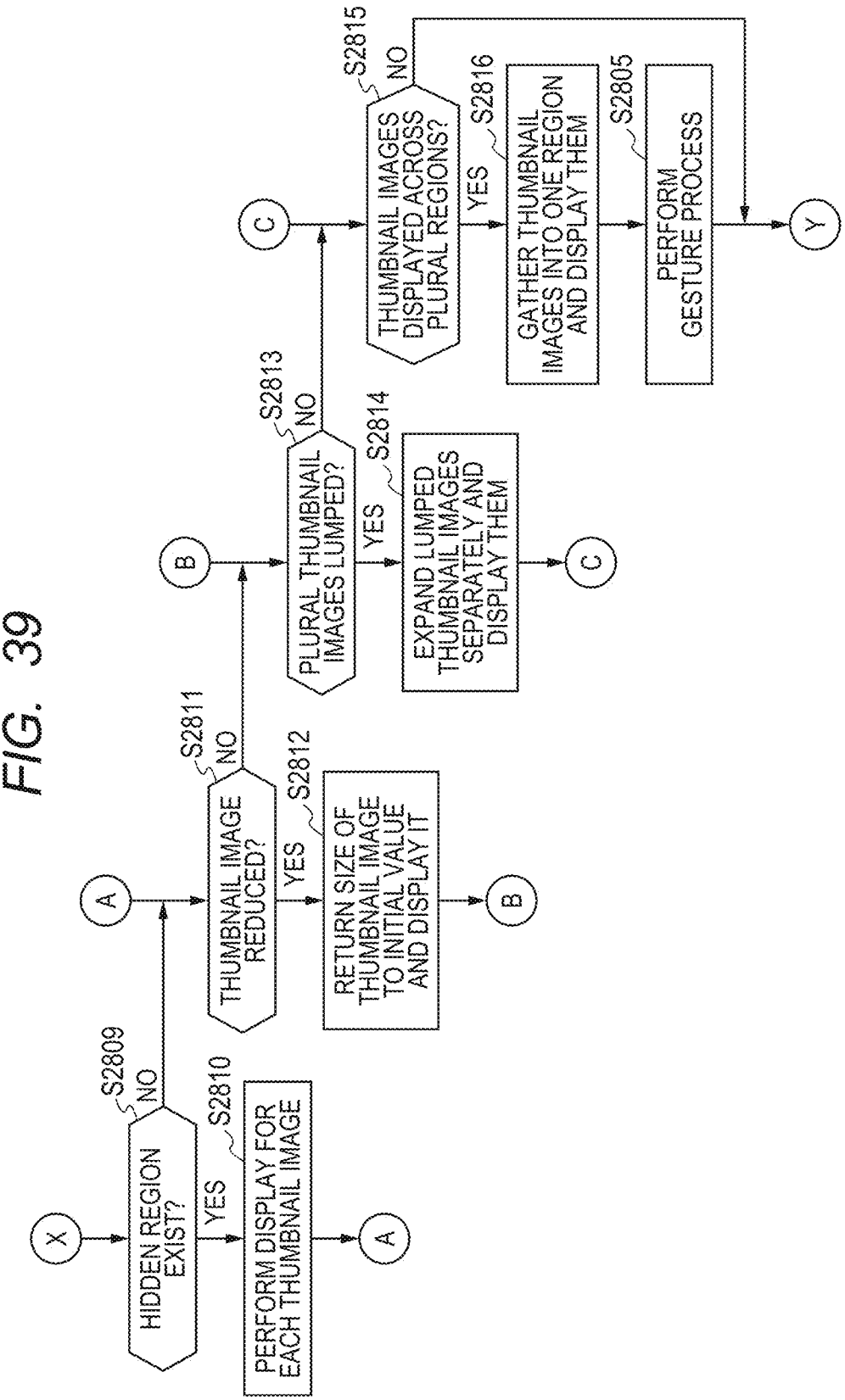
FIG. 39 is a flow chart indicating a procedure of the movement recognizing process in S625 of FIG. 17.

FIGS. 38 and 39 are flow charts indicating a procedure of the movement recognizing process in S625 of FIG. 17. Here, it should be noted that the reference numerals shown in this figure respectively indicate the step numbers of the corresponding processes in the procedure.

In FIG. 38, since the processes in S1201 to S1203 and S1224 are respectively the same as those of FIG. 19, the descriptions thereof will be omitted. Besides, since processes in S2801 to S2803 are respectively the same as those in S2301 to S2303 of FIG. 29, the descriptions thereof will be omitted.

Consequently, a process in S2804 subsequent to S2803 will be described first. The movement recognizing section 412 stores the image of the thumbnail image displaying region in the RAM 303. As will as FIG. 18C in the second embodiment, the method of storing the image is the same as the method of cutting and carrying off the image in the remaining image region and storing the relevant image.

As for the projection position of the thumbnail image, it only has to check the image attribute information of the thumbnail image. If the plurality of thumbnail images exist, the images are stored for all the thumbnail image displaying regions. After then, the process is ended.

If it is discriminated in S1202 that the remaining image is not being displayed (NO in S1202), the movement recognizing section 412 discriminates whether or not the physical object overlaps the thumbnail image (S2806). Likewise, if it is discriminated in S1203 that the physical object does not exist in the remaining image region 2101 (NO in S1203), the movement recognizing section 412 discriminates whether or not the physical object overlaps the thumbnail image (S2806). Here, the physical object is the original document.

Such discrimination can be performed in the manner same as that in the process in S1203 of FIG. 19. Namely, it is possible to perform the discrimination by comparing the image of the thumbnail image region stored in the RAM 303 in S2804 with the image in the current thumbnail image region. At this time, the discrimination is performed to all the thumbnail image regions stored in S2804.

If it is discriminated in S2806 that the physical object does not overlap the thumbnail image (No in S2806), the process is ended.

On the other hand, if it is discriminated in S2806 that the physical object overlaps the thumbnail image (YES in S2806), the movement recognizing section 412 performs a thumbnail image shifting process of shifting, within the region, the thumbnail image that the original document overlaps (S2807), and the process is ended. Incidentally, the thumbnail image shifting process will be described later.

Next, a process in S2817 will be described. The movement recognizing section 412 discriminates whether or not the original document which was read (also called the after-reading original document, hereinafter) is put (or exists) in the reading region 205 (S2817).

If it is discriminated in S2817 that the after-reading original document is put in the reading region 205 (YES in S2817), the movement recognizing section 412 performs a gesture process (S2818), and then the process is ended.

On the other hand, if it is discriminated in S2817 that the after-reading original document is not put in the reading region 205 (NO in S2817), the process is advanced to the procedure illustrated in FIG. 39. Then, the movement recognizing section 412 discriminates whether or not the region which was hidden by the thumbnail image shifting process exists (see FIG. 37D) (S2809).

Such discrimination can be performed by checking whether or not the SMN in-displaying information is "FALSE" although the values of the SMN coordinates of the thumbnail image exist.

If it is discriminated in S2809 that the hidden region exists (YES in S2809), each thumbnail image in the hidden region is redisplayed (S2810), and the process is advanced to S2811. At this time, the region itself may not be displayed. Thus, if the original document is not detected in the detecting region after the thumbnail image was hidden, the hidden thumbnail image is displayed.

By the above process, it is possible to redisplay the thumbnail image by detecting the hand, even where the thumbnail image is once hidden.

On the other hand, if it is discriminated in S2809 that the hidden region does not exist (NO in S2809), the movement recognizing section 412 discriminates whether or not the thumbnail image has been reduced (see FIG. 36C) (S2811).

Here, such discrimination can be performed by calculating the current size of the thumbnail image and then comparing the calculated size with the size of the thumbnail image determined as the initial value.

If it is discriminated in S2811 that the thumbnail image has been reduced (YES in S2811), the movement recognizing section 412 returns the sizes of the reduced region and the reduced thumbnail image to the respective initial values and then displays them (S2812), and the process is advanced to S2813. Thus, if the original document is not detected in the detecting region after the reduced thumbnail image was displayed, or if it is detected that the hand enters the detecting region, the thumbnail image of which the size has been returned to the initial value equivalent to the size before the reduction is displayed.

On the other hand, if it is discriminated in S2811 that the thumbnail image is not reduced (NO in S2811), the movement recognizing section 412 discriminates whether or not the plurality of thumbnail images have been lumped together (see FIG. 35C) (S2813).

In this case, it only has to discriminate whether or not the SMN coordinates are the same for all the thumbnail images.

If it is discriminated in S2813 that the plurality of thumbnail images have been lumped together (YES in S2813), the movement recognizing section 412 expands the lumped thumbnail images separately and displays them (S2814), and the process is advanced to S2815. Thus, if it is detected that the hand enters the detecting region after the lumped images were displayed, the lumped images are expanded, and the obtained separated thumbnail images and displayed.

On the other hand, if it is discriminated in S2813 that the plurality of thumbnail images are not lumped together (NO in S2813), the movement recognizing section 412 discriminates whether or not the thumbnail images are displayed across the plurality of regions (see FIGS. 34C and 34D) (S2815). Here, such discrimination can be performed by confirming the SMN coordinates.

If it is discriminated in S2815 that the thumbnail images are not displayed across the plurality of regions (NO in S2815), the process is advanced to S2805.

On the other hand, if it is discriminated in S2815 that the thumbnail images are displayed across the plurality of regions (YES in S2815), the movement recognizing section 412 gathers the thumbnail images into one region and displays them (S2816). If it is impossible to display the thumbnail images in the one region, then the thumbnail images are displayed in the plurality of regions respectively. Next, the gesture process is performed (S2805), and the process is ended.

By the above processes of FIG. 39, even where the thumbnail images are displayed across the plurality of regions, gathered or reduced, it is possible to display each of them at the original position with the size equivalent to the initial value. Moreover, it is possible for the user to redisplay the thumbnail image only by passing the hand over the reading region 205.

Figure 40:
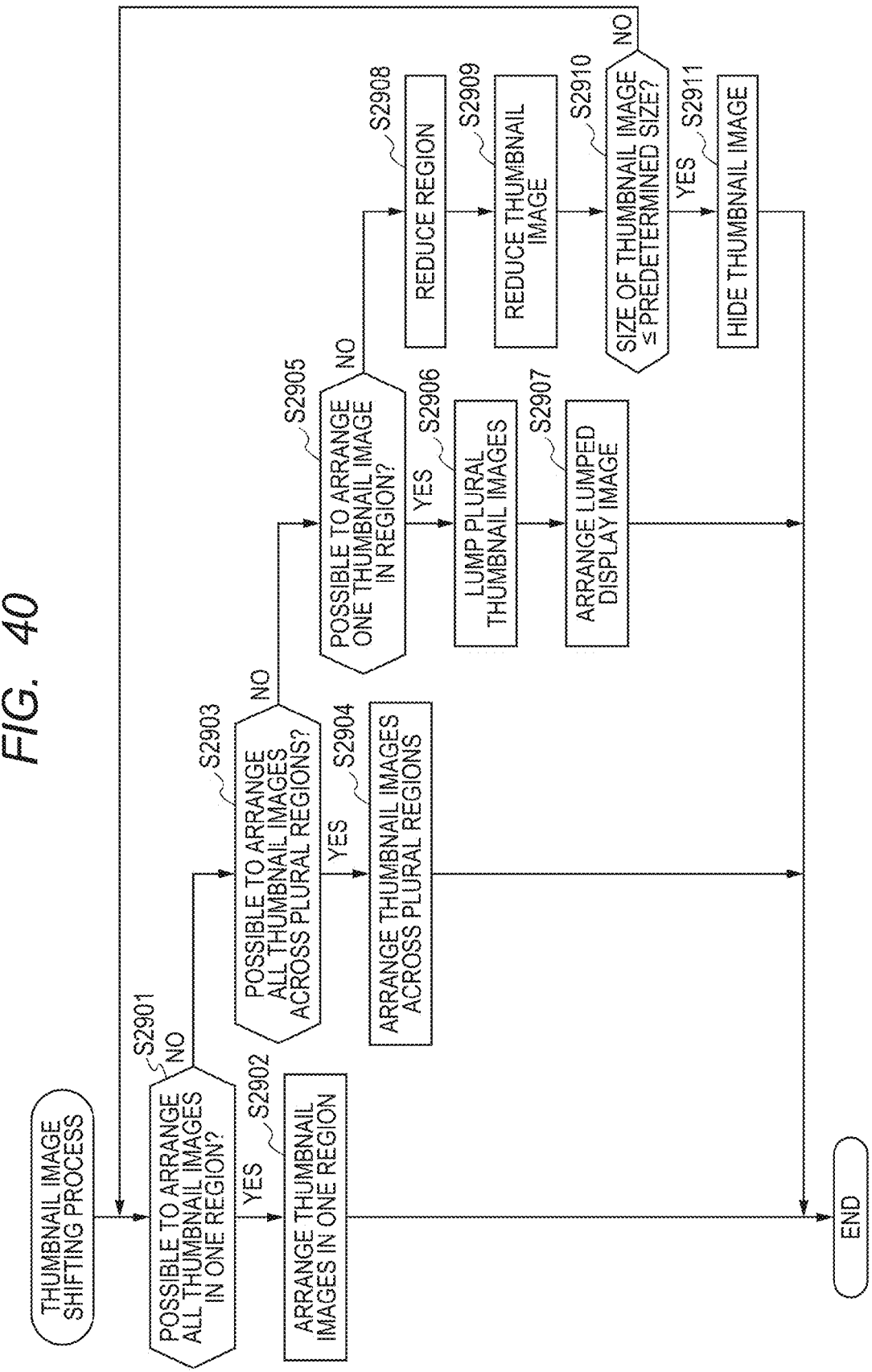
FIG. 40 is a flow chart indicating a procedure of a thumbnail image shifting process in S2807 of FIG. 38.

FIG. 40 is a flow chart indicating a procedure of the thumbnail image shifting process in S2807 of FIG. 38. Here, it should be noted that the reference numerals shown in this figure respectively indicate the step numbers of the corresponding processes in the procedure.

In FIG. 40, the movement recognizing section 412 discriminates whether or not all the thumbnail images can be arranged in one region among the predetermined regions 3001 to 3004 shown in FIG. 32A (see FIGS. 32B, 32C, and 33A to 33C) (S2901). For example, the discriminated result YES is given in FIG. 32B because it is possible to arrange all the thumbnail images (one in this case) in the one region.

If it is discriminated in S2901 that all the thumbnail images can be arranged in the one region (YES in S2901), the movement recognizing section 412 arranges the thumbnail images in the one region (S2902), and the process is ended.

For example, the thumbnail image 3102 is shifted as shown in FIG. 32C, and the thumbnail images 3202 to 3204 are shifted as shown in FIG. 33C.

At this time, the movement recognizing section 412 instructs the displaying processing section 408 to shift the thumbnail image. On this occasion, also the information indicating the displayable position of the region discriminated in S2901 is together transferred to the displaying processing section. Here, as the information indicating the displayable position, the information such as the coordinates indicating the rectangular region included in the region or the like may be used if it is possible by this information to uniquely determine the region.

The displaying processing section 408, which received such a shifting instruction, generates the display image in which the thumbnail image is pasted to the shown displayable position of the region, and then instructs the operation displaying section 403 to draw the generated display image.

If it is discriminated in S2901 that all the thumbnail images cannot be arranged in the one region (NO in S2901), the movement recognizing section 412 discriminates whether or not all the thumbnail images can be arranged across the plurality of regions (see FIGS. 34A to 34D) (S2903).

If it is discriminated in S2903 that all the thumbnail images can be arranged across the plurality of regions (YES in S2903), the movement recognizing section 412 arranges all the thumbnail images across the plurality of regions (S2904), and the process is ended.

More specifically, the movement recognizing section 412 instructs the displaying processing section 408 to shift the thumbnail image. On this occasion, the information indicating the displayable position across the plurality of regions discriminated in S2903 is together transferred to the displaying processing section. The displaying processing section 408, which received such a shifting instruction, creates the display image after the shifting of the thumbnail image and then displays the created display image.

If it is discriminated in S2903 that all the thumbnail images cannot be arranged across the plurality of regions (NO in S2903), the movement recognizing section 412 discriminates whether or not the one thumbnail image can be arranged in the region (see FIGS. 35A to 35C) (S2905).

Incidentally, if the number of the thumbnail images is one, the discriminated result YES is given in S2901. Consequently, it is apparent that, if the procedure reaches the process in S2905, the plurality of thumbnail images exist.

If it is discriminated in S2905 that the one thumbnail image can be arranged in the region (YES in S2905), the movement recognizing section 412 instructs the displaying processing section 408 to create the display image in which the plurality of thumbnail images are lumped together, thereby lumping the plurality of thumbnail images together (S2906).

Next, the displaying processing section 408 arranges the image in which all the thumbnail images have been lumped together (S2907), and the process is ended. Thus, all the thumbnail images are lumped together and shifted to the one position, so that the thumbnail images do not overlap the original document.

If it is discriminated in S2905 that the one thumbnail image cannot be arranged in the region (NO in S2905), the movement recognizing section 412 reduces the region (i.e., the size of the region) (S2908).

Next, the movement recognizing section 412 reduces the thumbnail image (i.e., the size of the thumbnail image) in conformity with the reduced region (S2909). In this process, it only has to adjust the SMN coordinates corresponding to the coordinates of the thumbnail image.

Next, the movement recognizing section 412 discriminates whether or not the size of the thumbnail image is equal to or smaller than a predetermined size (S2910). Here, the predetermined size corresponds to the lower limit size by which the thumbnail image can be recognized.

If it is discriminated in S2910 that the size of the thumbnail image is not equal to or smaller than the predetermined size (NO in S2910), the process is returned to S2901.

On the other hand, if it is discriminated in S2910 that the size of the thumbnail image is equal to or smaller than the predetermined size (YES in S2910), the thumbnail image is hidden (S2911), and the process is ended.

Subsequently, the flow of the procedure in which the reduced thumbnail images are arranged in S2902 will be described in detail. First, the thumbnail image is reduced in S2909, the process is returned from S2910 to S2901. Then, if it is discriminated in S2901 that all the thumbnail images can be arranged in the reduced region 3508 (see FIG. 36D), then the reduced thumbnail images are arranged and displayed in S2902.

Then, as shown in FIGS. 37A to 37E, if the original document 3601 further overlaps the reduced thumbnail images 3602 to 3604 and thus the region 3001 is reduced repeatedly, it is then discriminated in S2910 that the size of the thumbnail image is equal to or smaller than the predetermined size. In this case, the thumbnail image is hidden as shown in FIG. 37B.

As described above, in the eighth embodiment, if the new original document is put such that the new original document overlaps the thumbnail image in the predetermined region, it is possible to shift the thumbnail image. Thus, it is possible to prevent deterioration of the recognition rate of the original document caused by the overlap of the original document and the thumbnail image.

Ninth Embodiment

In the eighth embodiment, the thumbnail image is shifted if the original document overlaps the thumbnail image, and it is thus possible to prevent the overlap between the thumbnail image and the original document. In the present embodiment, when redisplaying the thumbnail image which was shifted or hidden, a method of redisplaying the thumbnail image by detecting the frame-out is used, instead of the method as in the eighth embodiment of recognizing the user's hand.

Incidentally, since the network configuration, the outer appearance, the controller constitution and the software configuration which were described in the first embodiment are respectively the same as those in the ninth embodiment, the description thereof will be omitted.

Figure 41:
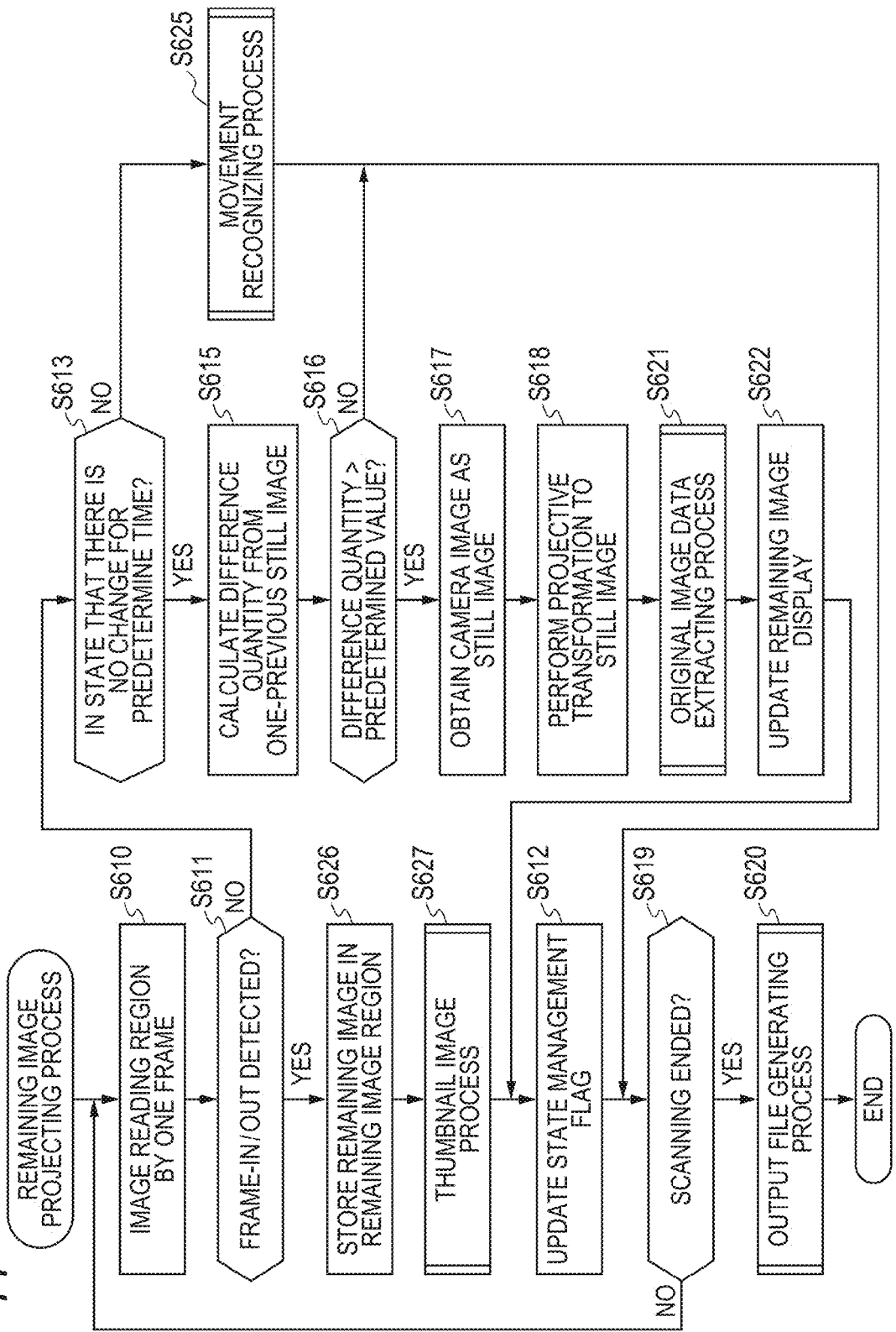
FIG. 41 is a flow chart indicating a procedure of the remaining image projecting process to be performed by the imaging processing section and the timing detecting section.

FIG. 41 is a flow chart indicating a procedure of the remaining image projecting process to be performed mainly by the imaging processing section 406 and the timing detecting section 401 illustrated in FIG. 4. Here, it should be noted that the reference numerals shown in this figure respectively indicate the step numbers of the corresponding processes in the procedure.

The remaining image projecting process illustrated in FIG. 41 is different from the remaining image projecting process illustrated in FIG. 17 in the point that a thumbnail image process (S627) is inserted between S626 and S612 of FIG. 17, and the point concerning the contents of the movement recognizing process.

In the movement recognizing process in S625 of FIG. 41, the shifting of the remaining image, the shifting of the thumbnail image and the gesture process are performed. Moreover, in the thumbnail image process in S627, a redisplaying process of the thumbnail image is mainly performed to deal with a case where the thumbnail image is hidden in the movement recognizing process. Initially, the movement recognizing process in S625 will be described.

Figure 42:
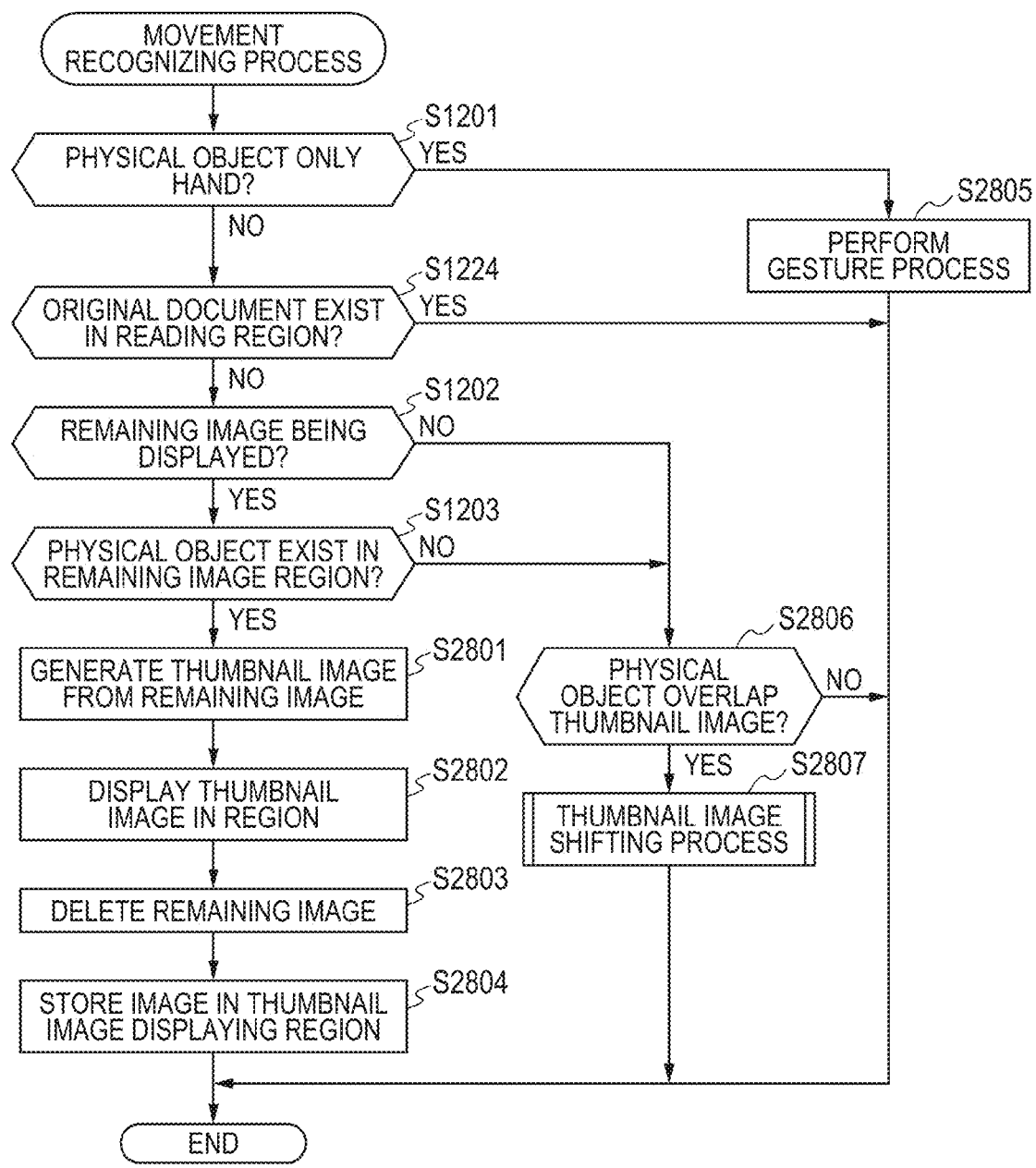
FIG. 42 is a flow chart indicating a procedure of a movement recognizing process in S625 of FIG. 41.

FIG. 42 is a flow chart indicating a procedure of the movement recognizing process in S625 of FIG. 41. Here, it should be noted that the reference numerals shown in this figure respectively indicate the step numbers of the corresponding processes in the procedure.

Here, since all the respective steps in the movement recognizing process illustrated in FIG. 42 are included in the movement recognizing process described in FIG. 38, the descriptions thereof will be omitted. Incidentally, in the movement recognizing process illustrated in FIG. 42, a process of displaying the thumbnail image is not included unlike the movement recognizing process illustrated in FIG. 39.

Figure 43:
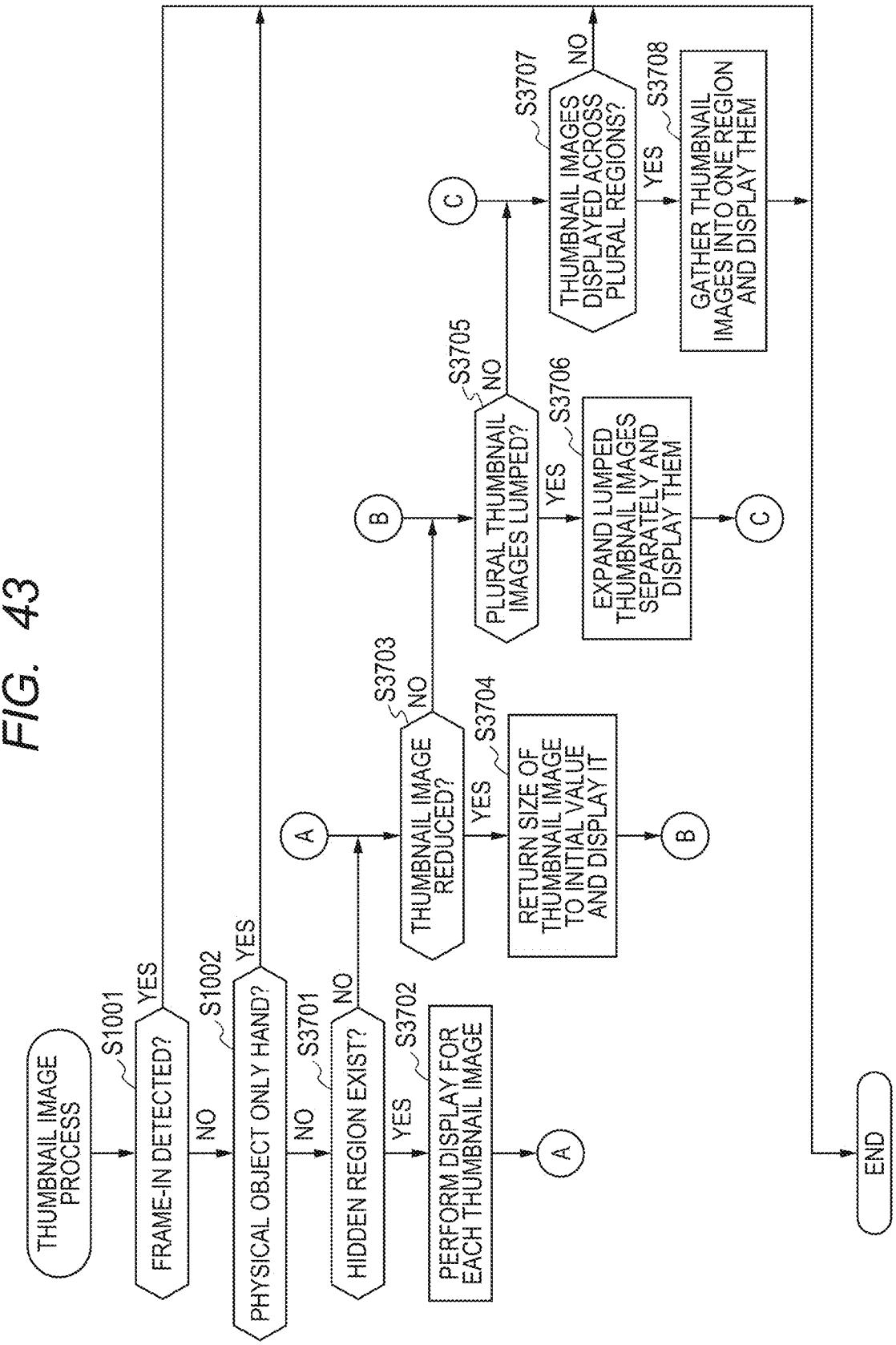
FIG. 43 is a flow chart indicating a procedure of a thumbnail image process in S627 of FIG. 41.

FIG. 43 is a flow chart indicating a procedure of the thumbnail image process in S627 of FIG. 41. Here, it should be noted that the reference numerals shown in this figure respectively indicate the step numbers of the corresponding processes in the procedure. Incidentally, it should be noted that the thumbnail image process is performed by the timing detecting section 410.

In FIG. 43, the timing detecting section 410 discriminates whether or not the frame-in is detected (S1001). If it is discriminated in S1001 that the frame-in is detected (YES in S1001), the process is ended.

On the other hand, if it is discriminated in S1001 that the frame-in is not detected, that is, if the frame-out is detected (NO in S1001), the timing detecting section 410 discriminates whether or not the physical object for which the frame-out was detected is only the hand (S1002).

If it is discriminated in S1002 that the physical object is only the hand (YES in S1002), the process is ended.

On the other hand, if it is discriminated in S1002 that the physical object is not only the hand, that is, the physical object includes the original document in addition to the hand (NO in S1002), the process is advanced to S3701.

Incidentally, since the processes in S3701 to S3708 are respectively the same as those in S2809 to S2816 of FIG. 39, the descriptions thereof will be omitted.

As described above, in the ninth embodiment, since the processes in S3701 to S3708 are performed at the timing of the frame-out, it is possible to perform the redisplaying process of the thumbnail image by using the hiding of the thumbnail image or the frame-out of the original document as a trigger, thereby improving user's operability.

Tenth Embodiment

In the eighth and ninth embodiments, to perform the continuous reading while leaving the remaining image and maintaining the high recognition accuracy, the thumbnail image is shifted in the predetermined region when the original document overlaps the thumbnail image. In the present embodiment, the thumbnail image is shifted while keeping it as large as possible.

Incidentally, since the network configuration, the outer appearance, the controller constitution and the software configuration which were described in the first embodiment are respectively the same as those in the tenth embodiment, the description thereof will be omitted.

In the tenth embodiment, the thumbnail image process in S627 of FIG. 41 described in the ninth embodiment is performed. Here, it may be possible to perform the processes in S2809 to S2816 of FIG. 39 not only in the case where the frame-out is detected but also in a case where the hand is recognized as described in the eighth embodiment.

Further, since the process content in S2807 of FIG. 42 described in the ninth embodiment is different in the tenth embodiment, this process will be first described hereinafter. Initially, the operation of shifting the thumbnail image while keeping the thumbnail image as large as possible will be described.

FIGS. 44A to 44G are diagrams illustrating an aspect that the region in which the thumbnail image can be arranged is searched for.

More specifically, FIG. 44A shows the aspect that an original document 3801 overlaps a thumbnail image 3802 in the region 3001.

In this case, when shifting the thumbnail image in the region 3001, the original document 3801 overlaps the thumbnail image if the thumbnail image is shifted to any position in the region. Consequently, it is necessary to reduce both the region and the thumbnail image.

However, if the limitation "in the region" is eliminated, there is a possibility that the original document 3801 and the thumbnail image 3802 can be arranged such that they do not overlap each other. For example, if the thumbnail image 3802 is shifted to the lower right of the reading region 205 as described later, it is possible to arrange the thumbnail image 3802 so as not to overlap the original document 3801.

FIGS. 44B to 44F show the aspect of searching for the region in which the thumbnail image 3802 can be arranged. Also, this region will be called the arrangeable region, hereinafter.

In FIGS. 44B to 44F, the size of a searching region 3803 is the same as that of the thumbnail image, and this region is used to previously confirm whether or not the thumbnail image can be arranged at the position of this region.

The movement recognizing section 412 obtains the searching region 3803 from the image of the current frame, and compares the obtained region with the image of the same region of the background image in the reading region stored in the HDD 305.

As a result of such comparison, if a difference obtained by the comparison is equal to or smaller than a predetermined value, it is considered that anything is put in this region, and this region is given as the arrangeable region. On the other hand, if the obtained difference is larger than the predetermined value, this region is not given as the arrangeable region.

As shown in the flow of FIG. 44B→FIG. 44C→FIG. 44D→FIG. 44E, the searching region 3803 is shifted in units of minute pixel numbers, and the arrangeable region is searched for in the entire reading region 205. As the information concerning the arrangeable region, information such as the coordinate information by which the arrangeable region can be uniquely identified is sequentially updated every time the searching is performed, and the updated information is stored in the RAM 303.

Here, a searching region 3804 shown in FIG. 44F is the arrangeable region which is searched for and finally found.

FIG. 44G shows the aspect that the thumbnail image 3802 is arranged at the center of the searching region 3804.

Figure 45:
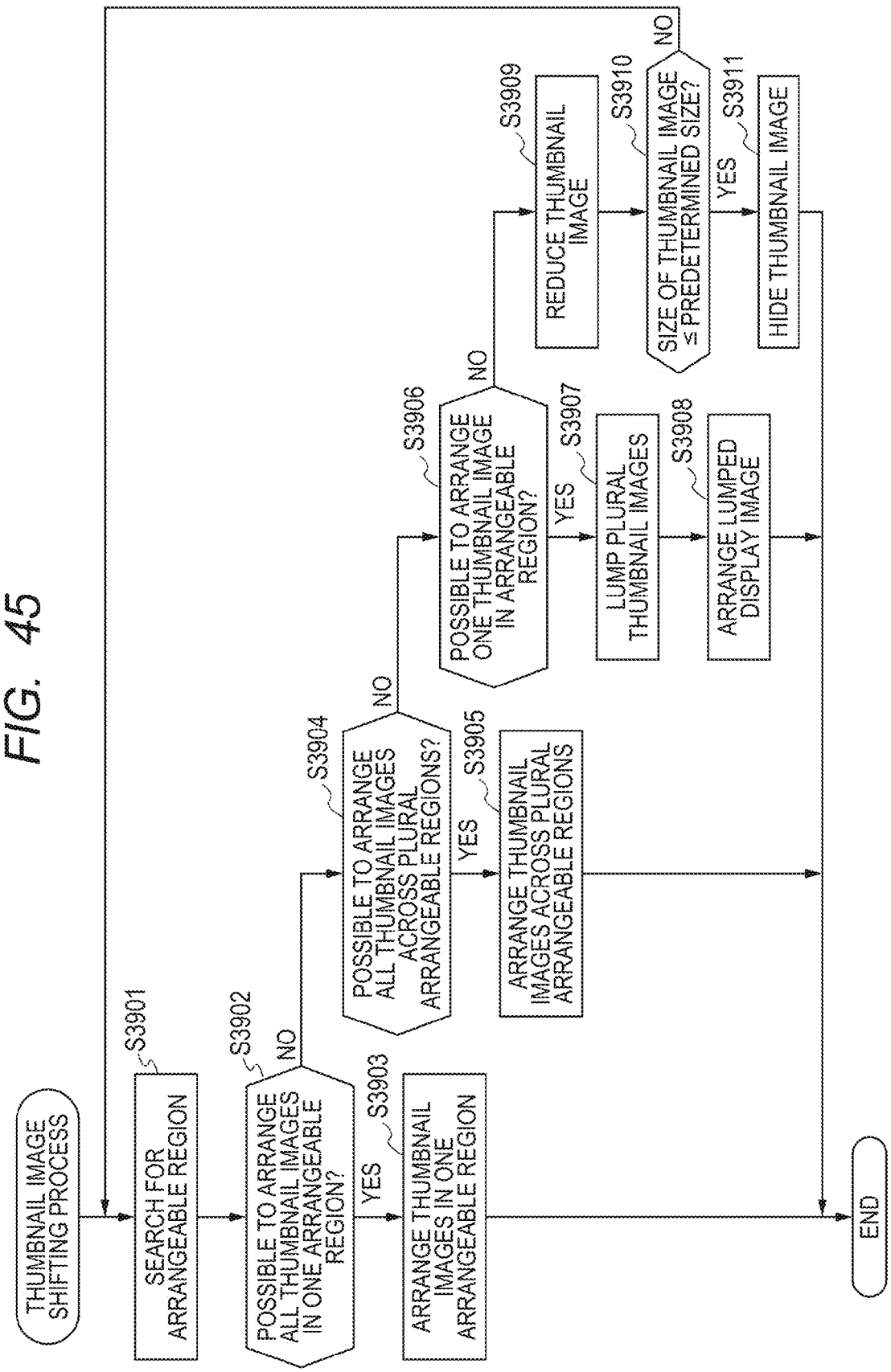
FIG. 45 is a flow chart indicating a procedure of a thumbnail image shifting process in S2807 of FIG. 42.

FIG. 45 is a flow chart indicating a procedure of the thumbnail image shifting process in S2807 of FIG. 42. Here, it should be noted that the reference numerals shown in this figure respectively indicate the step numbers of the corresponding processes in the procedure.

In FIG. 45, the movement recognizing section 412 searches for the arrangeable region as described in FIGS. 44A to 44G (S3901).

Next, the movement recognizing section 412 discriminates whether or not all the thumbnail images can be arranged in the found one arrangeable region (S3902). In other words, it is discriminated whether or not it is possible to arrange all the thumbnail images in the found one arrangeable region. In any case, such discrimination can be performed by comparing the arrangeable region with the total area and the horizontal/vertical lengths of the thumbnail images, on the basis of the coordinate information of the arrangeable region stored in the RAM 303, and the SMN coordinates, the widths, the heights and the like stored in the RAM 303.

If it is discriminated in S3902 that all the thumbnail images can be arranged in the one arrangeable region (YES in S3902), the movement recognizing section 412 shifts the thumbnail image to the one arrangeable region (S3903), and the process is ended.

In S3903, the SMN coordinates are rewritten, and an instruction for shifting the thumbnail image is given to the displaying processing section 408. Then, the displaying processing section 408, which received the shifting instruction, generates the display image, and instructs the operation displaying section 403 to draw the generated display image.

On the other hand, if it is discriminated in S3902 that all the thumbnail images cannot be arranged in the one arrangeable region (NO in S3902), the movement recognizing section 412 discriminates whether or not all the thumbnail images can be arranged across the plurality of arrangeable regions (S3904). In other words, it is discriminated whether or not it is possible to arrange all the thumbnail images across the plurality of arrangeable regions.

Incidentally, if the plurality of arrangeable regions cannot be found, the discriminated result NO is given in S3904.

If it is discriminated in S3904 that all the thumbnail images can be arranged across the plurality of arrangeable regions (YES in S3904), the movement recognizing section 412 arranges all the thumbnail images across the plurality of arrangeable regions (S3905), and the process is ended.

On the other hand, if it is discriminated in S3904 that all the thumbnail images cannot be arranged across the plurality of arrangeable regions (NO in S3904), the movement recognizing section 412 discriminates whether or not the one thumbnail image can be arranged in the arrangeable region (S3906).

If it is discriminated in S3906 that the one thumbnail image can be arranged in the arrangeable region (YES in S3906), the movement recognizing section 412 instructs the displaying processing section 408 to create the display image in which the plurality of thumbnail images are lumped together, thereby lumping the plurality of thumbnail images together (S3907).

Next, the displaying processing section 408 arranges the image in which all the thumbnail images have been lumped together (S3908), and the process is ended.

On the other hand, if it is discriminated in S3906 that the one thumbnail image cannot be arranged in the region (NO in S3906), the movement recognizing section 412 reduces the thumbnail image (i.e., the size of the thumbnail image) (S3909). In this case, it only has to adjust the coordinates of the thumbnail image, i.e., the SMN coordinates.

Next, the movement recognizing section 412 discriminates whether or not the size of the thumbnail image is equal to or smaller than a predetermined size (S3910). Here, the predetermined size corresponds to the lower limit size by which the thumbnail image can be recognized.

If it is discriminated in S3910 that the size of the thumbnail image is not equal to or smaller than the predetermined size (NO in S3910), the process is returned to S3901.

On the other hand, if it is discriminated in S3910 that the size of the thumbnail image is equal to or smaller than the predetermined size (YES in S3910), the thumbnail image is hidden (S3911), and the process is ended.

In the present embodiment, since the limitation "in the region" is eliminated, any process corresponding to the region reducing process in S2908 of FIG. 40 is not provided.

As described above, in the tenth embodiment, the limitation "in the region" is not provided, and it is possible to shift and arrange the thumbnail image while keeping the size of the thumbnail image as large as possible in a vacant region.

Thus, it is possible to view the thumbnail image with a larger size, thereby improving discriminability of the thumbnail image.

When shifting the thumbnail image, it may be possible to display the procedure of the shifting by an animation to cause the user to intuitively understand the procedure.

As described above, according to the camera scanner 101 in the present embodiment, it is possible, while achieving the continuous reading of the original documents by using the rest-state detection on the document platen, to display and operate the remaining image indicating the original document to be used for confirmation on the document platen. In addition, it is possible to improve the user's operability without deteriorating the recognition rate of the original document.

Further, in the present embodiment, if it is detected that the physical object enters the detecting region, the remaining image is shifted and then displayed as the thumbnail image. In doing so, when performing the continuous reading of the original documents by the camera scanning, it is possible to display the display image for confirmation every time the original document is read, and, at the same time, prevent that the recognition rate of the original document deteriorates due to the overlap between the remaining image and the next original document.

Further, in the present embodiment, it is discriminated whether or not the physical object which enters the detecting region is the hand. In doing so, it is possible to enable the user to operate the display image directly by the hand.

According to the above embodiments, the remaining image which is the image indicating the original document is displayed at the position where this original document was put (S622), and, when it is detected that the next original document enters the detecting region, the thumbnail image of the remaining image is displayed so as not to overlap the entered next original document in the detecting region (S2303). Thus, since the thumbnail image which acts as the remaining image for confirmation is automatically displayed each time, it is possible to improve the operability of the user who uses the image processing apparatus which images the original document and displays the imaged original document.

Other Embodiments

The present invention is also achieved by supplying software (program) for achieving the functions of the above embodiments to a system or an apparatus through a network or various storage media, and reading and executing the program codes of the supplied software with the computer (a CPU, an MPU (micro processing unit), etc.) of the system or the apparatus. In this case, the program and the storage medium storing the program constitute the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-221101, filed Oct. 24, 2013, which is hereby incorporated by reference herein in its entirety.

What is claimed is:

1. An information processing apparatus which is equipped with a board on which an original document can be put, the information processing apparatus comprising:
   a camera;
   a projector;
   a memory that stores a set of instructions; and
   one or more processors that execute the instructions to:
      cause the camera to image a first original document put in an imaging region on the board;
      cause the projector to project a first image obtained by imaging the first original document with the camera, into the imaging region on the board;
      determine a timing of imaging, with the camera, a second original document newly put in the imaging region on the board, after removing the first original document from the imaging region;
      cause the projector to stop the projection of the first image into the imaging region on the board, before the timing of imaging the second original document comes;
      cause the camera to image the second original document put in the imaging region on the board, after stopping the projection of the first image;
      cause the projector to project a second image, obtained by imaging the second original document with the camera, into the imaging region on the board;
      determine an entering situation of the second original document into a detection region on the board based on an image imaged by the camera;
      cause the projector to stop the projection of the first image, based on the entering situation of the second original document into the determined detection region; and
      cause the projector to stop the projection of the first image by thinning a density of the first image in proportion to an increase of a percentage of an overlap between the second original document that entered the detection region and the detection region.

2. The information processing apparatus according to claim 1, wherein the one or more processors execute the instructions to:
   cause the projector to stop the projection of the first image, according to the determination that the second original document enters the detection region.

3. The information processing apparatus according to claim 1, wherein the one or more processors execute the instructions to:
   cause the projector to stop the projection of the first image, according to a lapse of a predetermined time from the determination that the second original document enters the detection region.

4. The information processing apparatus according to claim 1, wherein the one or more processors execute the instructions to:
   determine that a hand enters the detection region; and
   cause the projector to continue the projection of the first image into the imaging region, according to the determination that the hand enters the detection region.

5. The information processing apparatus according to claim 1, wherein the detection region is the imaging region.

6. The information processing apparatus according to claim 1, wherein the detection region is a projection region in which the first image is being projected.

7. The information processing apparatus according to claim 1, wherein the one or more processors execute the instructions to:
   cause the projector to project the first image to a position on the board where the first original document has been put on.

8. An information processing apparatus which is equipped with a board on which an original document can be put, the information processing apparatus comprising:
   a camera configured to image the original document put in an imaging region on the board;
   a projector configured to project an image of the original document obtained by imaging the original document with the camera, within the imaging region on the board;
   a memory that stores a set of instructions; and
   one or more processors that execute the instructions to:
      cause the projector to project the image of the original document obtained by imaging the original document with the camera, within the imaging region on the board;
      determine an entering state of a next original document into a detection region on the board; and
      cause the projector to not project the image of the original document within the imaging region by lowering a density of the image of the original document according to a percentage of overlap between the next original document which entered the detecting region and the detecting region as the percentage becomes larger, based on the determined entering state of the next original document into the detection region.

9. The information processing apparatus according to claim 8, wherein the one or more processors execute the instructions to:
   cause the projector to stop the projection of the image of the original document within the imaging region.

10. The information processing apparatus according to claim 9, wherein the one or more processors execute the instructions to:
   cause the projector to stop the projection of the image of the original document within the imaging region, according to the determination that the next original document enters the detection region.

11. The information processing apparatus according to claim 8, wherein the detection region is the imaging region.

12. The information processing apparatus according to claim 8, wherein the detection region is a projection region in which the image of the original document or next original document is being projected.

13. The information processing apparatus according to claim 8, wherein the one or more processors execute the instructions to:
   cause the projector to project the image of the original document to a position on the board where the original document has been put on.

14. A controlling method for an information processing apparatus which is equipped with a board on which an original document can be put, the information processing method comprising:
   imaging a first original document put in an imaging region on the board;
   projecting a first image obtained by imaging the first original document into the imaging region on the board;

determining a timing of imaging a second original document newly put in the imaging region on the board, after removing the first original document from the imaging region;
stopping the projection of the first image into the imaging region on the board, before the timing of imaging the second original document comes;
imaging the second original document put in the imaging region on the board, after stopping the projection of the first image;
projecting a second image, obtained by imaging the second original document, into the imaging region on the board;
determining an entering situation of the second original document into a detection region on the board based on an image imaged by the camera;
causing the projector to stop the projection of the first image, based on the entering situation of the second original document into the detection region determined; and
causing the projector to stop the projection of the first image by thinning a density of the first image in proportion to an increase of a percentage of an overlap between the second original document that entered the detection region and the detection region.

15. A non-transitory computer-readable storage medium which stores a program to cause a computer to perform a controlling method for an information processing apparatus which is equipped with a board on which an original document can be put, the information processing method comprising:
imaging a first original document put in an imaging region on the board;
projecting a first image obtained by imaging the first original document, into the imaging region on the board;
determining a timing of imaging a second original document newly put in the imaging region on the board, after removing the first original document from the imaging region;
stopping the projection of the first image into the imaging region on the board, before the timing of imaging the second original document comes;
imaging the second original document put in the imaging region on the board, after stopping the projection of the first image;
projecting a second image, obtained by imaging the second original document, into the imaging region on the board;
determining an entering situation of the second original document into a detection region on the board based on an image imaged by the camera;
causing the projector to stop the projection of the first image, based on the entering situation of the second original document into the detection region determined; and
causing the projector to stop the projection of the first image by thinning a density of the first image in proportion to an increase of a percentage of an overlap between the second original document that entered the detection region and the detection region.

16. A controlling method for an information processing apparatus which is equipped with a board on which an original document can be put, the information processing method comprising:
imaging the original document put in an imaging region on the board;
projecting an image of the original document obtained by imaging the original document, within the imaging region on the board;
determining an entering state of a next original document to a detection region on the board; and
controlling, based on the determined entering state of the next original document to the detection region, to not project the image of the original document within the imaging region, by lowering a density of the image of the original document according to a percentage of overlap between the next original document which entered the detecting region and the detecting region as the percentage becomes larger.

17. A non-transitory computer-readable storage medium which stores a program to cause a computer to perform a controlling method for an information processing apparatus which is equipped with a board on which an original document can be put, the information processing method comprising:
imaging the original document put in an imaging region on the board;
projecting an image of the original document obtained by imaging the original document, within the imaging region on the board;
determining an entering state of a next original document to a detection region on the board; and
controlling, based on the determined entering state of the next original document to the detection region, to not project the image of the original document within the imaging region, by lowering a density of the image of the original document according to a percentage of overlap between the next original document which entered the detecting region and the detecting region as the percentage becomes larger.

* * * * *